(12) United States Patent
Franzke et al.

(10) Patent No.: US 8,437,344 B2
(45) Date of Patent: May 7, 2013

(54) TELECOMMUNICATION DISTRIBUTION DEVICE WITH MULTI-CIRCUIT BOARD ARRANGEMENT

(75) Inventors: Jorg Franzke, Berlin (DE); Jody Forland, St. Bonifacius, MN (US); Steven Mark Swam, Shakopee, MN (US); Jennifer Lynn Miller, Farmington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1004 days.

(21) Appl. No.: 11/503,849

(22) Filed: Aug. 14, 2006

(65) Prior Publication Data

US 2007/0211642 A1    Sep. 13, 2007

Related U.S. Application Data

(60) Provisional application No. 60/780,394, filed on Mar. 7, 2006, provisional application No. 60/780,519, filed on Mar. 7, 2006.

(51) Int. Cl.
 *H04L 12/50* (2006.01)
(52) U.S. Cl.
 USPC .......................................................... 370/360
(58) Field of Classification Search .................. 370/400, 370/241, 250–251, 254, 257, 351, 357, 359–365, 370/380, 386–388; 385/16; 340/870.07; 439/61; 361/695, 780; 379/32.01
See application file for complete search history.

(56) References Cited

U.S. PATENT DOCUMENTS

| | | | |
|---|---|---|---|
| 4,430,732 A | 2/1984 | Saga et al. |
| 4,609,778 A | 9/1986 | Franklin et al. |
| 4,833,708 A | 5/1989 | Goodrich |
| 5,522,042 A | 5/1996 | Fee et al. |
| 5,542,854 A | 8/1996 | Bowen |
| 5,552,962 A | 9/1996 | Feustel et al. |
| 5,754,404 A | 5/1998 | Biermann et al. |

(Continued)

FOREIGN PATENT DOCUMENTS

| | | |
|---|---|---|
| DE | 101 04 705 A1 | 8/2002 |
| EP | 0 648 061 A2 | 4/1995 |

(Continued)

OTHER PUBLICATIONS

U.S. Appl. No. 11/914,680, filed Jul. 20, 2008 entitled "Active Distribution Device in a Subscriber Connection Area".

(Continued)

*Primary Examiner* — Omar Ghowrwal
(74) *Attorney, Agent, or Firm* — Merchant & Gould P.C.

(57) ABSTRACT

A telecommunications apparatus includes a switching matrix. The telecommunications apparatus also includes a plurality of conductive user output locations and a plurality of conductive network input locations. For any given user output location there exists a conductive path coupling the given user output location to a corresponding network input location. The telecommunications apparatus also includes a plurality of switches. For any given conductive path, a switch is interposed therein, and each switch has a first state in which the given conductive path is unaltered, and a second state in which the given conductive path is altered, so that the given conductive path couples the corresponding user output location to the switching matrix. The aforementioned telecommunications apparatus may be networked with other such telecommunications apparatuses.

8 Claims, 40 Drawing Sheets

U.S. PATENT DOCUMENTS

| | | | |
|---|---|---|---|
| 5,764,754 A | 6/1998 | Ortel et al. | |
| 5,790,546 A * | 8/1998 | Dobbins et al. | 370/400 |
| 5,903,372 A | 5/1999 | Czerwiec | |
| 5,905,781 A | 5/1999 | McHale et al. | |
| 5,949,763 A | 9/1999 | Lund | |
| 6,067,316 A | 5/2000 | Amrany et al. | |
| 6,148,006 A | 11/2000 | Dyke et al. | |
| 6,215,855 B1 | 4/2001 | Schneider | |
| 6,325,636 B1 * | 12/2001 | Hipp et al. | 439/61 |
| 6,335,936 B1 | 1/2002 | Bossemeyer, Jr. et al. | |
| 6,349,123 B1 | 2/2002 | Kim | |
| 6,370,137 B1 | 4/2002 | Lund | |
| 6,370,149 B1 | 4/2002 | Gorman et al. | |
| 6,400,713 B1 | 6/2002 | Thomas et al. | |
| 6,477,238 B1 | 11/2002 | Schneider et al. | |
| 6,493,318 B1 | 12/2002 | Bare | |
| 6,597,689 B1 | 7/2003 | Chiu et al. | |
| 6,625,019 B1 * | 9/2003 | Steinman et al. | 361/695 |
| 6,640,239 B1 | 10/2003 | Gidwani | |
| 6,674,756 B1 | 1/2004 | Rao et al. | |
| 6,754,329 B2 | 6/2004 | Teixeira | |
| 6,757,382 B1 | 6/2004 | Wilkes, Jr. et al. | |
| 6,819,746 B1 | 11/2004 | Schneider et al. | |
| 6,826,280 B1 | 11/2004 | Sajadi et al. | |
| 6,868,092 B1 | 3/2005 | Bell et al. | |
| 6,944,361 B2 | 9/2005 | Xue et al. | |
| 6,944,555 B2 | 9/2005 | Blackett et al. | |
| 6,954,463 B1 | 10/2005 | Ma et al. | |
| 6,977,925 B2 | 12/2005 | Pittman | |
| 7,092,364 B1 | 8/2006 | Franklin et al. | |
| 7,103,650 B1 | 9/2006 | Vetrivelkumaran et al. | |
| 7,154,884 B2 | 12/2006 | Dove et al. | |
| 7,194,538 B1 | 3/2007 | Rabe et al. | |
| 7,292,531 B1 | 11/2007 | Hill | |
| 7,293,109 B2 | 11/2007 | Ott et al. | |
| 7,295,566 B1 | 11/2007 | Chiu et al. | |
| 7,328,260 B1 | 2/2008 | Muthiyan et al. | |
| 7,339,936 B2 | 3/2008 | Valadarsky et al. | |
| 7,415,207 B2 | 8/2008 | Lanzone et al. | |
| 7,430,161 B2 | 9/2008 | Hidaka | |
| 7,463,637 B2 | 12/2008 | Bou-Diab et al. | |
| 7,475,274 B2 | 1/2009 | Davidson | |
| 7,483,438 B2 | 1/2009 | Serghi et al. | |
| 7,486,698 B2 | 2/2009 | Betts et al. | |
| 7,505,413 B2 | 3/2009 | Gous | |
| 7,512,125 B2 | 3/2009 | Betts et al. | |
| 7,561,571 B1 | 7/2009 | Lovett et al. | |
| 7,570,585 B2 | 8/2009 | DePaul et al. | |
| 7,570,587 B1 | 8/2009 | Wilson et al. | |
| 7,593,607 B2 | 9/2009 | Beshai et al. | |
| 7,849,225 B2 | 12/2010 | Schofield et al. | |
| 7,864,773 B2 | 1/2011 | Ah Sue | |
| 7,957,269 B2 | 6/2011 | Tu et al. | |
| 2001/0015978 A1 | 8/2001 | Blanset et al. | |
| 2001/0031111 A1 * | 10/2001 | Irwin | 385/16 |
| 2002/0080445 A1 | 6/2002 | Falkenstein et al. | |
| 2002/0101818 A1 | 8/2002 | Teixeira | |
| 2002/0101864 A1 | 8/2002 | Teixeira | |
| 2002/0106075 A1 | 8/2002 | Foss et al. | |
| 2002/0168054 A1 | 11/2002 | Klos et al. | |
| 2002/0181475 A1 | 12/2002 | Dove et al. | |
| 2002/0191777 A1 | 12/2002 | Milbrandt et al. | |
| 2003/0120817 A1 | 6/2003 | Ott et al. | |
| 2003/0231744 A1 * | 12/2003 | Grosse-Boes et al. | 379/32.01 |
| 2004/0076284 A1 | 4/2004 | Baker et al. | |
| 2004/0120508 A1 | 6/2004 | Sajadi et al. | |
| 2004/0217881 A1 * | 11/2004 | Pedyash et al. | 340/870.07 |
| 2004/0228468 A1 | 11/2004 | Cook | |
| 2005/0074021 A1 | 4/2005 | Bossemeyer, Jr. et al. | |
| 2005/0152340 A1 * | 7/2005 | Voit et al. | 370/352 |
| 2005/0195584 A1 * | 9/2005 | AbuGhazaleh et al. | 361/780 |
| 2007/0211740 A1 | 9/2007 | Franzke et al. | |
| 2007/0211882 A1 | 9/2007 | Hatte et al. | |
| 2007/0211883 A1 | 9/2007 | Franzke et al. | |
| 2008/0059651 A1 | 3/2008 | Ashwood Smith | |
| 2008/0266049 A1 | 10/2008 | Franzke | |
| 2009/0129568 A1 | 5/2009 | Franzke | |

FOREIGN PATENT DOCUMENTS

| | | |
|---|---|---|
| EP | 0 858 221 A2 | 8/1998 |
| EP | 1 229 745 A2 | 8/2002 |
| WO | WO 01/20922 A1 | 3/2001 |
| WO | WO 02/03594 A2 | 1/2002 |
| WO | WO 2005/091613 A1 | 9/2005 |
| WO | WO 2006/063951 A1 | 6/2006 |
| WO | WO 2006/122699 A1 | 11/2006 |
| WO | WO 2006/422698 A1 | 11/2006 |
| WO | WO 2007/060196 A1 | 5/2007 |

OTHER PUBLICATIONS

U.S. Appl. No. 11/914,692, filed Nov. 16, 2007 entitled "Distribution Device in a Subscriber Connection Area".

Prosecution History of U.S. Appl. No. 11/503,861 (OA Feb. 22, 2011).

Prosecution History of U.S. Appl. No. 11/503,653 (OA Jan. 26, 2011).

Prosecution History of U.S. Appl. No. 11/503,861 (OA Oct. 29, 2009; Resp. Mar. 1, 2010; Final OA Jun. 22, 2010; Resp. Oct. 22, 2010).

Prosecution History of U.S. Appl. No. 11/503,653 (OA Oct. 1, 2009; Resp. Feb. 1, 2010; Final OA May 17, 2010; Resp. Oct. 22, 2010).

Prosecution History of U.S. Appl. No. 11/503,667 (OA Oct. 29, 2009; Resp. Mar. 1, 2010; Final OA Jun. 16, 2010).

Prosecution History of U.S. Appl. No. 11/503,667 (Resp. Dec. 16, 2010; OA Apr. 1, 2011; Resp. Sep. 1, 2011; Final OA Sep. 30, 2011; Resp. Feb. 3, 2012; OA Apr. 11, 2012).

Prosecution History of U.S. Appl. No. 11/503,861 (Resp. Jun. 22, 2011; Final OA Aug. 24, 2011; Resp. Jan. 24, 2012; OA Mar. 27, 2012).

Prosecution History of U.S. Appl. No. 11/503,653 (Resp. Jun. 27, 2011; Final OA Aug. 25, 2011; Resp. Jan. 25, 2012; OA Mar. 14, 2012).

Prosecution History of U.S. Appl. No. 11/914,680 (OA Sep. 7, 2011; Resp. Jan. 9, 2012; Final OA May ; Resp. Sep. 7, 2012).

Prosecution History of U.S. Appl. No. 11/914,692 (OA Sep. 6, 2011; Resp. Jan. 26, 2012; Final OA May 8, 2012; Resp. Sep. 7, 2012).

* cited by examiner

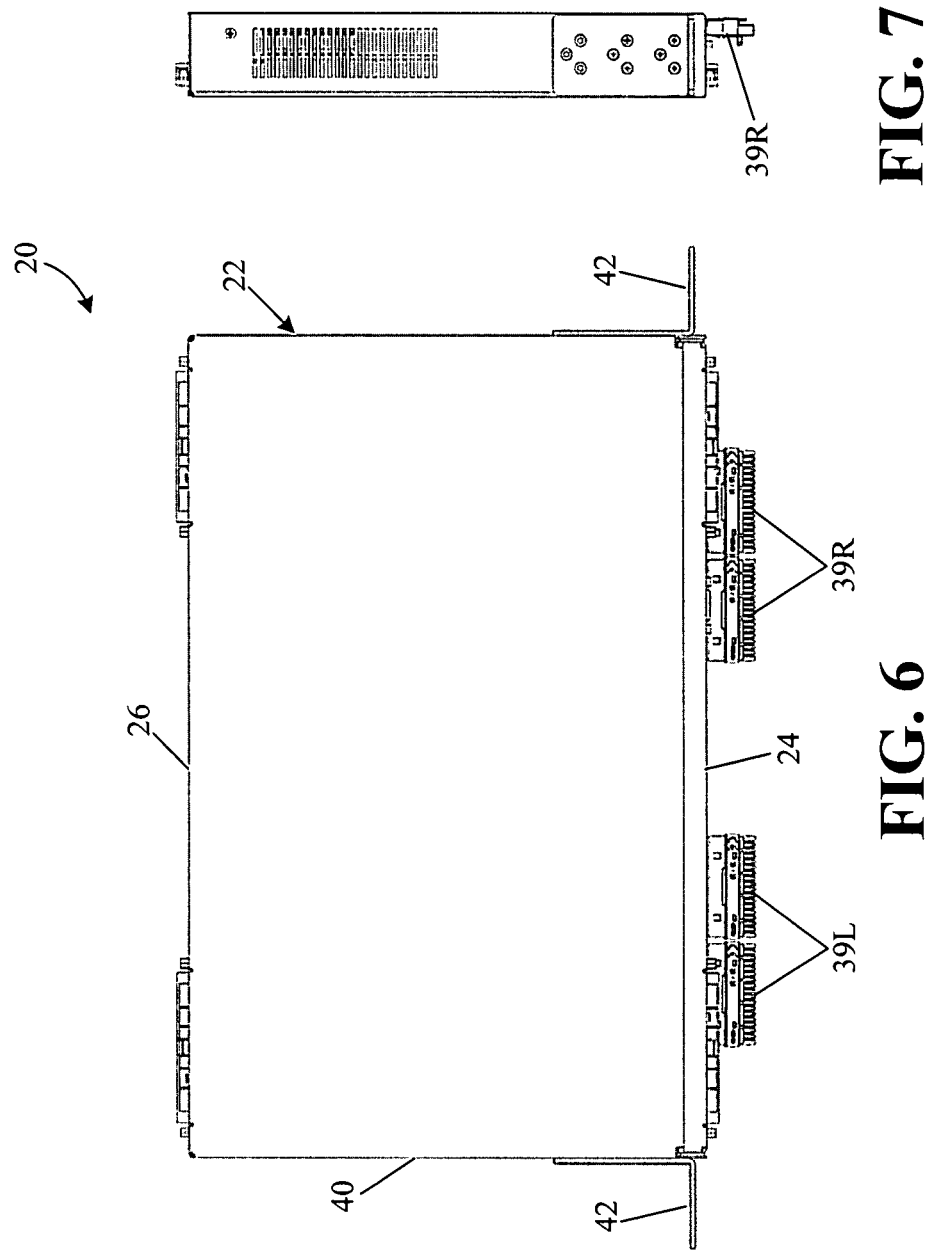

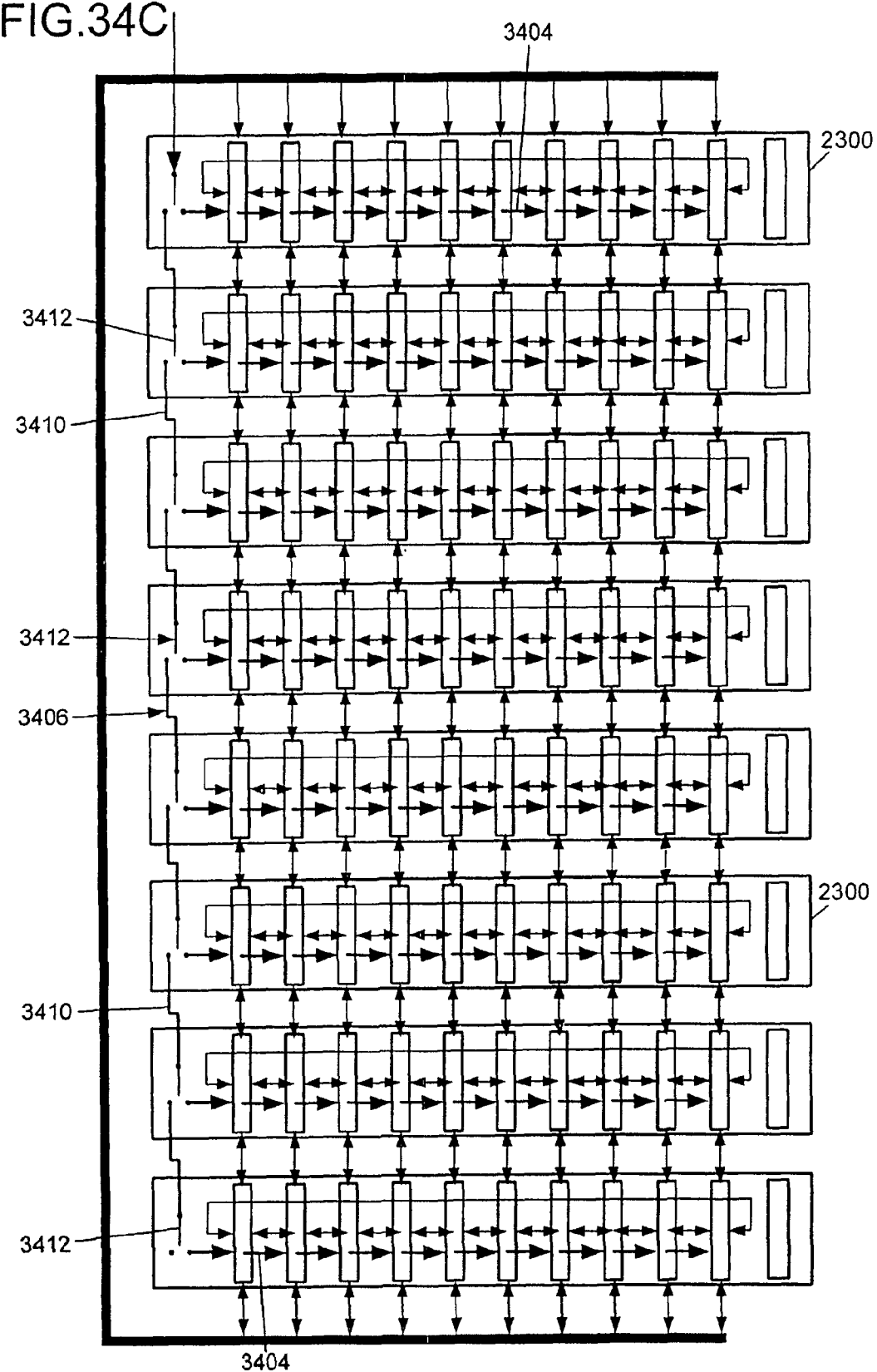

TELECOMMUNICATION DISTRIBUTION DEVICE WITH MULTI-CIRCUIT BOARD ARRANGEMENT

RELATED APPLICATIONS

This application claims the benefit of Provisional Application No. 60/780,394, filed Mar. 7, 2006; and Ser. No. 60/780,519, filed Mar. 7, 2006, which are incorporated by reference herein in their entirety.

TECHNICAL FIELD

The present document relates generally to a telecommunications system and device for connecting a subscriber line to a selected unit of telecommunications hardware that provides a desired telecommunications service, and more particularly to a cross-connect distribution unit and system.

BACKGROUND

A switching center is a facility that houses telecommunications equipment that couples, either directly or indirectly, to a feeder and distribution system that ultimately reaches homes and offices. A telephone line extends from a home or office, i.e., from a subscriber site, to a switching center. At the switching center, the line has traditionally been coupled to some form of switch, which, broadly speaking, is a unit of telecommunications equipment that is responsible for connecting telephone calls.

Today, telephone companies offer many telecommunications services. For example, a homeowner (subscriber) may wish to obtain access to a digital subscriber line (DSL) service, as well as having access to his or her traditional telephone service (POTS-plain old telephone service). Whereas historically all subscriber lines coupled to a POTS switch at a switching center, it is now necessary to couple a subscriber line to other units of telecommunications equipment, based upon the services desired by a subscriber. For example, a subscriber line that is intended to have access to DSL service as well as POTS service may be coupled to a multi-service access node (MSAN), while a subscriber line intended to provide only POTS service may be connected to a POTS switch.

To allow for various subscriber lines to couple to various units of telecommunications equipment, a selective coupling device may be employed toward the front-end of the switching center. The selective coupling device may possess many input ports to which subscriber lines couple, and may possess many output ports to which various units of telecommunications equipment couple. The selective coupling device couples a given subscriber line to a given unit of telecommunications equipment, in response to a command from a computer at the switching center.

The aforementioned scheme exhibits certain shortcomings. For example, to provide flexibility, the selective coupling device is often required to include many costly switching elements, thereby driving up the cost of such devices. Also, such devices have heretofore been "dumb" devices, meaning that they have needed to receive commands explicitly identifying which physical input port should be connected to which physical output port. Consequently, as the connections to, or between, the various selective coupling devices changes, the aforementioned telecommunications computer needs to be reprogrammed to accommodate such changes.

SUMMARY

According to one embodiment, a telecommunications apparatus includes a switching matrix. The telecommunications apparatus also includes a plurality of conductive user output locations and a plurality of conductive network input locations. For any given user output location there exists a conductive path coupling the given user output location to a corresponding network input location. The telecommunications apparatus also includes a plurality of switches. For any given conductive path, a switch is interposed therein, and each switch has a first state in which the given conductive path is unaltered, and a second state in which the given conductive path is altered, so that the given conductive path couples the corresponding user output location to the switching matrix.

According to another embodiment, a telecommunications apparatus includes a switching matrix, which, in turn, includes a plurality of conductive switching matrix input locations, a plurality of conductive switching matrix output locations, and a plurality of conductive lines and switches interposed between the switching matrix input and output locations so that any given switching matrix input location may be electrically coupled to any given switching matrix output location. The telecommunications apparatus also includes a cut-over matrix having a plurality of conductive cut-over matrix output locations, a plurality of conductive cut-over matrix input locations, and a plurality of conductive lines and switches interposed between the cut-over matrix input and output locations so that any given cut-over matrix output location may be selectively electrically coupled to a corresponding switching matrix output location or to a corresponding cut-over matrix input location, as determined by at least one of the plurality of switches of the cut-over matrix.

According to another embodiment, a method of using one or more cross-connect distribution units, each including a plurality of user ports, network ports, loop ports and service ports, includes dividing the loop ports of a first cross-connect distribution into first and second groups. Each of the loop ports of the first group is coupled to the loop ports of the second group, so that for any given loop port in the first group, the given loop port is coupled to a corresponding loop port in a second group. The service ports of a first cross-connect distribution are divided into first and second groups. One of the service ports of the first group is directly coupled to one of the service ports of the second group.

According to another embodiment, a method of using one or more cross-connect distribution units, each including a plurality of user ports, network ports, loop ports and service ports, includes coupling a device providing a communication service to one or more of the network ports on a first cross-connect distribution unit. One or more of the user ports of the first cross-connect distribution unit are coupled to one or more service ports of a second cross-connect distribution unit.

According to another embodiment, a method of using one or more cross-connect distribution units, each including a plurality of user ports, network ports, loop ports and service ports, includes coupling a device providing a communication service to one or more of the service ports on a first cross-connect distribution unit. One or more user ports on the first cross-connect distribution unit are coupled to one or more service ports on a second cross-connect distribution unit.

BRIEF DESCRIPTION OF THE DRAWINGS

FIGS. 6-10 depict other views of the exemplary embodiment depicted in FIG. 5.

FIG. 34C shows a wiring schematic for a telecommunications distribution block having a test bus that interconnects all the matrix cards of the block.

DETAILED DESCRIPTION

Figure 1:
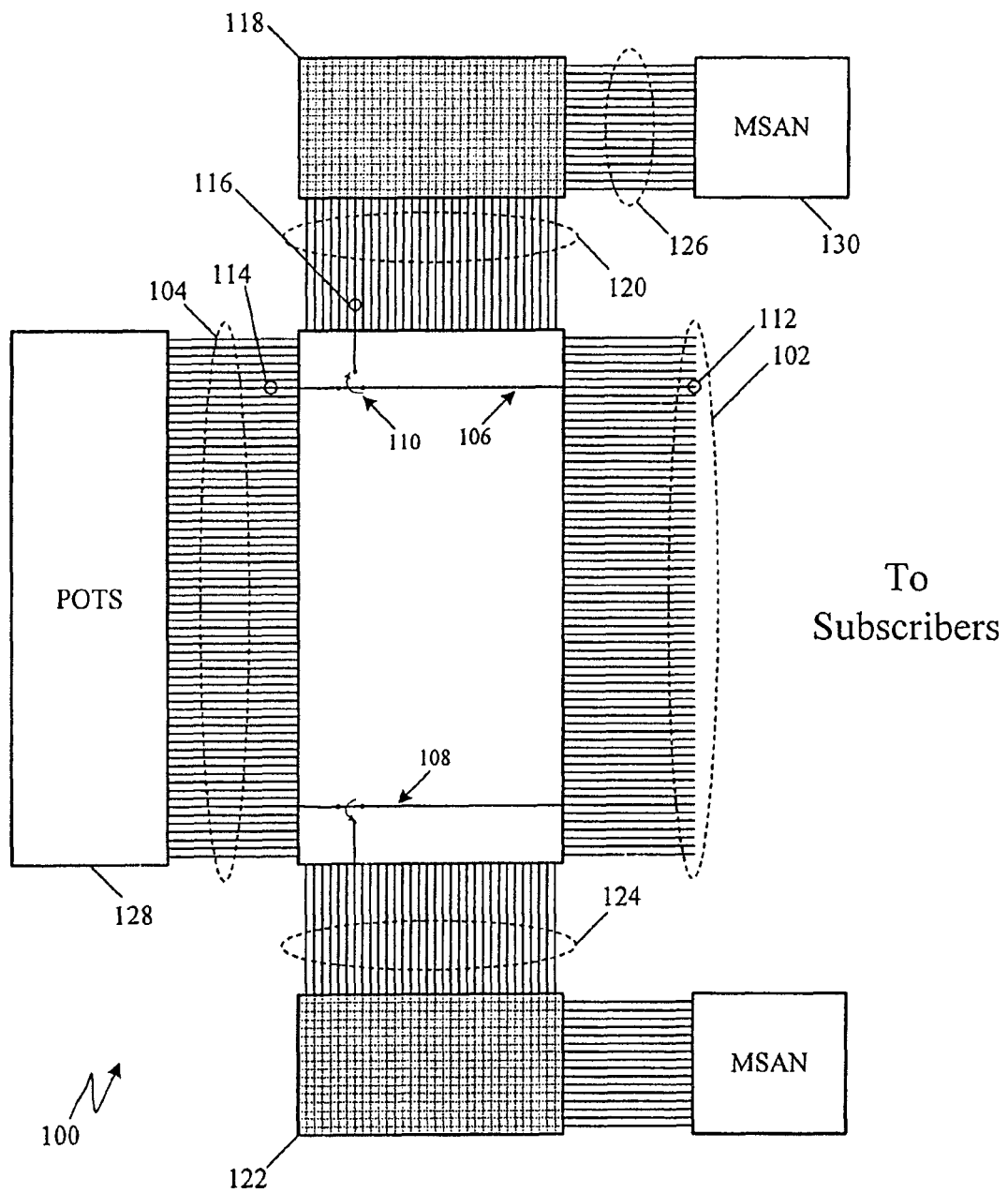
FIG. 1 depicts an exemplary embodiment of a cross-connect distribution unit (CDU).

Various embodiments presented herein will be described in detail with reference to the drawings, wherein like reference numerals represent like parts and assemblies throughout the several views. Reference to various embodiments should not be construed as limiting the scope of covered subject matter, which is limited only by the scope of the claims attached hereto. Additionally, any examples set forth in this specification are not intended to be limiting and merely set forth some of the many possible embodiments.

FIG. 1 depicts an exemplary embodiment of a CDU 100. In the particular embodiment depicted in FIG. 1, the CDU 100 includes sixty-four physical user ports 102. In principle, the CDU 100 may include any number of physical user ports. Each user port 102 may be coupled to a subscriber line, i.e., a telephone line that extends to a home, office, or other subscriber site. Each user port 102 is coupled to a conductive path that extends to a corresponding physical network port 104. Therefore, the CDU 100 includes a like number of user ports 102 and network ports 104. For the sake of illustration, only two conductive paths 106 and 108 are depicted. A user port may also be referred to as a "user output location," a "cut-over matrix output location," or may be referred to with another similar term. A network port may also be referred to as a "network input location," a "cut-over matrix input location," or may be referred to with another similar term. It is to be understood that, as used herein, the term "port" does not require a structure exhibiting a male-female sort of coupling, but rather refers generally to any structure (conductive pad, conductive line, conductive location, etc.) for carrying a communication signal, including a structure intended to contact another structure so as to transfer such a signal from one device to another.

Each conductive path is interrupted by a switch. For example, the conductive path 106 is interrupted by a switch 110. The switch 110 exhibits two states. In its first state, the switch 110 provides electrical connectivity between the user port 112 and its corresponding network port 114. In its second state, the switch 110 provides electrical connectivity between the user port 112 and a corresponding internal matrix port 116. The internal matrix port 116 is coupled to a switching matrix 118. An internal matrix port may also be referred to herein as a "switching matrix output location," or by other similar terms. In the particular embodiment shown in FIG. 1, the switching matrix 118 includes thirty-two internal matrix ports 120, each of which provide connectivity to the first half of the user ports 102 of the CDU 100 (therefore, the CDU 100 includes a second switching matrix 122, which includes thirty-two internal matrix ports 124, providing connectivity to the second half of the user ports 102). The switching matrix 118 also includes sixteen service ports 126. A service port may also be referred to as a "switching matrix input location," or by other similar terms. The switching matrix 118 is arranged so that any internal matrix port 120 can be electrically connected to any service port 126, meaning that any user port 102 of the CDU can be connected to any service port 126.

For the sake of illustrating the functionality of the CDU 100, each of the network ports 104 are depicted as being connected to a POTS switch 128, and each of the service ports 126 are depicted as being connected to an MSAN 130. When a given switch is in its aforementioned first state, its corresponding subscriber line is coupled to the POTS switch 128, meaning that the subscriber site coupled thereto is provided only POTS service, i.e., ordinary voice telephone service. On the other hand, when a given switch is in its aforementioned second state, its corresponding subscriber line is coupled to the MSAN 130, meaning that the subscriber site coupled thereto is provided both voice service and DSL service.

It is of note that the switching matrices 118 and 122 each include more internal matrix ports (thirty-two) than service ports (sixteen). This means that only thirty-two of the sixty-four subscriber lines can be coupled to a service port at any one time, which therefore means that only thirty-two of the sixty-four subscriber lines can obtain a service provided through a switching matrix 118 and 122, e.g., DSL service, at any one time. Although each switching matrix 118 and 122 is depicted as being 16×32 (sixteen service ports to thirty-two internal matrix ports), each switching matrix may, in principle be of any dimension, e.g., 8×32, 16×32, 32×32, 32×64, and so on. It is to be noted that in embodiments in which a switching matrix includes a quantity of internal matrix ports equal to the quantity of user ports of the CDU, only one switching matrix is included in the CDU. Alternatively, other embodiments of the CDU may include two (as shown) or more switching matrices.

It is also of note that various units of telecommunications equipment may be coupled to various service ports of a given switching matrix. For example, eight of the service ports 126 of the switching matrix 118 may be coupled to a unit of telecommunications equipment that provides symmetrical digital subscriber line service (SDSL), while the other eight service ports 126 may be coupled to a unit of telecommunications equipment that provides asymmetrical digital subscriber line service (ADSL). Thus, a given subscriber line may be coupled (by way of an intervening switch and internal matrix port) to either one of the first eight service ports, thereby obtaining SDSL service, or to one of the second eight service ports, thereby obtaining ADSL service. In principle, a switching matrix may be coupled to a quantity of different units of telecommunications equipment equal to the number of service ports.

Although not depicted in FIG. 1, a CDU includes a controller, e.g., microcontroller or microprocessor coupled to a memory device storing firmware/software and/or data necessary for execution thereof (or application specific integrated circuit(s), ASIC). The controller executes the aforementioned firmware/software, permitting the CDU to receive commands dictating the state of each switch therein, and requesting that a particular internal matrix port be connected to a particular service port, if possible.

It should be noted that the CDU 100 of FIG. 1 may be connected in many other configurations than the particular configuration shown in FIG. 1. For example, a first CDU may be coupled to a second CDU, so as to provide additional functionality, and the connections between the internal matrix ports, service ports, and user ports of a given CDU may be other than that shown in FIG. 1, so as to accommodate various types of telecommunications devices. Examples of various systemic arrangements of CDUs are presented herein, below, along with an explanation of the additional functionality yielded by the various arrangements.

Figure 2:
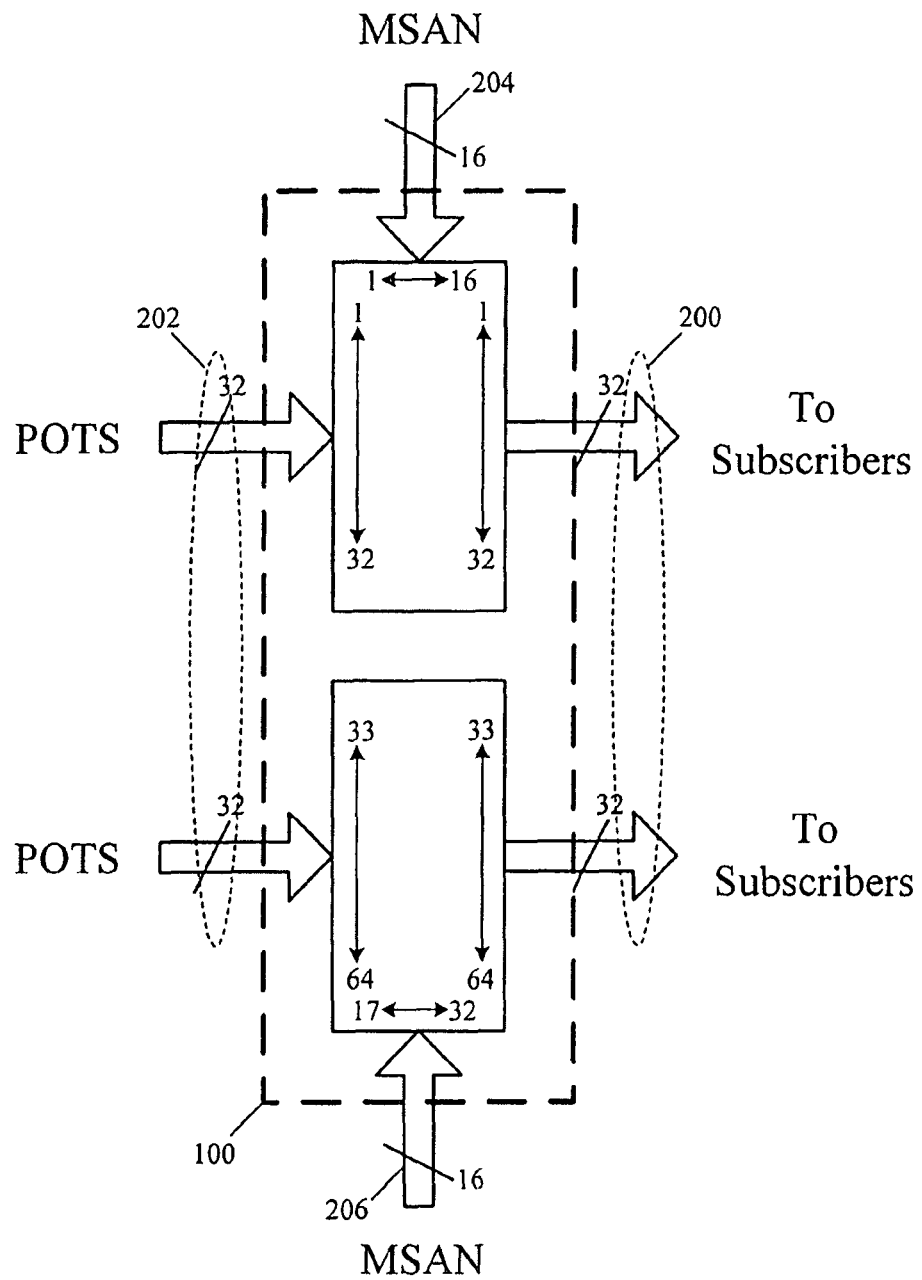
FIG. 2 depicts a logical representation of the CDU of FIG. 1.

FIG. 2 depicts a conceptual representation of the CDU 100 of FIG. 1. The conceptual representation eliminates representation of the various switches and switching matrices within the CDU 100, so as to simplify its illustration. The CDU 100 is presented as including sixty-four user ports 200 and sixty-four network ports 202, which are presented in two groups of thirty-two. Also, the CDU 100 is depicted as including two sets of special services ports 204 and 206, each in quantity of sixteen. Although not depicted, the representation of FIG. 2 is to be understood as containing switches providing the functionality of switch 110 in FIG. 1, and switching matrices providing the functionality of switching matrices 118 and 122 of FIG. 1. Therefore, a given user port 200 may be connected to: (1) a corresponding network port 202 (e.g., physical user port N may be connected to physical network port N); or (2) to any service port of a switching matrix to which the given user port is coupled (e.g., a given physical user port $1 \leq N \leq 32$ may be connected to any given service port $1 \leq M \leq 16$, and a given physical user port $33 \leq N \leq 64$ may be connected to any given service port $17 \leq M \leq 32$).

The portions of this document relating to the systemic arrangement of CDUs and software/firmware operation of CDUs typically use the representation depicted in FIG. 2.

It should be noted that, for the only sake of consistency with FIG. 1, the service ports 204 and 206 are depicted as being connected to an MSAN, and the network ports 202 are depicted as being connected to a POTS switch. It is to be understood that the user ports 200, network ports 202 and service ports 204 and 206 may be coupled to other devices or to other CDU ports, as mentioned above, and as described below in greater detail.

Figure 3:
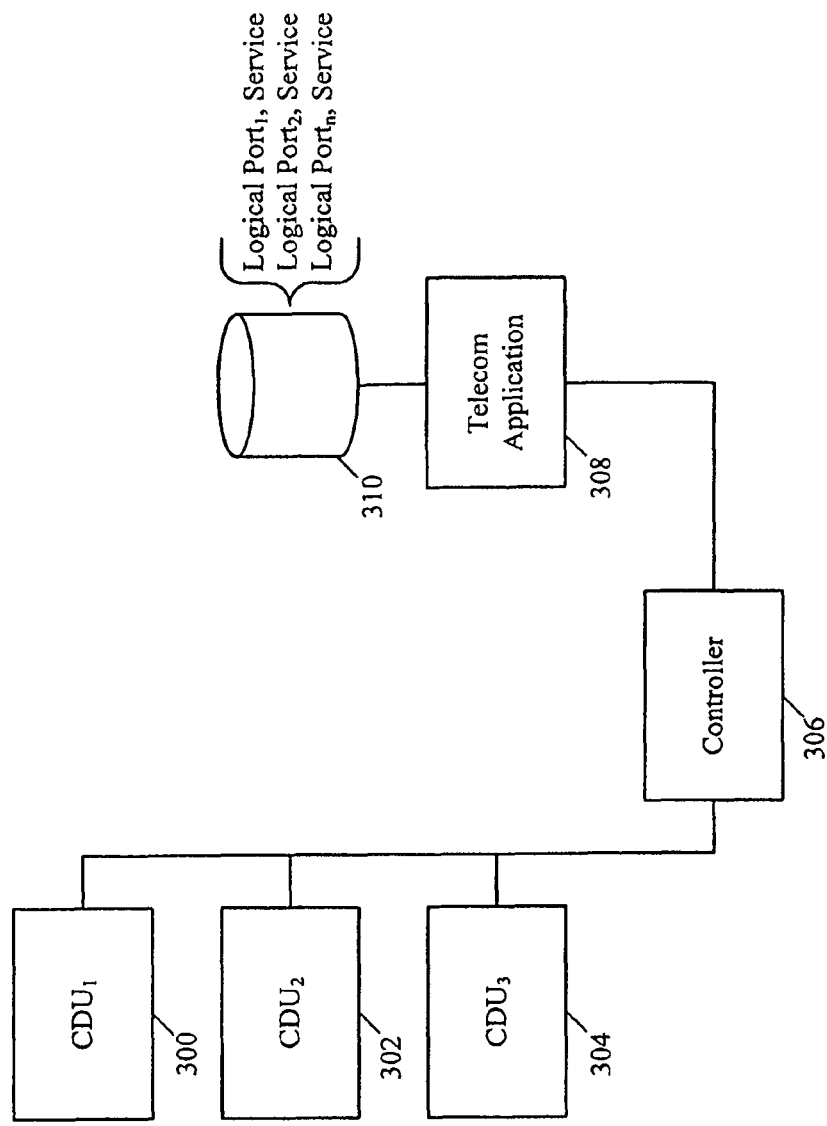
FIG. 3 depicts an exemplary embodiment of a command-and-control environment of the CDU of FIG. 1.

FIG. 3 depicts an exemplary embodiment of a command and control environment in which the CDU 100 of FIG. 1 may operate. As shown in FIG. 3, many CDUs 300-304 may be networked to a controller 306. Although FIG. 3 depicts three CDUs 300-304 coupled to the controller 306, in principle, any number of CDUs may be coupled thereto. The various CDUs 300-304 may be arranged so that their various user ports, network ports and/or service ports are interconnected. In instances in which the user ports, network ports and/or service ports of various CDUs are interconnected, the various CDUs are said to make up a "logical element" that implements a "model" (a model is a formal articulation of the various interconnections of the user ports, network ports, and service ports of the CDUs making up a given logical element).

Each CDU 300-304 may be commanded to couple a particular user port to either a corresponding network port or to a chosen service port. Such commands are delivered from the controller 306. The controller 306 and the CDUs 300-304 may be networked via a TCP/IP based network, coupled via an RJ-45 connector, for example. Of course, the controller 306 and the CDUs 300-304 may utilize any protocol stack permitting communication between the controller and a desired CDU 300-304.

The controller 306 may be embodied as a computer that runs software for commanding the CDUs 300-304, as described above. The controller software is in communication with a telecommunications application 308 maintained by the telecommunications company using the system of FIG. 3. The telecommunications application 308 may execute upon the same computer that embodies the controller 306, or may execute upon another computer that is networked to the computer embodying the controller 306.

The various ports on the logical element are assigned logical port numbers. Thus, assuming each CDU 300-304 includes sixty-four user ports, sixty-four network ports, and thirty-two service ports, then the logical element composed of the three CDUs 300-304 depicted in FIG. 3 is thought to contain one-hundred and ninety-two logical user ports (numbered 1 through 192), one-hundred and ninety-two logical network ports (numbered 1 through 192), and ninety-six logical service ports (numbered 1-96).

The telecommunications application 308 may have access to a data store 310, such as a database, that maintains a list of logical user ports and the service that is to be assigned to each logical port. The data store 310 may also be embodied as a simple file or set of files, such as a comma separated value (CSV) file, or flat file, for example. It is to be understood that the data store 310 may include other information, such as the name of the subscriber corresponding to a particular logical user port, the address of the subscriber, etc. As discussed below, the telecommunications application 308 does not have to be programmed or otherwise informed of the various interconnections of the CDUs 300-304 making up the logical element. In other words, the telecommunications application 308 does not need to be programmed in light of, or otherwise made aware of the model implemented by the logical element. The telecommunications application 308 need only command the controller 306 to provide a particular service to a particular logical port (e.g., the telecommunications application 308 may command the controller 306 to provide ADSL to logical port 4, to provide POTS to logical port 68, or to provide SDSL to logical port 82, to list a few examples of such commands). Such a command is received by the controller 306, which is informed of the model. The controller 306 converts this command into individual commands, directed to the appropriate CDUs, in order to arrive at the proper state of each switch therein, and to command the proper connection to be implemented by the switching matrix contained therein, thereby providing the desired service to the desired logical port. This process is described in greater detail, below.

Prior to further discussion of the CDU of FIG. 1, and the manners in which it may be interconnected and controlled, discussion returns briefly to the switching matrix. Previously, it was stated that, for a given switching matrix, any of its internal matrix ports can be connected to any of its service ports. This statement is true assuming that no internal matrix port has yet been connected to a service port. On the other hand, once such a connection has already been established, it may be the case that a particular internal matrix port cannot be connected to a particular service port. For example, if internal matrix port #1 is connected to service port #1, internal matrix port #2 cannot also connect to service port #1.

In addition to the circumstance described above, according to some embodiments of the switching matrix, connection of a small number of internal matrix ports to service ports may block the connection between a particular internal matrix port and a particular to service port, even though the desired service port is otherwise available, i.e., is not already connected to an internal matrix port. This phenomenon is referred to as "blocking." FIG. 4 depicts an exemplary embodiment of the switching matrix in which service port number 10 is blocked.

Figure 4:
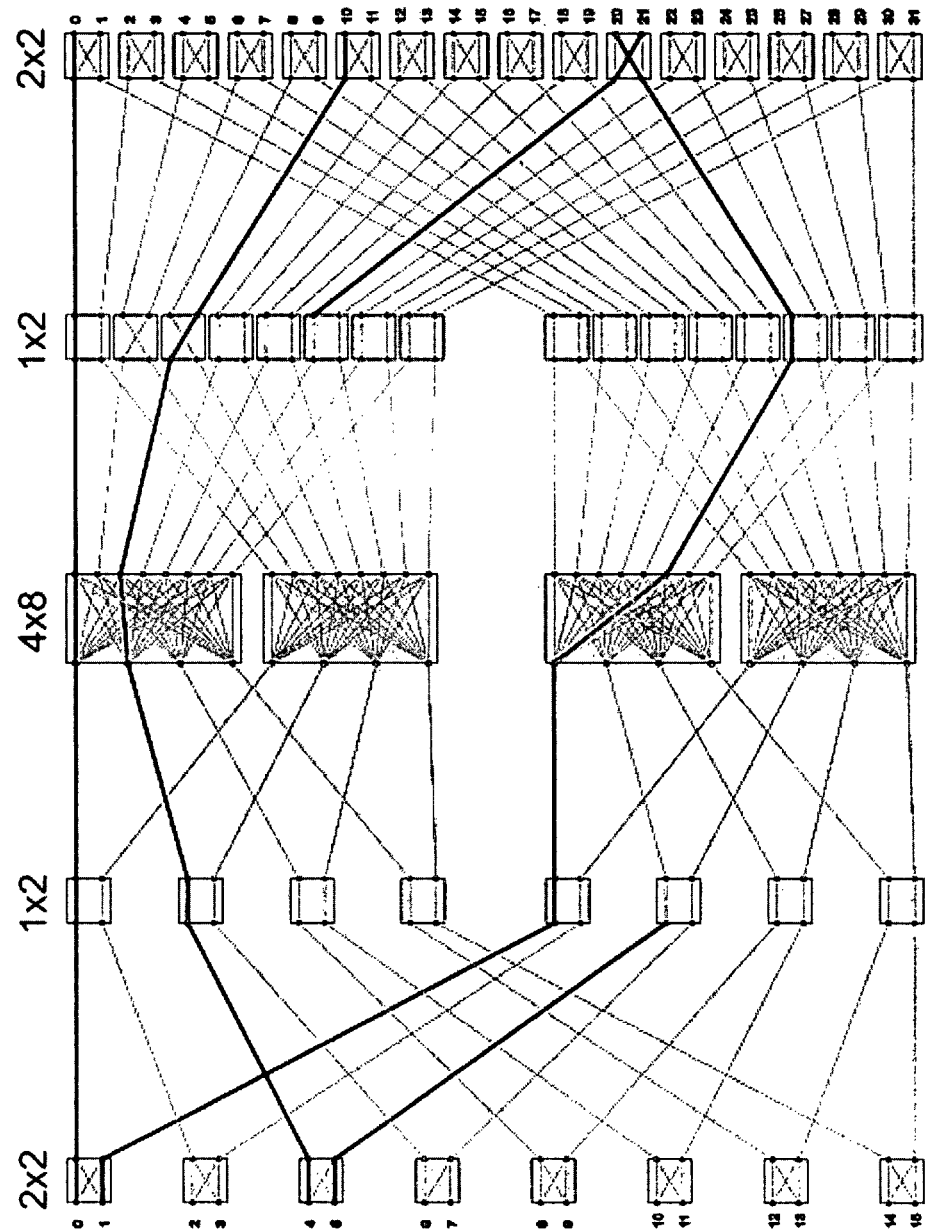
FIG. 4 depicts an exemplary embodiment of a switching matrix within the CDU of FIG. 1.
Figure 5:
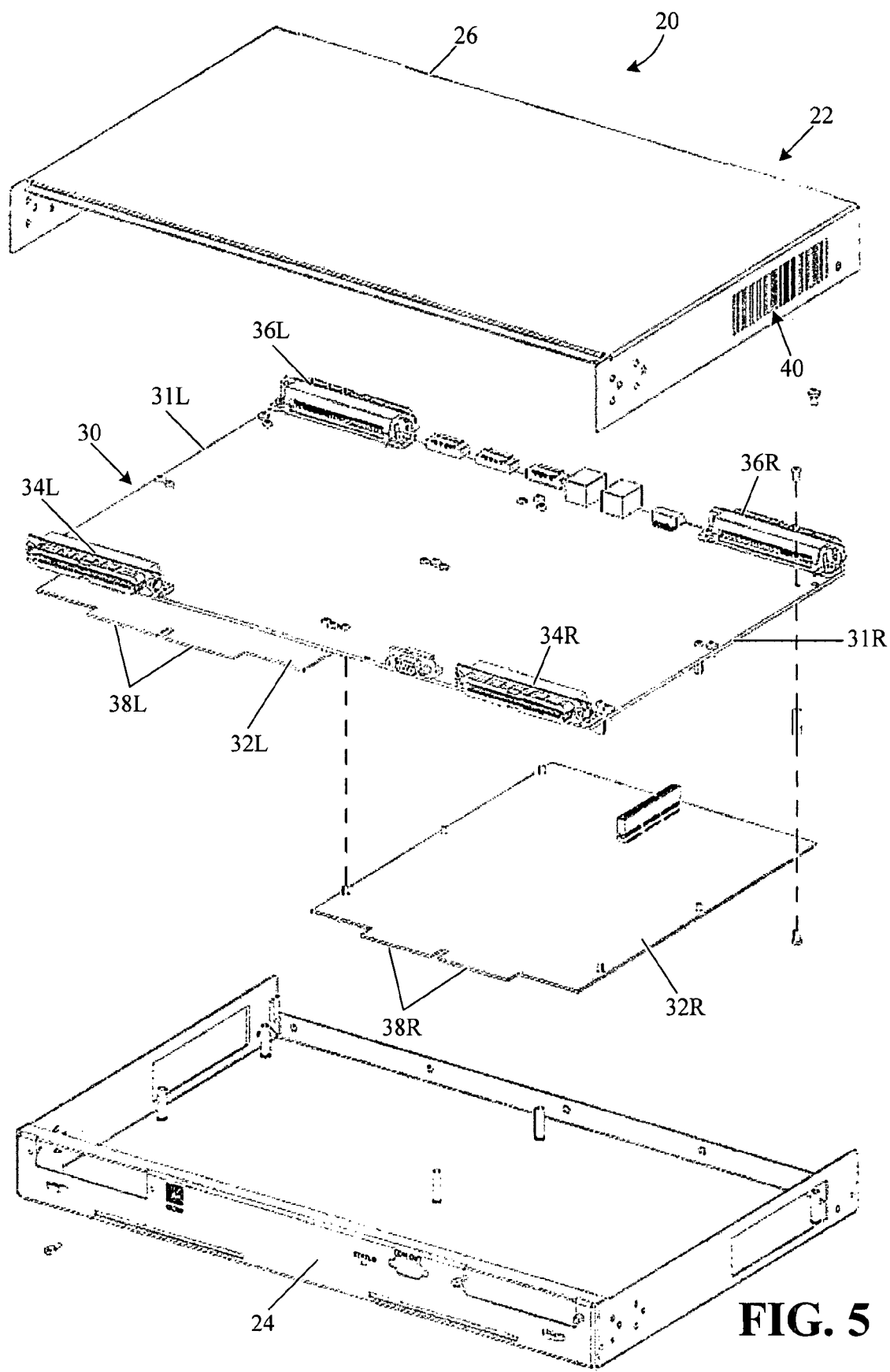
FIG. 5 depicts an exemplary mechanical embodiment of the CDU of FIG. 1.
Figure 8:
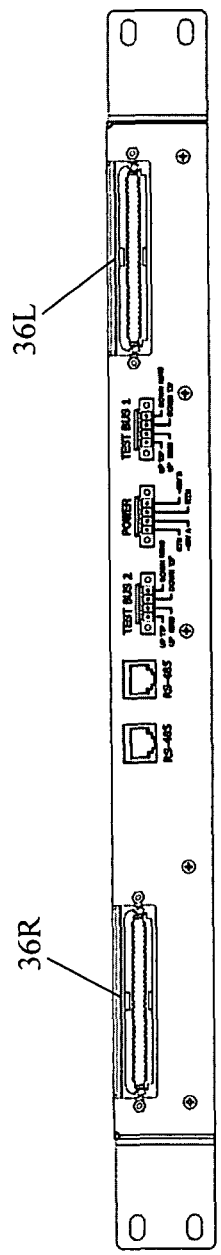
Figure 9:
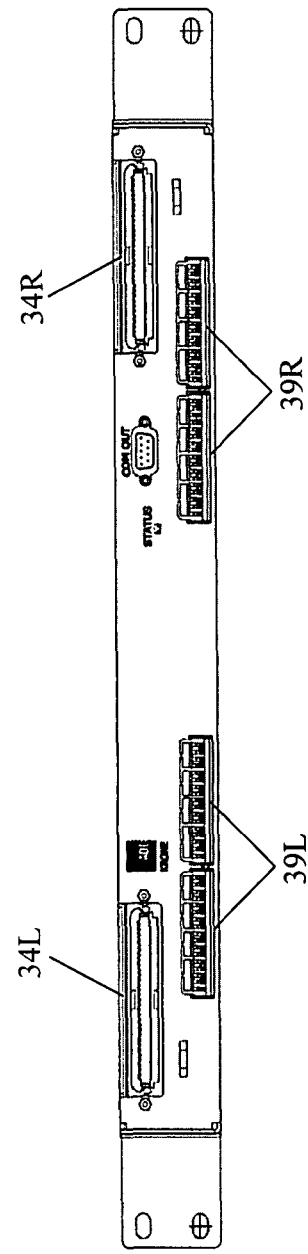
Figure 10:
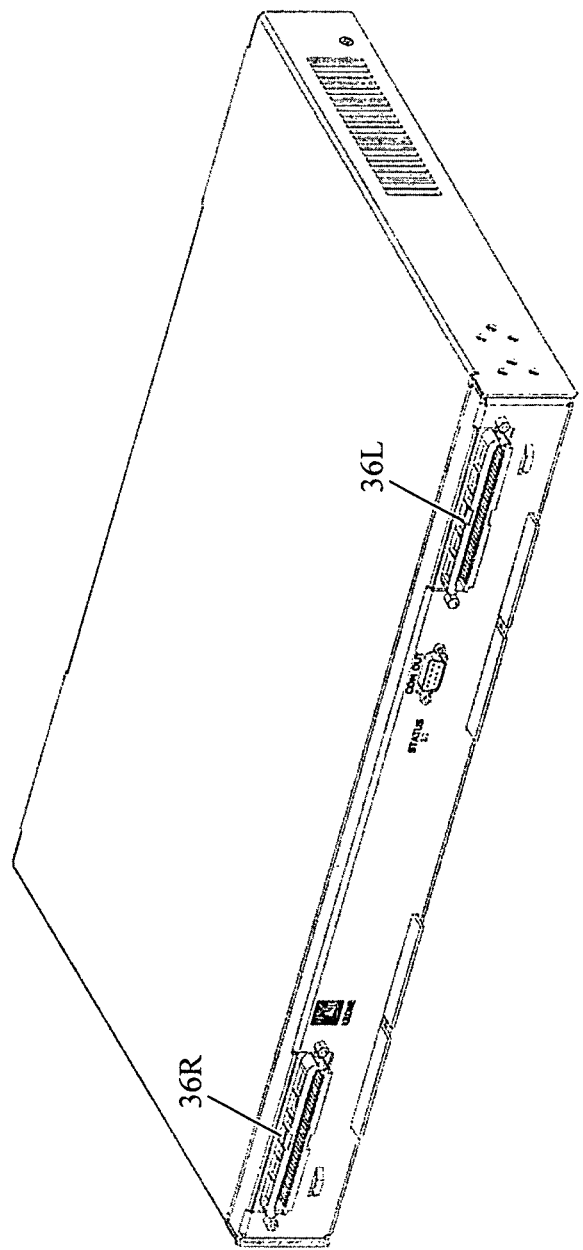

As shown in FIG. 4, the switching matrix includes five stages of switches. The various lines interconnecting the stages of switches indicate the possible paths of connectivity. Bold lines indicate connections that have been made. (Internal matrix port #0 has been connected to service port #0; internal matrix port #1 has been connected to service port #20; internal matrix port #4 has been connected to service port #10.) As can be seen from FIG. 4, it is impossible, given the architecture of the switching matrix, to connect internal switching matrix port #5 to service port #21, when the aforementioned three connections have been established. Such a scenario is an example of a blocked connection. More discussion related to blocking is presented herein, below.

According to some embodiments, the controller 306 is programmed to render an image like that of FIG. 4. In other words, the image presents the state of the CDU. For example, each of the stages of switches are visually presented, and the various switching states of the various switches are presented, so that it can be determined which ports are coupled via the switches and/or switching matrix of a given CDU, and so that it can be determined if any paths through a given CDU are blocked or otherwise unavailable.

Mechanical Embodiments

FIGS. 5-10 show a CDU 20 having features that are examples of inventive aspects in accordance with the principles of the present disclosure. The CDU 20 includes a chassis 22 adapted to be mounted in a conventional telecommunications rack. The chassis 22 includes a front side 24 and a back side 26.

A circuit board assembly 28 is mounted within the chassis 22. The circuit board assembly 28 includes a main board 30 having a left side 31L and a right side 31R. The main board 30 also includes left and right front connectors 34L, 34R accessible from the front side 24 of the chassis, and left and right rear connectors 36L, 36R accessible from the back side 26 of the chassis 22. The circuit board assembly 28 also includes left and right daughter boards 32L, 32R that interface with the main board 30. The daughter boards 32L, 32R each include card edge extensions 38L, 38R (see FIG. 5) that are accessible from the front side 24 of the chassis 22. Connector blocks 39L, 39R (see FIG. 6) are mounted on the card edge extensions 38L, 38R.

The chassis 22 includes an envelope-type housing 40 having a rectangular, low profile shape. The chassis 22 also includes flanges 42 (see FIG. 6) positioned adjacent the front side 24 of the chassis 22 for use in fastening of the chassis to a telecommunications rack.

The connectors 39L, 39R mounted at the card edge extensions 38L, 38R can be LSA Plus Block connectors. LSA Plus Block connectors are insulation displacement connectors having wire termination blades that are aligned at 45 degrees relative to the longitudinal axis of a wire terminated between the blades. Each block is depicted having 8 sets of blades respectively terminated to separate contacts on the card edge connectors 38L, 38R.

The main board 30 has mounted thereto the electrical paths 106 and 108 and switches 110 depicted in FIG. 1. Thus, the left and right rear connectors 36L and 36R provide the physical coupling for the user ports 102 depicted in FIG. 1. (Left rear connector 36L provides physical coupling for thirty-two user ports 102, and right rear connector 36R provides physical coupling for thirty-two user ports 102, arriving at a total of sixty-four user ports 102. According to some embodiments, all of the user ports 102 are provided physical coupling through a single connector. According to other embodiments, the user ports 102 are provided physical coupling via three or more connectors.) It follows, then, that the left and right front connectors 34L and 34R provide the physical coupling for the network ports 104 depicted in FIG. 1. (Left front connector 34L provides physical coupling for thirty-two network ports 104, and right front connector 34R provides physical coupling for thirty-two network ports 104, arriving at a total of sixty-four network ports 104. According to some embodiments, all of the network ports 104 are provided physical coupling through a single connector. According to other embodiments, the network ports 104 are provided physical coupling via three or more connectors.)

Figure 11:
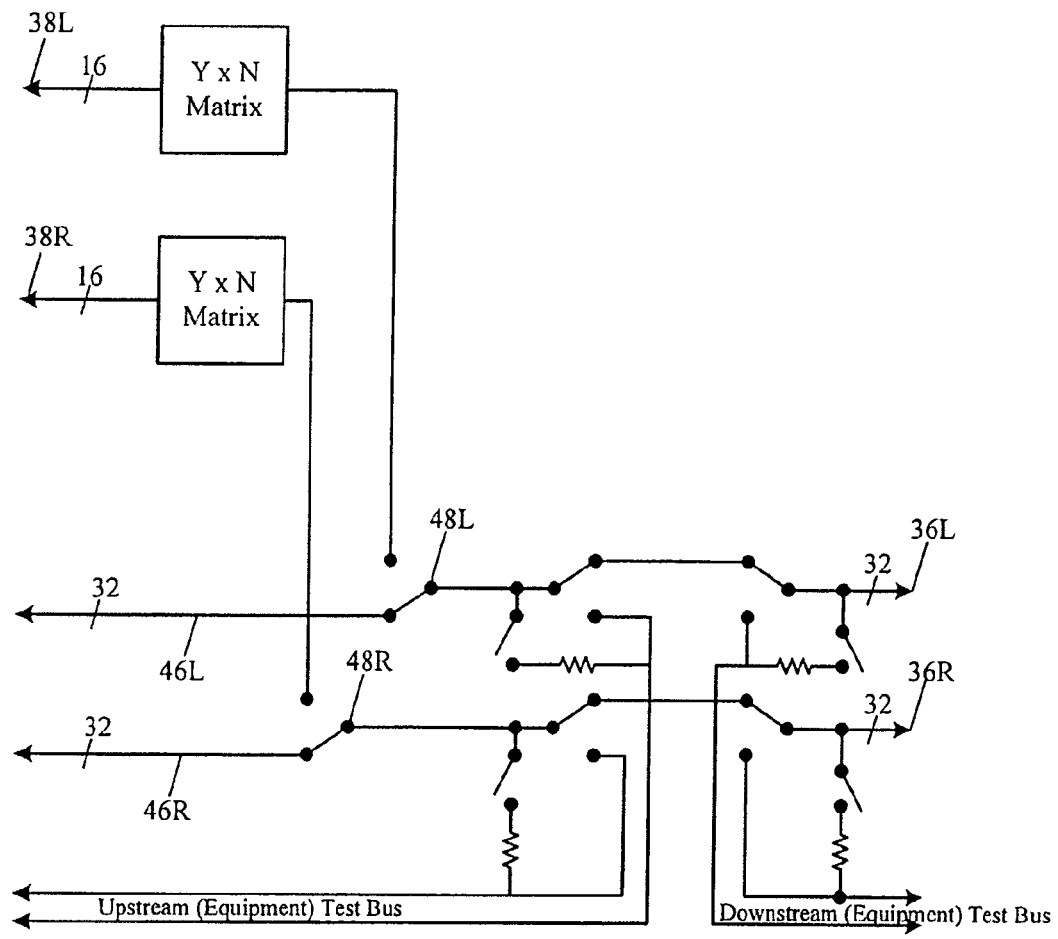
FIG. 11 depicts an exemplary embodiment of the switching circuitry on the main board of the CDU of FIG. 5.

The arrangement just described is shown in greater detail in FIG. 11. The main board 30 includes conductive circuit paths 46L, 46R (see FIG. 11) that extend between the front and rear connectors 34L, 36L and between the front and rear connectors 34R, 36R. The connectors 34L, 34R, 36L, 36R preferably have multiple contacts (e.g., pins). In the depicted embodiment, the connectors 34L, 34R, 36L, 36R are 32-pin Telco style connectors. The conductive circuit paths 46L on the main board 30 electrically connect each contact of the front connector 34L to a corresponding contact on the rear connector 36L. Similarly, the conductive circuit paths 46R on the main board 30 also electrically connect each contact of the front connector 34R to a corresponding contact on the rear connector 36R. Thus, in the depicted embodiment in which the connectors 34L, 34R, 36L, 36R include 32-pin Telco style connectors, the main board 30 includes 32 circuit paths extending between the connectors 34L, 36L and another 32 circuit paths extending between the connectors 34R, 36R.

The main board 30 also includes switches 48L, 48R for selectively breaking/interrupting the circuit paths between the front and rear connectors 34L, 34R and 36L, 36R, and electrically connecting the front connectors 34L, 34R to their corresponding daughter board 32L, 32R. The daughter boards 32L, 32R are equipped with Y×N matrices 44L, 44R, which perform the functions described with reference to switching matrices 118 and 122 in FIG. 1. The N contacts at one side of each matrix are each connected to a separate circuit path provided at their corresponding half of the main board 30. In other words, the N contacts provide the physical connectivity for the internal matrix ports 120 and 124 shown in FIG. 1. For example, where 32 circuit paths are provided at each half of the main board 30, N equals 32 and the 32 input/outputs of each matrix are adapted to be connected to the 32 circuit paths at their corresponding half of the main board 30. Y preferably represents a number less than N. In certain embodiments Y equals one-half of N. The input/outputs at Y side of the matrices are connected to the card edge extensions 38L, 38R, meaning that the edge card extensions 38L, 38R provide the physical connectivity for the service ports 126 depicted in FIG. 1.

As shown in FIG. 11, the main board 30 also includes one or more test port(s) that permit access to the various user ports and network ports of the CDU. The test ports permit access of "live" ports, meaning that a particular user port, for example, may be accessed and tested while it is in use. A unit of test equipment may be coupled to the one or more test ports to ensure that the proper signals are carried on the various user ports and network ports.

It is noteworthy that according to some embodiments, the main board 30 houses the conductive paths 106, 108 and switches 110 described with reference to FIG. 1, while the daughter boards 32L, 32R contain the switching matrices 118 and 122 (again described with reference to FIG. 1). The components on the main board 30 are relatively inexpensive, and do not vary based upon the anticipated number of subscribers desiring access to various special service, i.e., services other than POTS service. On the other hand, the elements of the switching matrices are relatively more expensive, and vary based upon the anticipated number of subscribers desiring access to various special service. Therefore, if only sixteen or fewer subscribers are anticipated to demand access to special services, the daughter boards 32L, 32R may be populated with 32×8 switching matrices, which are relatively inexpensive. On the other hand, if no more than thirty-two subscribers are anticipated to demand access to special services, the daughter boards 32L, 32R may be populated with 32×16 switching matrices, which cost more than their 32×8 counterparts. (Of course, if nearly all of the users are anticipated as wanting access to special services, the switching daughter boards 32L, 32R may be populated with 32×32 switching matrices, which cost still more). As can be seen, the cost associated with the CDU 20 increases as the number of users demanding special services increases, and decreases as the number of users demanding access to special services decreases. This means that the cost of the CDU 20 tends to increase as revenues gained from the provision of special services increases, and tends to decrease as the revenues gained from the provision of special services decreases.

Systemic Arrangements

Figure 12:
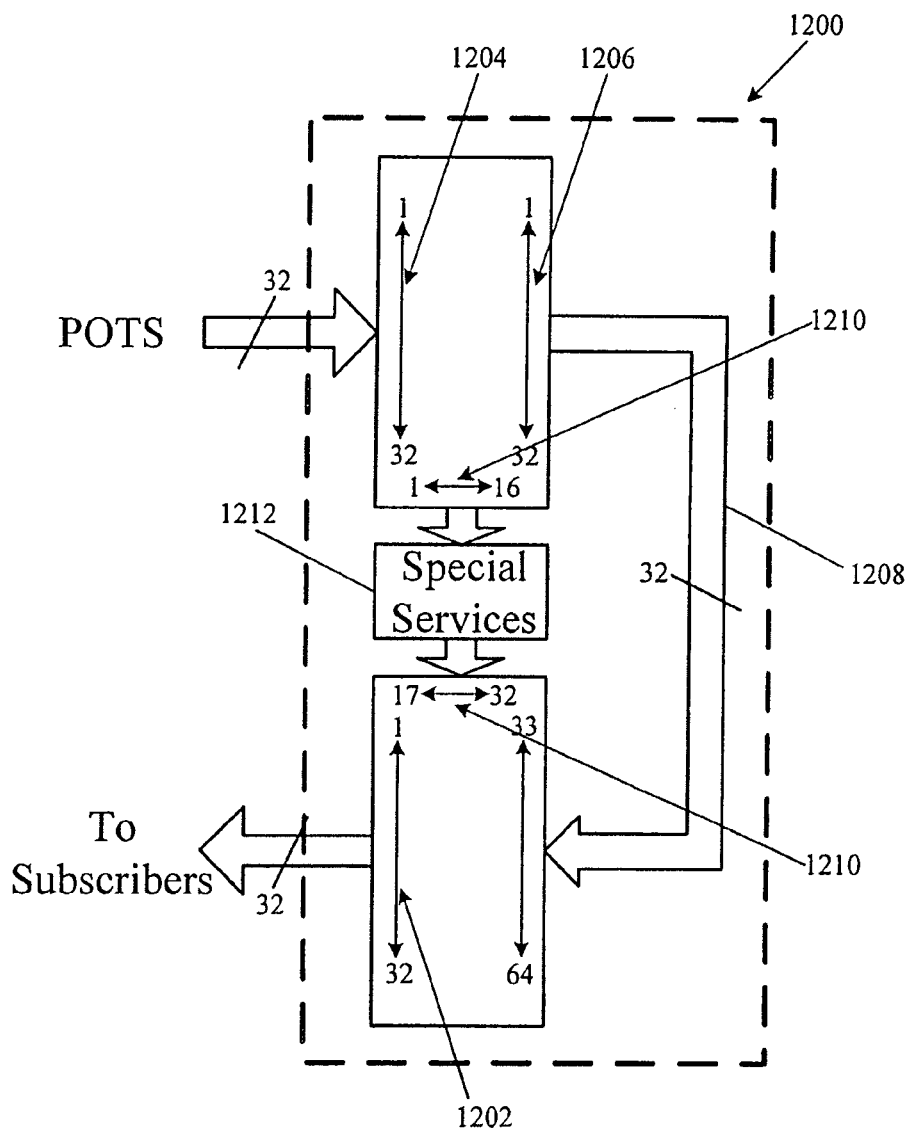
FIG. 12 depicts an exemplary embodiment of a back-to-back arrangement of a CDU.

FIG. 12 depicts a manner of connecting the various ports of a CDU 1200, in an arrangement known as a "back-to-back" configuration. As can be seen from FIG. 12, in a back-to-back configuration, a CDU having the full complement of ports as shown in FIG. 1 ends up providing thirty-two user ports 1202 (as opposed to sixty-four) and thirty-two network ports 1204 (again, as opposed to sixty-four). A POTS switch, for example, is coupled to the network ports 1204.

The ports 1206 that ordinarily would be used for connecting to the subscriber lines (as shown in FIG. 1) are looped back to connect to a corresponding such port. (These aforementioned ports 1206 are referred to as "loop ports" in this embodiment.) Thus, loop port #1 couples to loop port #33, loop port #2 couples to loop port #34, and so on. Consequently, unless redirected to a switching matrix, a signal provided by the POTS switch travels enters the CDU at a given port, e.g., network port #1, and propagates to a corresponding loop port, e.g., loop port #1. Thereafter, the aforementioned POTS signal is looped back to a corresponding loop port, e.g., loop port 32, whereupon the signal propagates to a corresponding user port, e.g., user port #1. Assuming the physical embodiments described with reference to FIG. 5-11, this means that the user ports 1202 and network ports 1204 are available from the front end of the CDU, while the loop ports 1206 are located on the back side of the CDU. The conductive path 1208 providing the connectivity between the loop ports may be physically embodied as a loop cable, for example.

The two sets of service ports of the CDU 1210 are coupled to one another. For example, service port #1 is coupled to service port #17, service port #2 is coupled to service port #18, and so on. A device 1212 that multiplexes a special service signal onto a line carrying a POTS signal is introduced on each of the lines forming the couplings between each of the various service ports. The device 1212 may, for example, be a digital subscriber line access multiplexer (DSLAM). Thus, a DSLAM is introduced on the line connecting service port #1 and service #17, a DSLAM is introduced on the line connecting service port #2 and service #18, and so on.

By virtue of the foregoing arrangement, assuming that the switch corresponding to a given network port, e.g., network port #1, is set to redirect a signal to the switching matrix, then a signal provided by the POTS switch enters the CDU at the aforementioned given port, e.g., network port #1, and propagates to a corresponding service port, e.g., service port #1. The signal is carried by a line to a device 1212, such as a DSLAM, whereupon a special service, such as DSL, is multiplexed upon the line. Thereafter the signal propagates to a corresponding service port within a second set of service ports, e.g., service port #17. The signal propagates from service port #17 to a corresponding user port, e.g., user port #1, whereupon it may be delivered to a physical plant for distribution to a particular subscriber.

The aforementioned back-to-back configuration provides the advantage of permitting special services to be provided to a user by use of a DSLAM (which multiplexes a special service signal atop a POTS signal) or similar device, rather than by use of an MSAN (which directly provides a combined special services and POTS signal).

Figure 13:
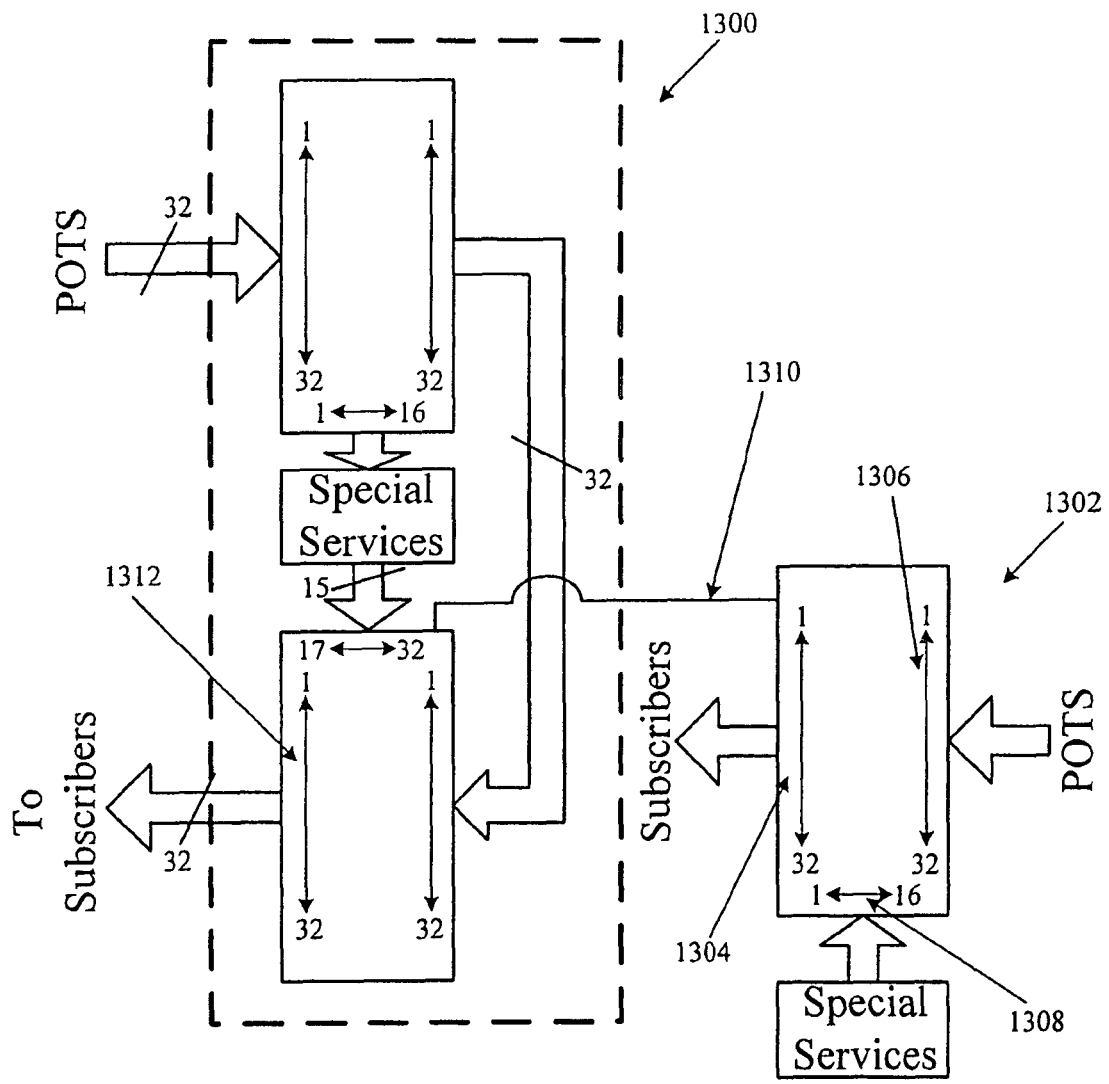
FIG. 13 depicts an exemplary embodiment of a spare services arrangement of two CDUs.

FIG. 13 depicts a manner of interconnecting two CDUs 1300 and 1302, in an arrangement known as a "spare services" configuration. (For the sake of simple illustration, the second CDU 1302 is depicted as having only thirty-two user ports 1304, thirty two network ports 1306, and sixteen service ports 1308, as opposed to the first CDU, which includes twice as many of each sort of port. Such a difference in the quantity of ports of each CDU 1300 and 1302 is not essential to the spare services configuration, and is presented herein to simplify the illustration of FIG. 13.) As can be seen from FIG. 13, the spare services configuration includes a coupling 1310 between a service port on the first CDU 1300 and a user port on the second CDU 1302.

By virtue of the foregoing arrangement, a service 1312 provided via a service port 1308 of the second CDU 1302 can be provided to a subscriber line that is coupled to the first CDU 1300. For example, a signal may propagate along a line extending from a device providing a special service 1312, and coupling to a service port 1308 of the second CDU 1302. The second CDU 1302 is commanded to assume a state whereby the aforementioned signal is directed to the user port coupling to the aforementioned line 1310, thereby entering a service port of the first CDU 1300 (in this case, it enters service port #32). The first CDU 1300 is commanded to assume a state whereby the aforementioned signal is directed to any given user port. A spare services configuration may be useful, for example if the first CDU 1300 does not directly couple to a device providing a service sought by a subscriber whose line is coupled to the first CDU 1300. It may also be useful, for example, if the demand for a particular service that is provided by a device directly coupled to the first CDU 1300 exceeds the capacity of the directly coupled device to provide such service. In either event, the sought-after service may be obtained from the second CDU 1302.

In the particular example shown in FIG. 13, only a single user port of the second CDU 1302 is coupled to a single service port of the first CDU 1300. In principle, any number of user ports of the second CDU 1302 may be coupled to a like number of service ports of the first CDU 1300. Also, in the particular embodiment, the special services are coupled to the first CDU 1300 via a back-to-back configuration, as discussed with reference to FIG. 12. Alternatively, special services may be coupled to the first CDU 1300 via a standard configuration, as discussed with reference to FIGS. 1 and 2. Similarly, special services may be provided to the second CDU 1302 via a standard configuration or via a back-to-back configuration.

Figure 14:
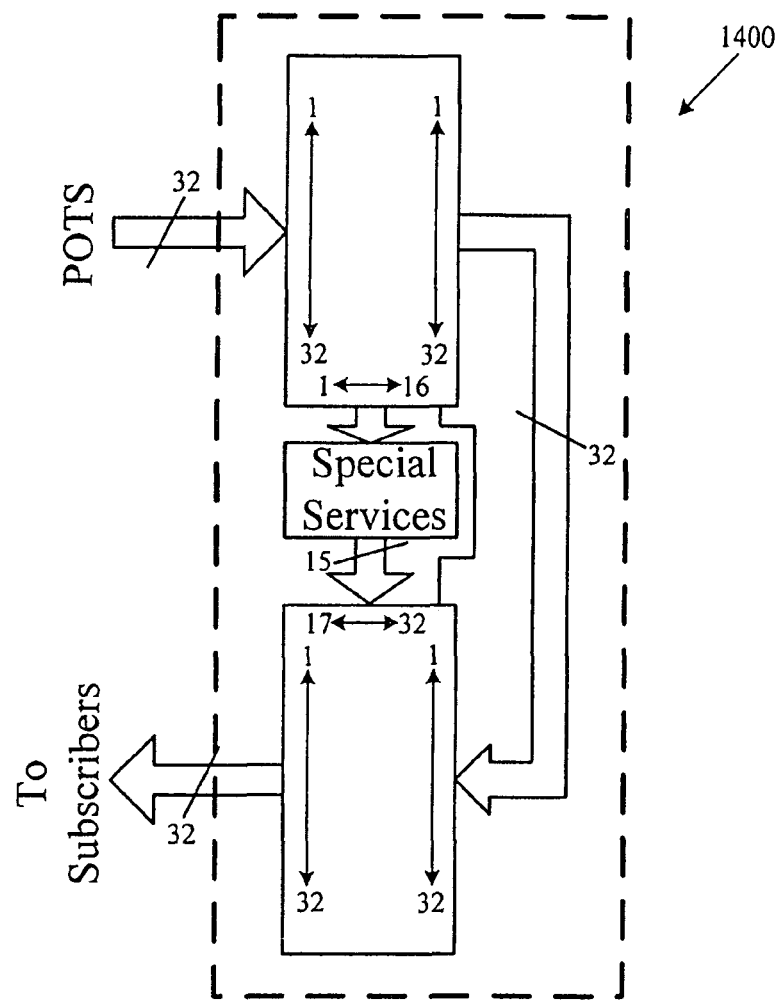
FIG. 14 depicts an exemplary embodiment of a cross-over arrangement of a CDU.

FIG. 14 depicts a manner of connecting the various ports of a CDU 1400, in an arrangement known as a "cross-over" configuration. As can be seen from FIG. 14, the ports of the CDU 1400 are coupled as described with reference to the back-to-back configuration, with one exception. In a back-to-back configuration, each of service ports #1-16 are coupled to a corresponding service port #17-32 via an intervening device that multiplexes in a special service. Per the cross-over configuration, at least one port in the first set of service ports (e.g., service port #16) is directly coupled to a corresponding port in the second set of service ports (e.g., service port #32).

The cross-over configuration allows any given network port to be coupled to any given user port, without necessitating the provision of a special service to the given user port. For example, a POTS signal may be provided on network port #12. Such a signal may be directed to service port #16, whereupon it is further directed to service port #32. Thereafter, the signal may be directed to any user port. Thus, if user port #N is to receive a POTS signal, it does not necessarily have to receive the POTS signal from a service port determined by the loop-back coupling scheme. User port #N can, instead, receive the POTS signal from any network port.

It is to be noted that in the embodiment depicted in FIG. 14, only one port in the first set of service ports (e.g., service port #16) is directly coupled to a corresponding port in the second set of service ports (e.g., service port #32). In principle, any number of ports in the first set of ports (ports #1-16) may be directly coupled to a like number of ports in the second set of ports (ports #17-32).

Figure 15:
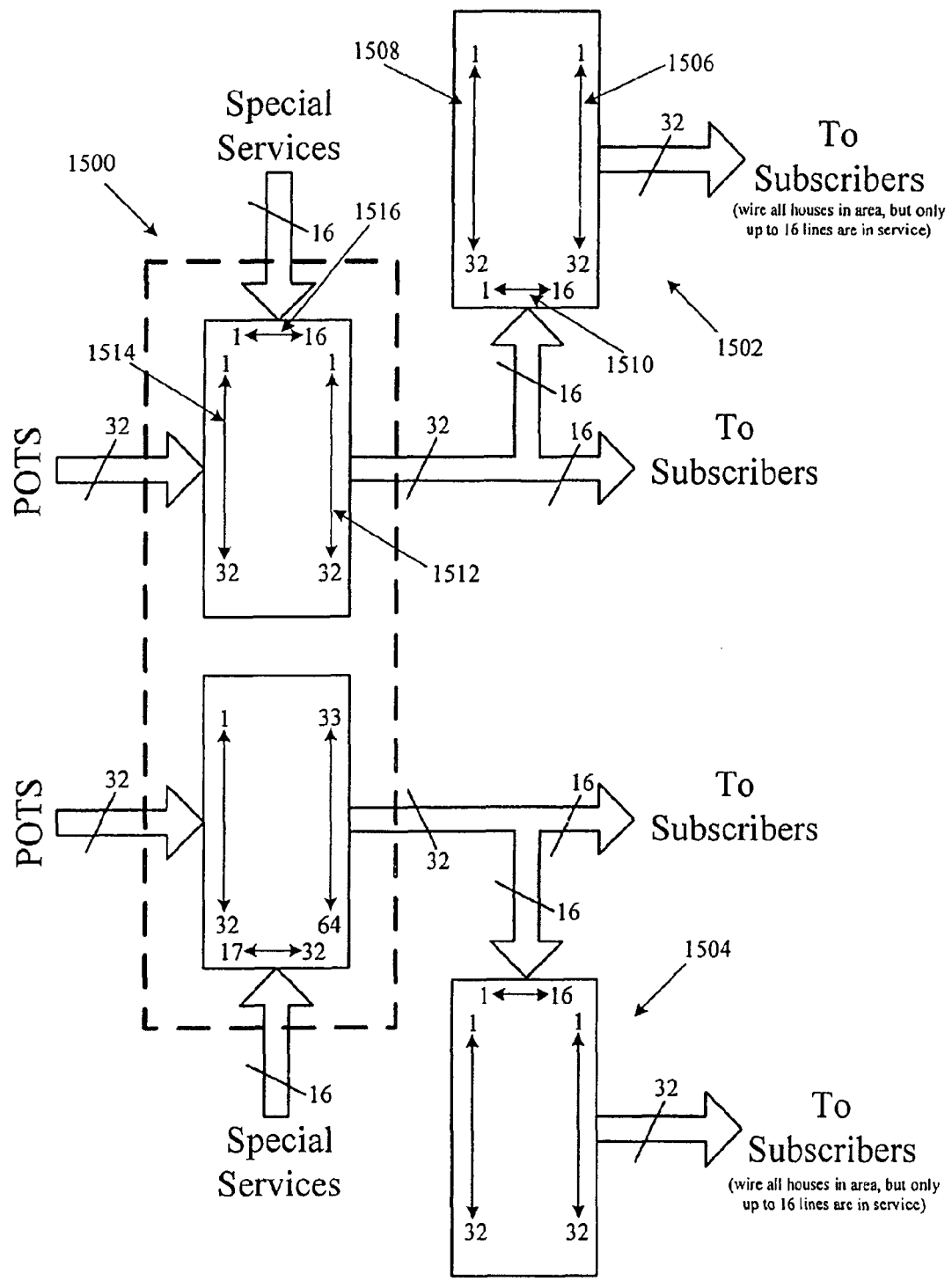
FIG. 15 depicts an exemplary embodiment of a spare user arrangement of two CDUs.

FIG. 15 depicts a manner of interconnecting two CDUs 1500 and 1502 (and/or CDUs 1500 and 1504, which are also depicted in a like configuration), in an arrangement known as a "spare user" configuration. A spare user configuration permits each of a plurality of subscriber sites to be wired to the physical plant, without necessarily providing service to each of the subscriber sites. For example, the second CDU 1502 is depicted as having thirty-two user ports 1506. Each of these ports may be coupled to a telephone line extending to a newly built home in a new division. Because not all of the homes may have people living in them, or because not all of the homes may be completed yet, it may not be desirable to provide access to each of the homes. Therefore, the second CDU 1502 does not provide service to the user ports 1506 via the network ports 1508 (the network ports may be left unconnected to any telecommunications device). Instead, up to sixteen of the user ports 1506 may be connected to the service ports 1510, which are, in turn, coupled to the user ports 1512 of the first CDU 1500. Service is then provided to up to sixteen of the user ports by way of the network ports 1514 of the first CDU (if POTS service is desired) or the service ports 1516 of the first CDU (if a special service is also desired).

It should be noted that, in the embodiment shown in FIG. 15, special services are coupled to the first CDU 1500 via a standard configuration, as discussed with reference to FIGS. 1 and 2. Alternatively, special services may be coupled to the first CDU 1300 via a back-to-back configuration, as discussed with reference to FIG. 12.

It is to be understood that any of the configurations depicted with reference to FIGS. 1, 2, 12, 13, 14, and/or 15 may be used in conjunction with any other configuration to create an interconnected network of CDUs of any quantity or size. For example, a first CDU may be coupled to a second CDU via a spare services configuration, while the second CDU is coupled to a third CDU via a spare user configuration, and so on.

Command and Control of a CDU

As mentioned previously, in instances in which the user ports, network ports and/or service ports of various CDUs are interconnected, the various CDUs are said to make up a "logical element" that implements a "model" (a model is a formal articulation of the various user ports, network ports, service ports and their interconnections). According to some embodiments, the interconnections may also be scanned and found automatically by the controller. As also mentioned previously, each user port, network port, and service port of a logical element is assigned a unique logical port number.

To control the connections formed by a logical element, a telecommunications application, such as application 308 (FIG. 3) commands a controller, such as controller 306 (again, FIG. 3) to provide a particular service to a particular logical user port. As mentioned previously, the telecommunications application does not need to determine the individual connections that must be formed for to accomplish the task of providing the desired service to the user port, nor does it need to be programmed or otherwise structured or informed of the model implemented by the logical element. Thus, for example, the telecommunications application may command the controller to connect logical user port #1 to service #1.

Figure 16:
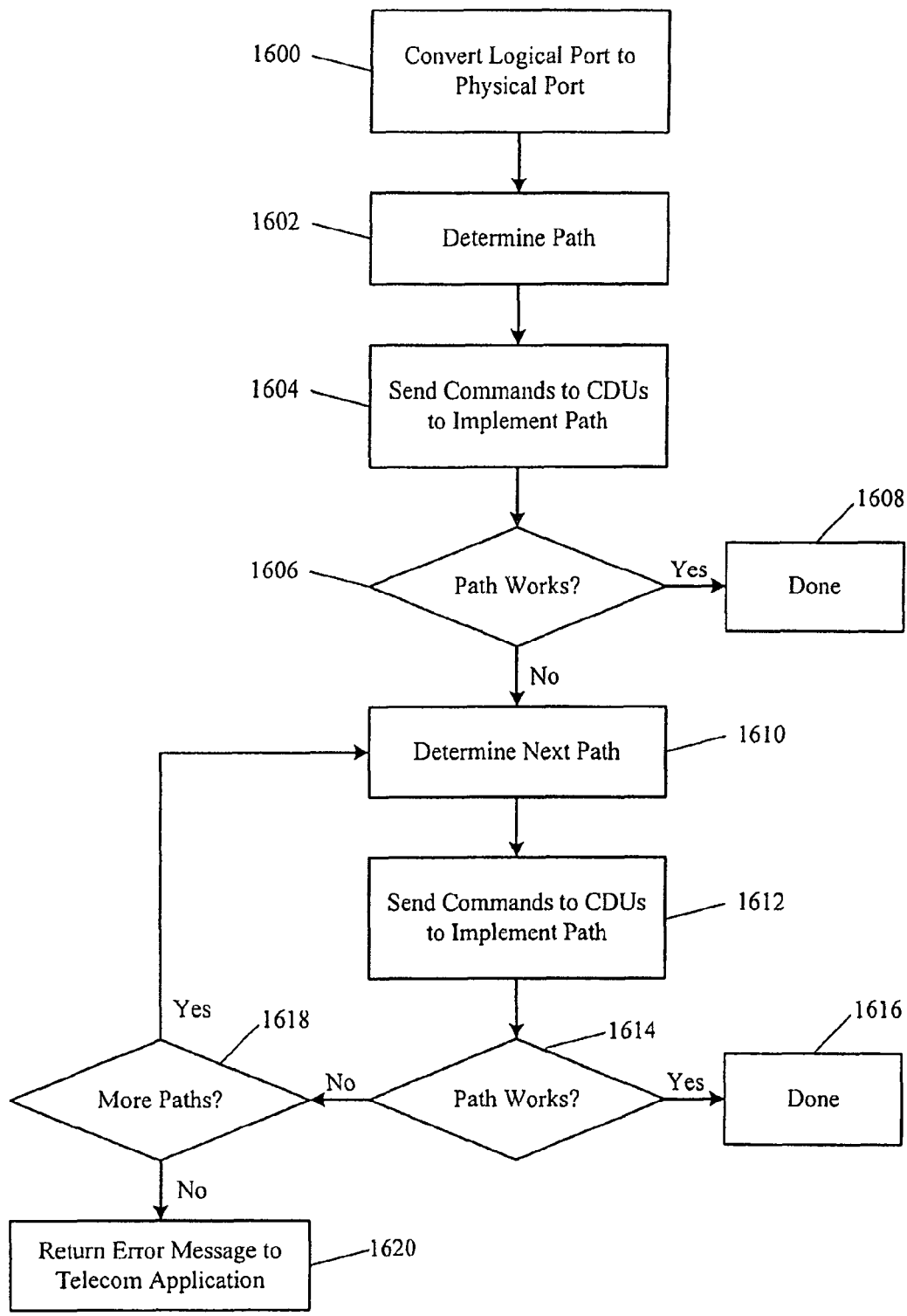
FIG. 16 depicts an exemplary embodiment of a method by which a controller may interact with a telecommunications application.

As shown in FIG. 16, the controller responds by examining a data set that contains an articulation of the model implemented by the logical element, and converting the logical port number to a physical port (operation 1600). The data set may be structured as a comma separated value (CSV) file, as an extensible markup language (XML) file, or in any other suitable format, for example. The data set includes an articulation of each port on each of the cross-connect distribution units making up the logical element, and states the logical port numbers assigned thereto. The data set further includes an articulation of an input delivered to each port on each of the cross-connect distribution units making up the interconnected system. Thus, for each port in the logical element, the data set includes an articulation of whether that port is coupled to another port (one example of an input), to a device providing a service (another example of an input), or to a physical plant (user ports are typically coupled to the physical plant). By accessing the data set, the controller may convert the logical user port into a physical port, i.e., a particular port on a particular CDU. For example, assuming the context of the exemplary logical element depicted in FIG. 17, (in which the port numbers displayed thereon represent the logical, not physical, port numbers) the controller determines that logical user port #1, corresponds to physical user port #1 on CDU #11700.

Thereafter, the controller again examines the aforementioned data set in order to determine a path, i.e., a route through the various switches and matrices making up the CDUs 1700 and 1702 of the logical element, by which service #1 may be provided to logical port #1 (operation 1602). Assuming that service #1 is provided to logical service port #17, and that service #2 is provided to logical service ports #18-31, then the controller may initially, propose a path whereby user port #1 of CDU #1 1700 is coupled to logical service port #17. Thereafter, the controller sends one or more commands to CDU #1 1700 to control its internal switches and matrices to couple user port #1 to service port #17 (operation 1604).

The controller then awaits a response from the commanded CDU(s). The controller determines whether each of the CDU(s) was able to properly complete its command (operation 1606). If so, then the operation is complete, and the desired user port has been provided with the desired service (operation 1608). On the other hand, if any one of the CDU(s) was unable to properly complete its command, then control is passed to operation 1610, whereupon another path is determined. Assuming, for example, that logical service port #17 was already coupled to another user port, then the aforementioned command to couple logical service port #17 to user port #1 on CDU #1 1700, would not be completed, and control would pass to operation 1710. Assuming, further that logical service ports 33-48 coupled to a device that provided service #1, then the following path may be suggested: couple user port #1 on CDU #1 to service port #32, and couple logical user port #33 (physical user port #1 on CDU #2) to logical service port #33 (physical service port #1 on CDU #2 1702).

Next, as shown in operation 1612, the controller sends one or more commands to CDU #1 1700 and CDU #2 1702 to control their internal switches and matrices to implement the path determined in the preceding operation. Once again, the controller then awaits a response from the commanded CDU(s). The controller determines whether each of the CDU(s) was able to properly complete its command (operation 1614). If so, then the operation is complete, and the desired user port has been provided with the desired service (operation 1616). On the other hand, if any one of the CDU(s) was unable to properly complete its command, then control is passed to operation 1618, whereupon it is determined whether or not there exists another path for accomplishing the particular command from the telecommunications application. If so, then control returns to operation 1610, and the next path is determined. If not, then an error message is returned to the telecommunications application, to inform the application that the commanded service cannot be provided to the desired logical user port.

Figure 17:
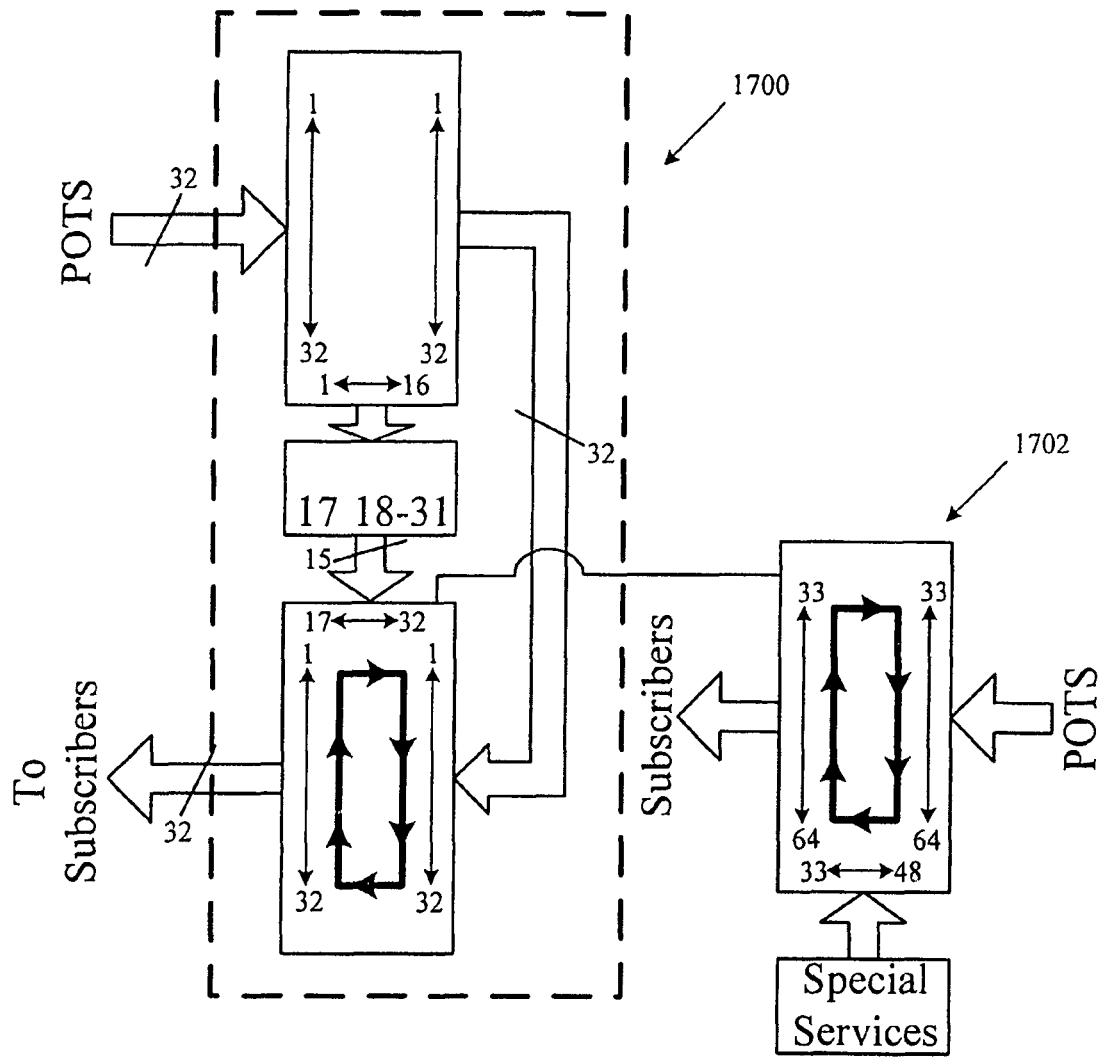
FIG. 17 depicts an exemplary search scheme to identify a proposed path to provide a particular service to a particular user port.
Figure 18:
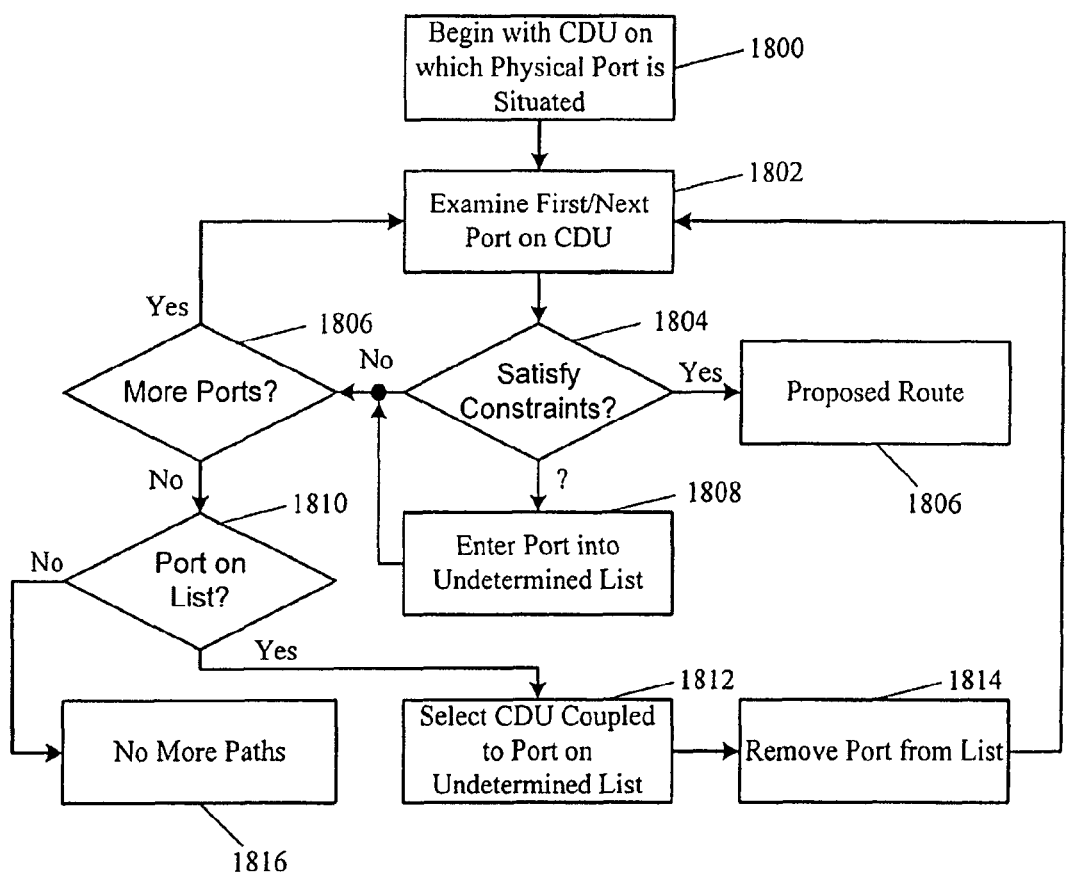
FIG. 18 depicts an exemplary search method to identify a proposed path to provide a particular service to a particular user port.

FIG. 18 depicts an exemplary embodiment of a method by which the operations 1604 and 1610 (FIG. 16) for determining a path may operate. Initially, the search for a path begins at the CDU on which the physical port is situated (operation 1800). Carrying on with the previous example, the search therefore begins at CDU #1 1700 (FIG. 17). Next, as shown in operation 1802, the first port on the CDU #1 1700 is examined. Assuming that the search begins in the upper-left hand corner of the CDU (the search may commence at any port), then logical service port #17 is examined. Then, it is determined whether or not the selected port would fulfill the constraints imposed by the telecommunications server (e.g., that service #1 be provided to logical user port #1). In this case, again assuming that service #1 is provided to logical service port #17, and that service #2 is provided to logical service ports #18-31, then it is true that such a path would satisfy the constraints. Hence, this route is proposed (operation 1807).

Again assuming that logical service port #17 is already coupled to another user port, this path will not be able to be established, so the method of FIG. 18 will be subsequently invoked (see the operation flow depicted in FIG. 16). Therefore, upon execution of operation 1802, the next logical service port is selected, i.e., logical port #18, assuming a clockwise progression (the search may proceed in any direction). Next, in operation 1804, it is again determined whether or not the selected port would fulfill the constraints imposed by the telecommunications server. In this case, it would not, because such a path would cause service #2 to be provided to logical user port #1—not service #1, as requested. Therefore, control is passed to operation 1806, whereupon it is determined whether the CDU has any more unexamined ports. In this case, the CDU does possess additional unexamined ports. Therefore, control returns to operation 1802, whereupon the next port, logical service port #3 is examined. Since logical service port #19-31 are all connected to a device providing service #2, the loop defined by operations 1802, 1804, and 1806 is traversed for each logical service port #19-31. Thereafter, the logical service port #32 is examined. Because logical service port #32 is coupled to a port of another CDU (i.e., CDU #2 1702), it is not known if such a coupling would satisfy the constraints, and therefore, logical service port #32 is entered on a list of ports to explore later (operation 1808). Thereafter, control again returns to operation 1806, whereupon it is determined whether the CDU has any more unexamined ports.

The method goes on to examine each of the remaining loop ports and user ports, and determines, at operation 1804, that none of these ports would satisfy the constraints. Therefore, the loop defined by operations 1802, 1804, and 1806 is traversed for each of these ports, until finally, it is determined at operation 1806 that no more ports exist on CDU #1 1700 to examine. Consequently, control passes to operation 1810, where it is determined if the aforementioned list of ports to explore contains any entries. According to the present example, it contains one entry, i.e., logical service #32. Thus, control is passed to operation 1812, and the CDU coupled to logical service #32 is selected, i.e., CDU #2 1702 is selected. Upon selection of CDU #2 1702, logical port #32 is removed from the aforementioned list (operation 1814), and control returns to operation 1804, where the first port on the selected CDU is examined.

As previously described, the method of FIG. 18 begins at the upper-left hand corner of CDU #2, and proceeds to search in a clock-wise fashion, traversing the loop defined by operations 1802, 1804, and 1806, until logical service port #48 is encountered. Upon encountering logical service port #48, it is determined at operation 1804 that such a path would satisfy the constraints imposed by the telecommunications application, and the path is suggested (operation 1807). (Again, the aforementioned result flows from the continued assumption that logical service ports 33-48 coupled to a device that provided service #1.) Assuming this path can be established, the method of FIG. 18 is no longer invoked by the method of FIG. 16.

The combined operation of the methods of FIGS. 16 and 18 is referred to as a "breadth-first" search. Other embodiments exist for performing breadth-first search, and are contemplated herein.

According to some embodiments, in operation 1804, it is determined whether the proposed path satisfies constraints other than simply providing a designated service to a designated logical port. In other words, the telecommunications application may instruct the controller to provide a designated service to a designated logical port, as long as the path established to do so satisfies certain constraints, i.e., the command from the telecommunications application may include: {designated logical port, designated service, constraint$_1$, constraint$_2$, . . . constraint$_N$}. Moreover, the controller may, itself, impose additional constraints upon the path to be established. Examples of such constraints include: (1) a specification of a particular network port through which the designated service must be routed; (2) a specification of a maximum amount of signal loss to be incurred by a signal carrying the designated service along its path from a device providing the designated service to the designated logical user port; (3) a specification of a maximum number of switches through which a signal carrying the designated service may propagate along its path from a device providing the designated service to the designated logical user port; (4) a specification of a particular cross-connect distribution unit through which a signal carrying the designated service must propagate along its path from a device providing the designated service to the designated logical user port; and (5) a specification of a range of network ports through which through which a signal carrying the designated service may propagate along its path from a device providing the designated service to the designated logical user port.

According to some embodiments, constraints may be logically combined. For example, assuming that the telecommunications application imposes a quantity of N constraints to be imposed upon the path to be established, the telecommunications application may further include a specification of a minimum number, M, and a maximum number, X, of constraints that must be satisfied by the proposed path. Thus, the command from the telecommunications application to the controller may include: {designated logical port, designated service, constraint$_1$, constraint$_2$, . . . constraint$_N$, M, X}. Therefore, by setting M=1 and X=N, a logical OR operation is achieved. By setting M=N and X=N, a logical AND operation is achieved. By setting M=0 and X=0, a logical NAND operation is achieved. By setting M=0 and X=N, the constraints are always satisfied (i.e., this is equivalent to a logical TRUE). Finally, by setting M=N and X=0, the constraints are never satisfied, (i.e., this is equivalent to a logical FALSE).

According to some embodiments, the constraints may be organized into sets. Therefore, a command may be accompanied by a first set of a quantity of N constraints, wherein it is designated that a minimum of M constraints must be satisfied, and a maximum of X constraints may be satisfied, wherein one of the constraints is a designation that a minimum of R constraints of a second set of a quantity of T constraints and a maximum of a quantity of S constraints of the second set may be satisfied.

Figure 19A:
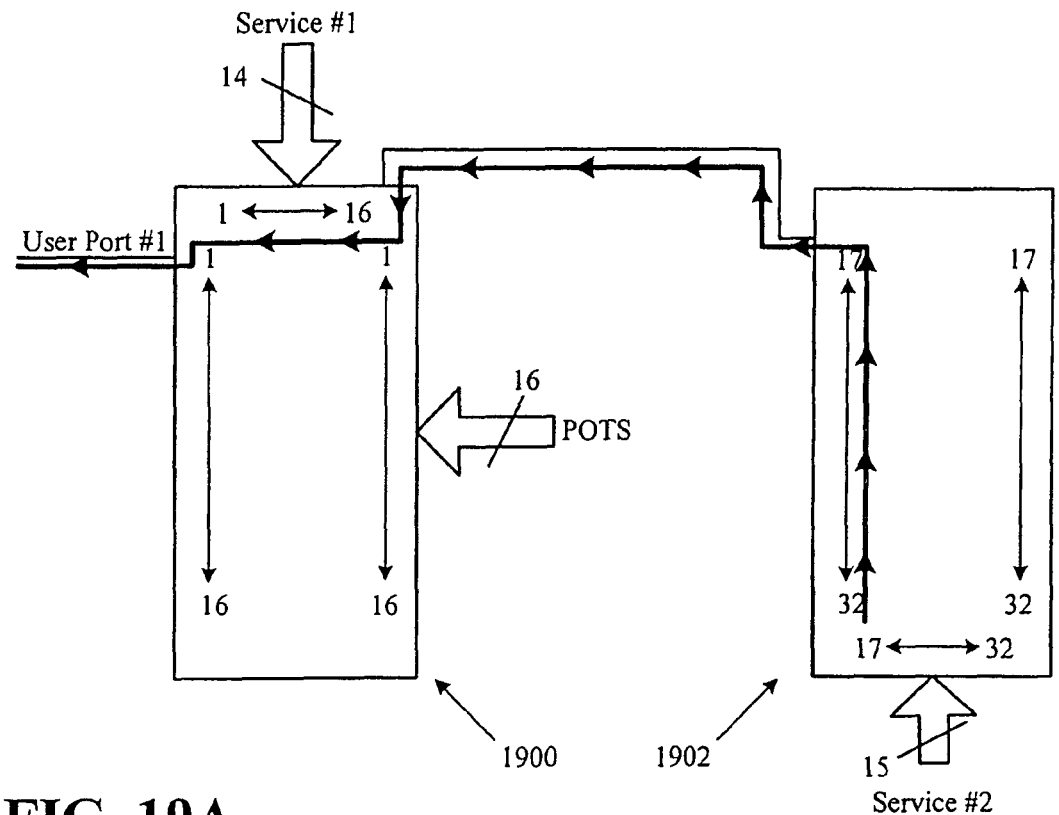
FIGS. 19A and 19B depicts the search scheme of FIGS. 16-18 being executed in a nested setting.

According to some embodiments, the breadth-first searching scheme of FIGS. 16-18 is used upon nested representations of logical elements. For example, turning to FIG. 19A, therein is shown logical elements 1900 and 1902, which are thought to make up a single logical element. Assuming that the telecommunications application commands that logical user port #1 be provided service #2, then, using the breadth-first searching scheme, the following route may be proposed: (1) connect user port #1 to logical service port #16; and (2) connect logical user port #17 to logical service port #17, as shown in FIG. 19A.

Figure 19B:
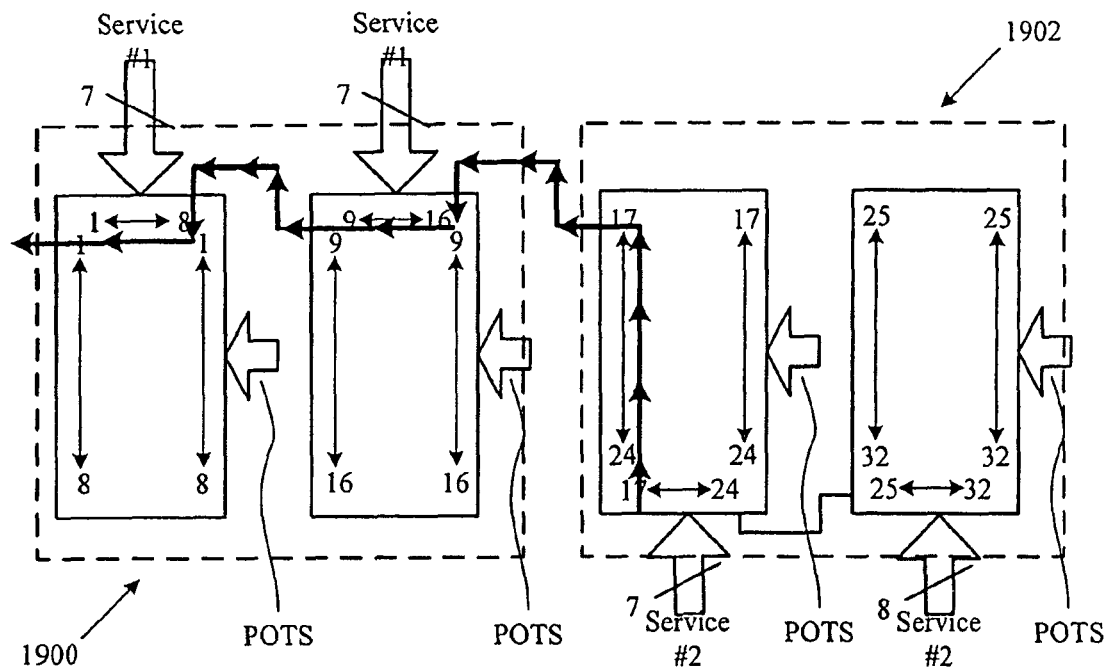

Turning to FIG. 19B, one can see that logical element 1900 is actually composed of CDU of two CDUs, and logical element 1902 is thought to make up two CDUs. The breadth-first method of FIGS. 16-18 is then run upon the first identified leg of the path, i.e., executed upon connecting logical user port #1 to logical service port #16. The result is that the following path is found: (1) connect logical user port #1 to logical service port #8; and (2) connect logical user port #9 to logical service port #16. Then, the aforementioned breadth-first method is executed upon the second identified leg of the path, i.e., executed upon connecting logical user port #17 to logical service port #17, which turns out to be as simple as connecting logical user port #17 to logical service port #17. As just shown, the breadth-first method may be executed in stages, asking for a path to be articulated in progressively less abstract terms, until a precise path is obtained.

As discussed with reference to FIGS. 16-18, the controller may access a data set containing an articulation of the model implemented by a logical element. According to some embodiments, the controller may present an image that visually presents the model. For example, the controller may present an icon representing each CDU, and may present lines interconnecting the various CDUs, thereby representing the various interconnections of the ports of the various CDUs of the logical element. Further, each of the lines may be labeled to describe the physical and/or logical port numbers assigned thereto. Also, the lines may be labeled to describe services provided thereto from external telecommunications devices.

Figure 20:
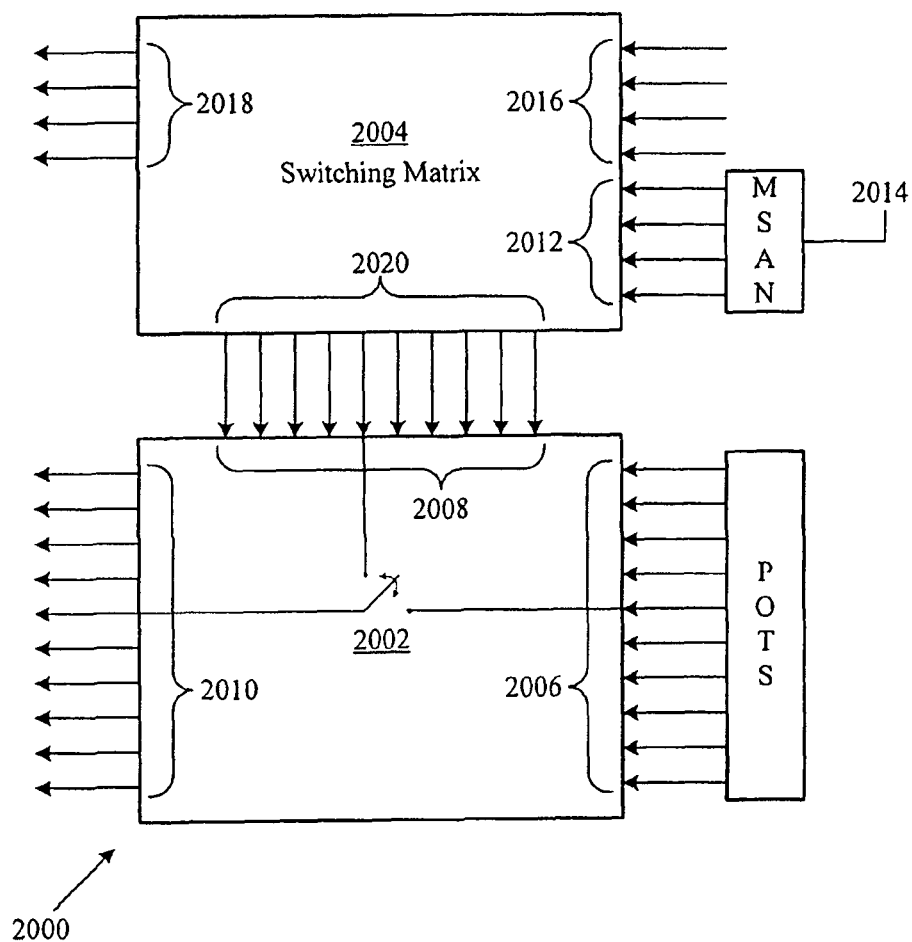
FIG. 20 is a schematic view of another CDU having features that are examples of inventive aspects in accordance with the principles of the present disclosure.

FIG. 20 shows another embodiment of a CDU. The embodiment depicted in FIG. 20 is modified to permit functionality similar to yielded by the aforementioned spare services systemic arrangement (discussed with reference to FIG. 13). However, according to the embodiment of FIG. 20, a user port is not involved in transferring a spare service from one CDU to another.

As seen in FIG. 20, a CDU 2000 includes a switching matrix 2004 and a cut-over matrix 2002. Similar to the previously presented embodiments, the cut-over matrix 2002 includes a quantity of M network ports 2006 (in the exemplary embodiment of FIG. 20, M=10, but M may be equal to any integer, in principle), a quantity of M internal matrix ports 2008, and a quantity of M user ports 2010. The switching matrix 2004 includes a quantity of N primary services ports 2012 (in the exemplary embodiment of FIG. 20, N=4, but N may be equal to any integer, in principle) that receive dedicated special services signals from a structure such as an MSAN 2014. The switching matrix 2004 also includes a quantity of N supplemental input ports 2016, a quantity of N supplemental output ports 2018, and a quantity of M internal matrix ports 2020. The supplemental input ports 2016 provide a mechanism for inputting special service signals to the switching matrix 2004 from other such switching matrices. The supplemental output ports 2018 provide a mechanism for outputting special service signals from the switching matrix 2002 to another such switching matrix. As was the case in the previously presented embodiments, the internal matrix ports 2020 allow special service signals to be routed from the switching matrix 2004 to the cut-over matrix 2006, for distribution to the user ports 2010. The supplemental output ports 2018 are not connected to the cut-over matrix 2002. A supplemental input port may also be referred to herein as a "supplemental input location," a "supplemental switching matrix input location," or by another similar term. A supplemental output port may also be referred to herein as a "supplemental output location," a "supplemental switching matrix output location," or by another similar term.

Figure 21:
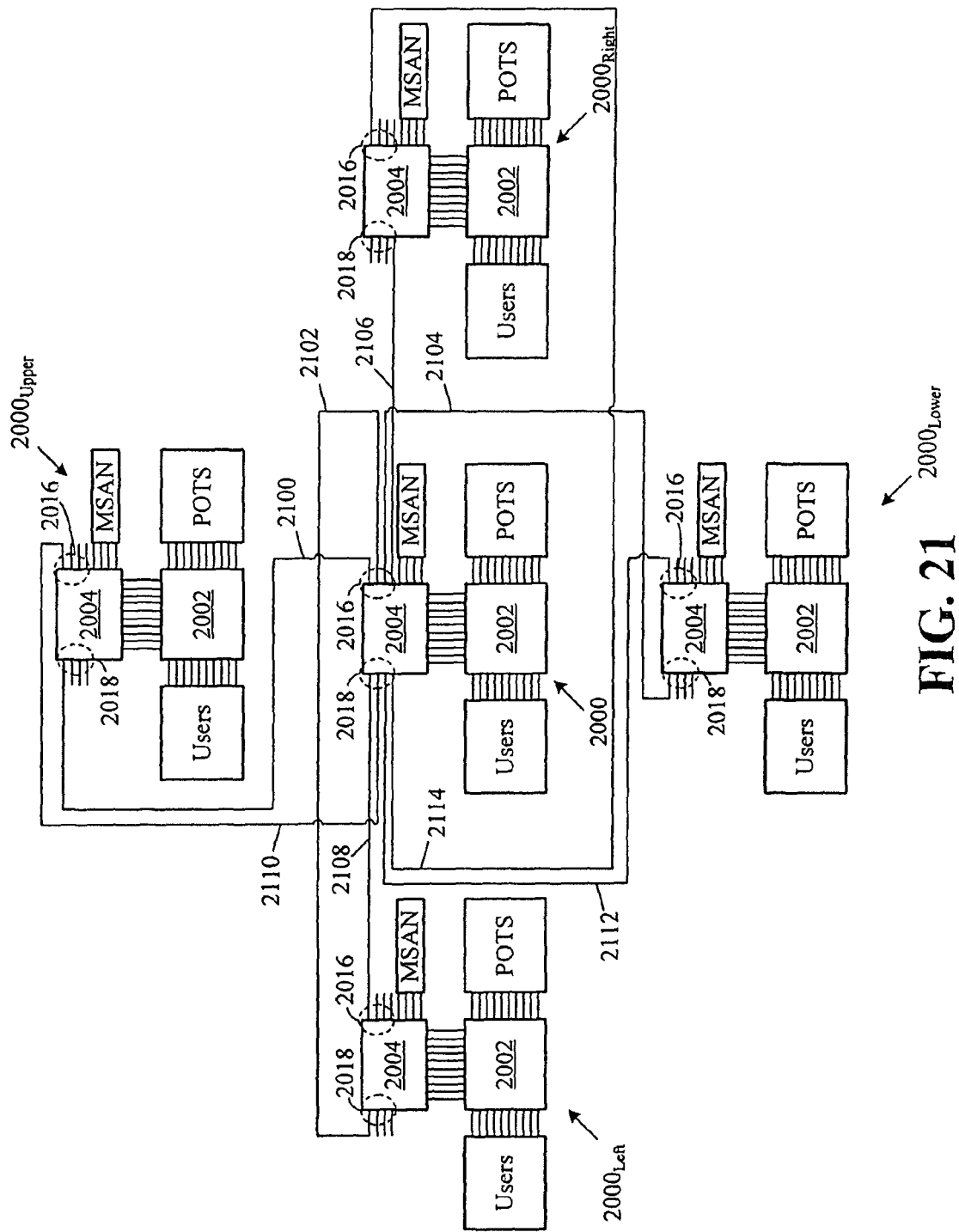
FIG. 21 is a schematic view showing the CDU of FIG. 20 incorporated into a CDU network/system.

FIG. 21 shows the CDU 2000 of FIG. 20 centrally incorporated into an exemplary logical element. Specifically, the central CDU 2000 is shown connected to an upper CDU $2000_{Upper}$, a lower CDU $2000_{Lower}$, left CDU $2000_{Left}$ and a right CDU $2000_{Right}$. Conductive lines 2100-2106 connect the supplemental input ports 2016 of the central CDU 2000 to the supplemental output ports 2018 of the upper, left, lower and right CDUs $2000_{Upper}$, $2000_{Left}$, $2000_{Lower}$ and $2000_{Right}$. Also, lines 2108-2114 connect the supplemental output ports 2018 of the central CDU 2000 to the supplemental input ports 2016 of the upper, left, lower and right CDUs $2000_{Upper}$, $2000_{Left}$, $2000_{Lower}$, and $2000_{Right}$. Lines 2100-2106 allow the central CDU 2000 to access special service signals from the surrounding adjacent four CDUs $2000_{Upper}$, $2000_{Left}$, $2000_{Lower}$, and $2000_{Right}$. Similarly, lines 2108-2114 allow the surrounding CDUs $2000_{Upper}$, $2000_{Left}$, $2000_{Lower}$, and $2000_{Right}$ to access special service signals from the central CDU 2000. It will be appreciated that the logical element depicted in FIG. 21 can be extended outwardly to increase the number of special service lines available to a given CDU. However, in view of constraints such as insertion loss, it may be desirable to limit (e.g., via software) the range of the network with respect to a given CDU. For example, in one embodiment, the network range can be limited so that a given CDU can only access special services from CDUs located within 2 step/jumps of the given CDU.

Figure 22:
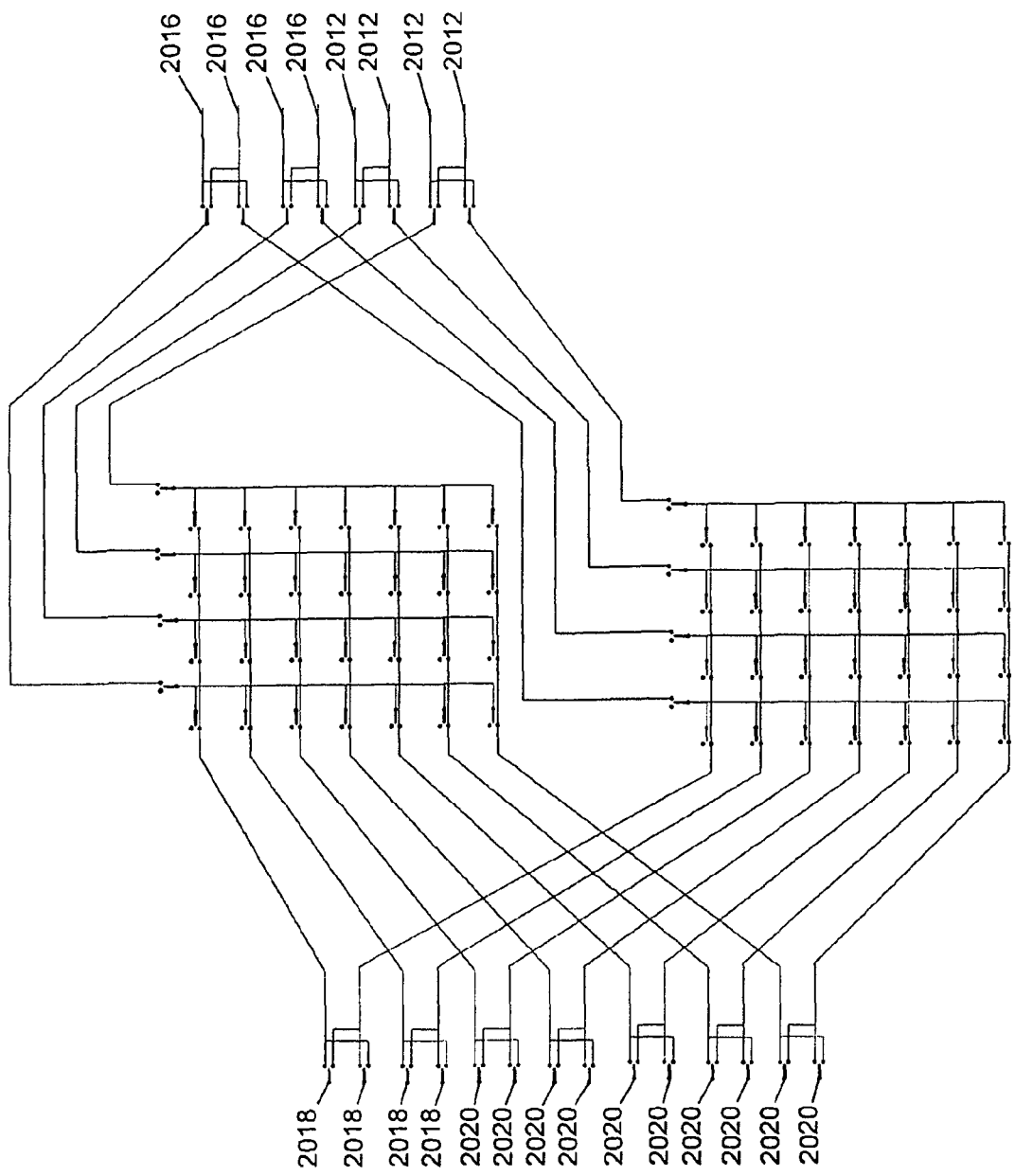
FIG. 22 is a schematic diagram of an example distribution matrix suitable for use in the CDU of FIG. 20.

FIG. 22 shows an example switch arrangement 2200 for use in the switching matrix 2004. The switch arrangement defines an 8×14 matrix. It is preferred for the switching matrices to be relatively small to minimize the number of cross points per line and to provide enhanced scalability. In certain embodiments, the number of inputs ports to the switching matrix is less than ten.

Figure 23:
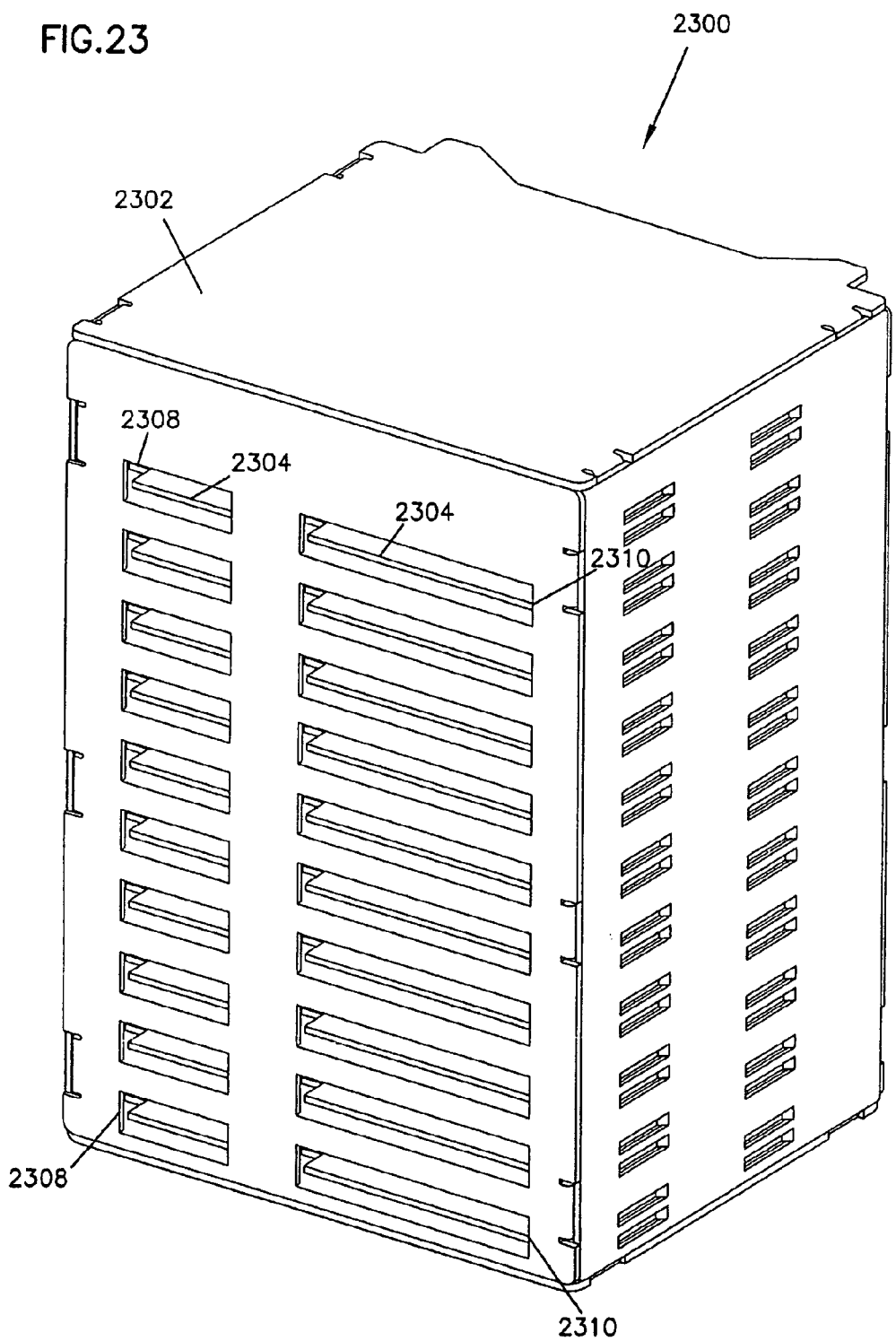
FIG. 23 is a front, top perspective view of a telecommunications distribution block having features that are examples of inventive aspects in accordance with the principles of the present disclosure.
Figure 24:
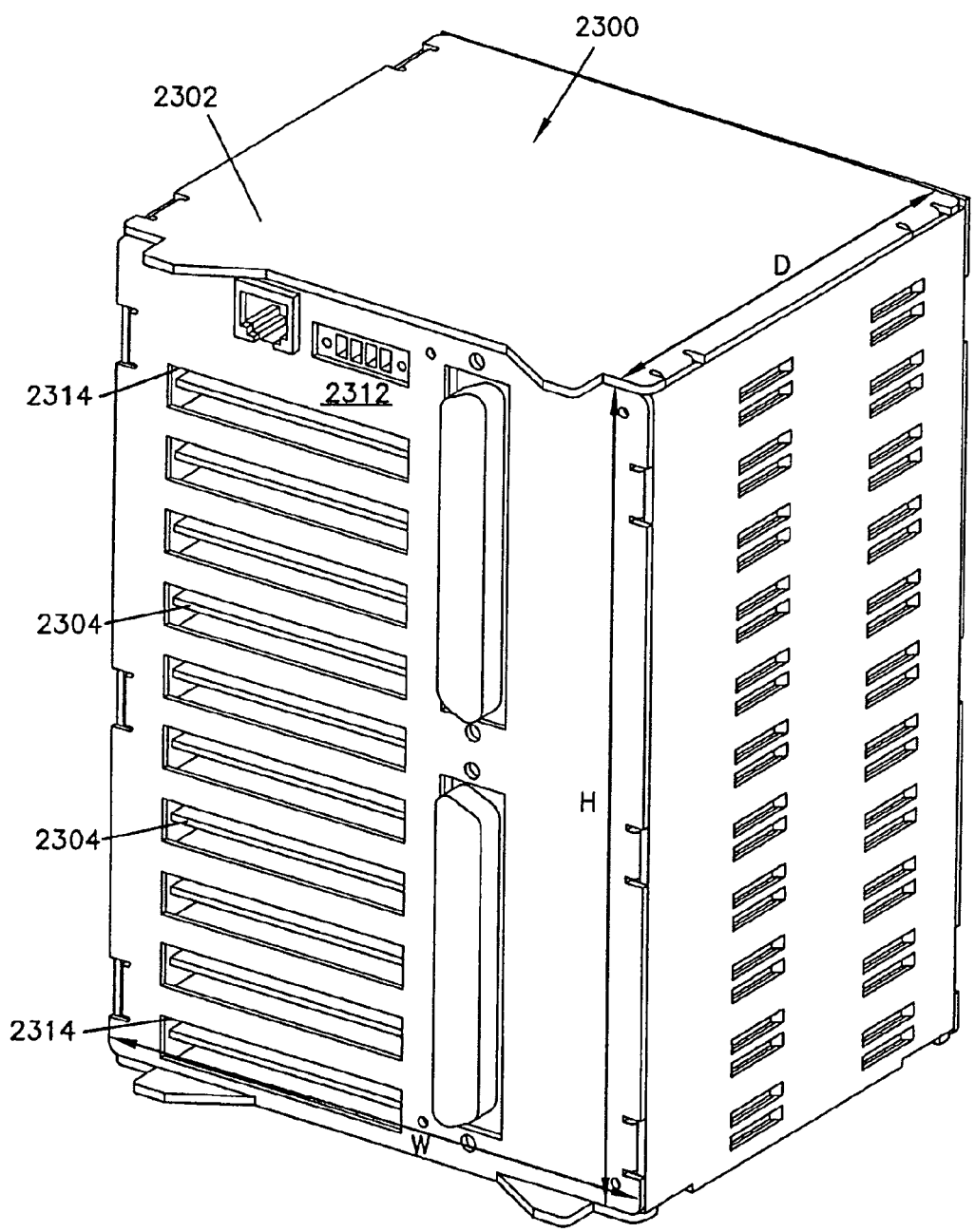
FIG. 24 is a top, rear perspective view of the telecommunications distribution block of FIG. 23.

FIGS. 23 and 24 depict an example telecommunications distribution block 2300 having features that are examples of inventive aspects in accordance with the principles of the present disclosure. The distribution block 2300 may also be referred to as a "distribution module," a "distribution unit," or like terms. The distribution block 2300 includes a generally rectangular housing 2302. The housing 2302 is sized to fit within a conventional telecommunications cabinet or to mount to a conventional telecommunications rack or frame (e.g., to vertical rails or channels). In one embodiment, the housing 2302 has a height H less than or equal to 225 millimeters (mm) and a width W less than or equal to 135 mm. In certain embodiments, a depth D of the block (including the connectors) is in the range of 98-130 mm. It is preferred for the block to fit within the footprint of a standard existing cable termination head. This facilitates replacing existing termination heads and also allows new installations to be constructed without extra space to accommodate the matrices. It is preferred for the block to use similar handling/installation procedures compared to cable termination heads currently in use to reduce cost related to training and handling.

The housing 2302 of the block 2300 is adapted to hold a plurality of matrix cards 2304. As depicted in FIGS. 23 and 24, the matrix cards 2304 are positioned one above the other within the housing 2302 and are generally parallel to one another. In the depicted embodiment, the housing 2302 is configured to hold ten separate matrix cards 2304. A front side 2306 of the housing 2302 defines openings 2308 and 2310 arranged in two vertical columns. A back side 2312 of the housing 2302 defines another vertical column of openings 2314.

Figure 25:
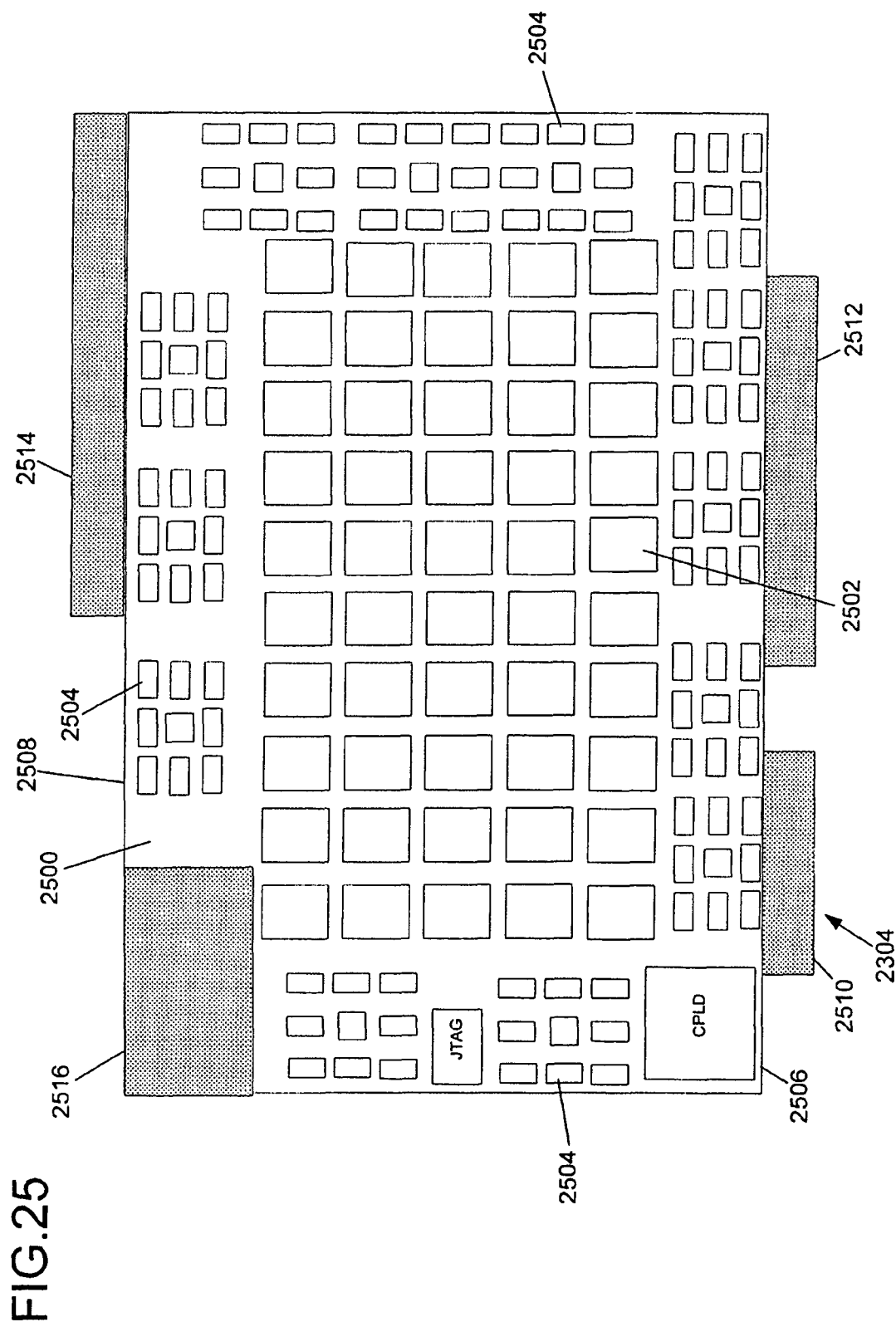
FIG. 25 is a schematic, plan view of a matrix card adapted to be mounted in the telecommunications distribution block of FIGS. 23 and 24.

Referring to FIG. 25, each matrix card 2304 includes a circuit board 2500 supporting the switching matrix 2004 and the cut-over matrix 2002 of the CDU 2000. The matrices 2002 and 2004 are composed of relays 2502 mounted on the board 2500. According to other embodiments, the matrices may be composed of other forms of electrical switches (transistors, etc.), as understood in the art. The circuit board 2500 also supports circuitry 2504 for driving the relays 2502.

Figure 26:
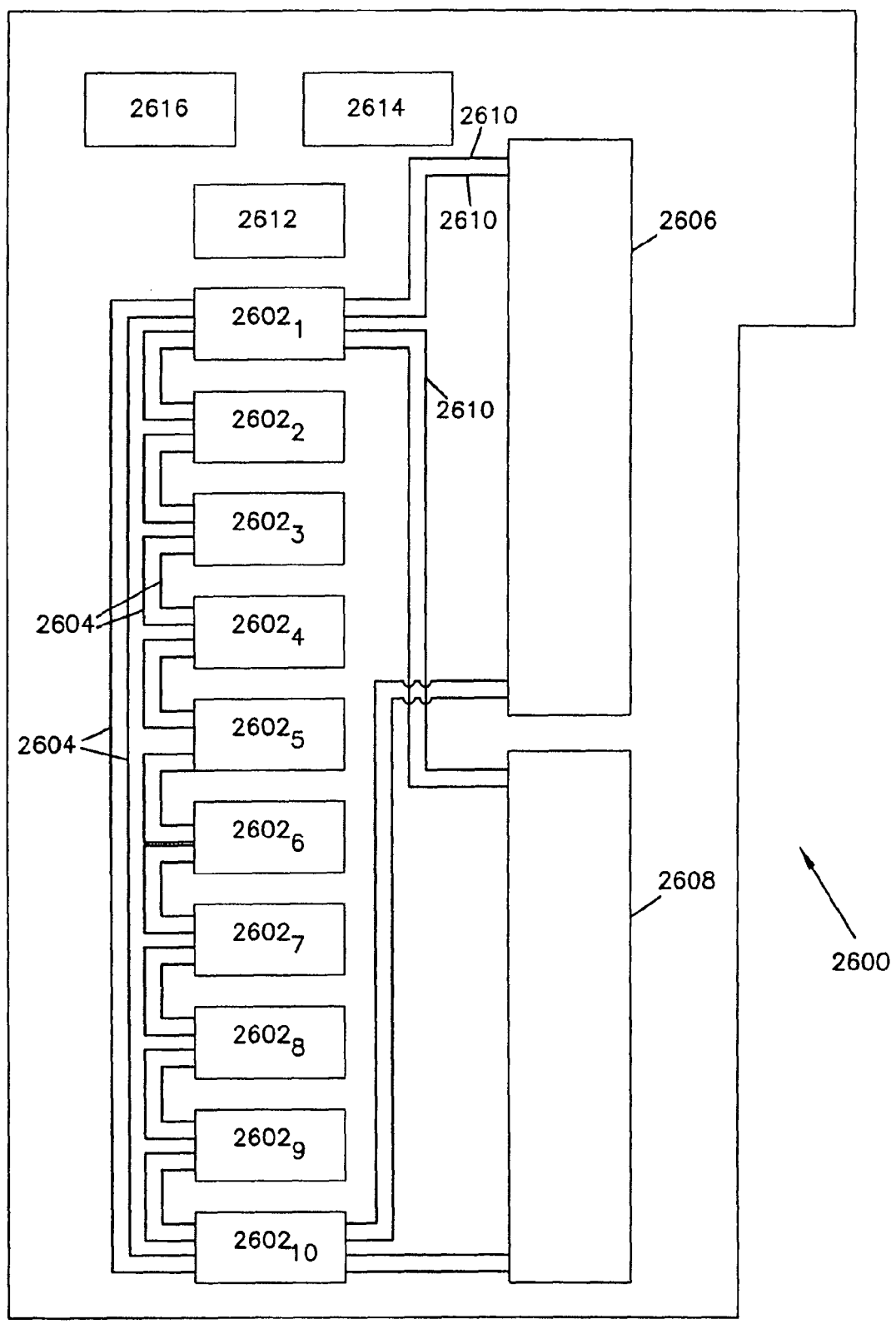
FIG. 26 is a schematic view of a back-plane circuit board adapted to be used within the telecommunications distribution block of FIGS. 23 and 24.

Referring still to FIG. 25, the depicted matrix card 2304 includes a front edge 2506 and a back edge 2508. Card edge connectors 2510 and 2512 are provided at the front edge 2506 and card edge connectors 2514, 2516 are provided at the back edge 2508. The card edge connector 2510 defines the network ports 2006 of the cut-over matrix 2002, and the card edge connector 2512 defines the service ports 2012 of the switching matrix 2004. The card edge connector 2514 defines the user ports 2010 of the cut-over matrix 2002, and the card edge connector 2516 is adapted to interconnect the matrix card 2304 with a backplane board 2600 (see FIG. 26) of the distribution block 2300.

Referring to FIG. 23, when the matrix cards 2304 are mounted within the housing 2302, the connectors 2510 and 2512 respectively project forwardly through the columns of openings 2308 and 2310 defined by the front 2306 of the housing 2302. Also, the connectors 2514 project rearwardly through the column of openings 2314 defined at the back side 2312 (see FIG. 24) of the housing 2302. In use, termination blocks can be mounted on the connectors 2510, 2512 and 2514. An example termination block support insulation displacement connector blades that facilitate terminating twisted pair wires to the connectors 2510, 2512, and 2514. An example termination block adapted to mount on a card edge is sold under the name LSA Plus by ADC Gmbh. Example termination blocks are shown in U.S. patent application Ser. No. 10/938,342, that is hereby incorporated by reference in its entirety.

When the matrix cards 2304 are mounted within the housing 2302 of the block 2300, the connectors 2516 fit within corresponding connectors $2602_1$-$2602_{10}$ provided on the back plane circuit board 2600 (see FIG. 26) of the block 2300. The back plane circuit board 2600 is mounted within the housing 2302 of the block 2300 adjacent to back side 2312 (see FIG. 24) of the housing 2302. The back plane circuit board 2600 includes tracings 2604 or other circuitry that electrically interconnect the matrix cards 2304 of the block 230. For example, the tracings 2604 provide electrical interconnections between supplemental input ports 2016 and supplemental output ports 2018 of adjacent matrix cards 2304 within the housing 2302. In this way, all of the matrix cards 2304 within the housing 2302 are interconnected form a logical element that allows a given matrix card 2304 to access special services from another matrix card 2304 that has extra capacity.

The back plane circuit board 2600 also supports two block interconnect connectors 2606 and 2608 that are accessible from the back side 2312 (see FIG. 24) of the housing 2302. The back plane circuit board 2600 also includes tracings 2610 or other circuitry for electrically connecting supplemental input ports 2016 of the matrix cards 2304 to the connector 2606, and supplemental output ports 2018 of the matrix cards 2304 to the connector 2608. In the depicted embodiments, each of the matrix cards 2304 will have two of the supplemental input ports 2016 coupled to the connector 2606 and two of the supplemental output ports 2018 connected to the connector 2608. The connectors 2606 and 2608 allow patch cables or jumper cables to be used to interconnect two blocks within a cabinet so that the network of available special services locations can be expanded from block to block. In this way, it is possible to share special services between blocks. For clarity, the tracings 2610 are only shown with respect to connectors $2602_1$ and $2602_{10}$. In actual practice, similar tracings 2610 are provided for each of the connectors $2602_1$-$2602_{10}$.

The back plane circuit board 2600 further includes a connector 2612 adapted to interface with a control card 2900 (see FIG. 29) of the block 2300. When the control card 2900 is mounted within the block 2300, the connector 2612 allows the card 2900 to interface with the matrix cards 2304 through the back plane circuit board 2600. The back plane circuit board 2600 also supports a power plug 2614, and an exterior plug 2616 (e.g., NRJ-45 or R1-485 connector) for interfacing with the control card 2900.

Figure 27:
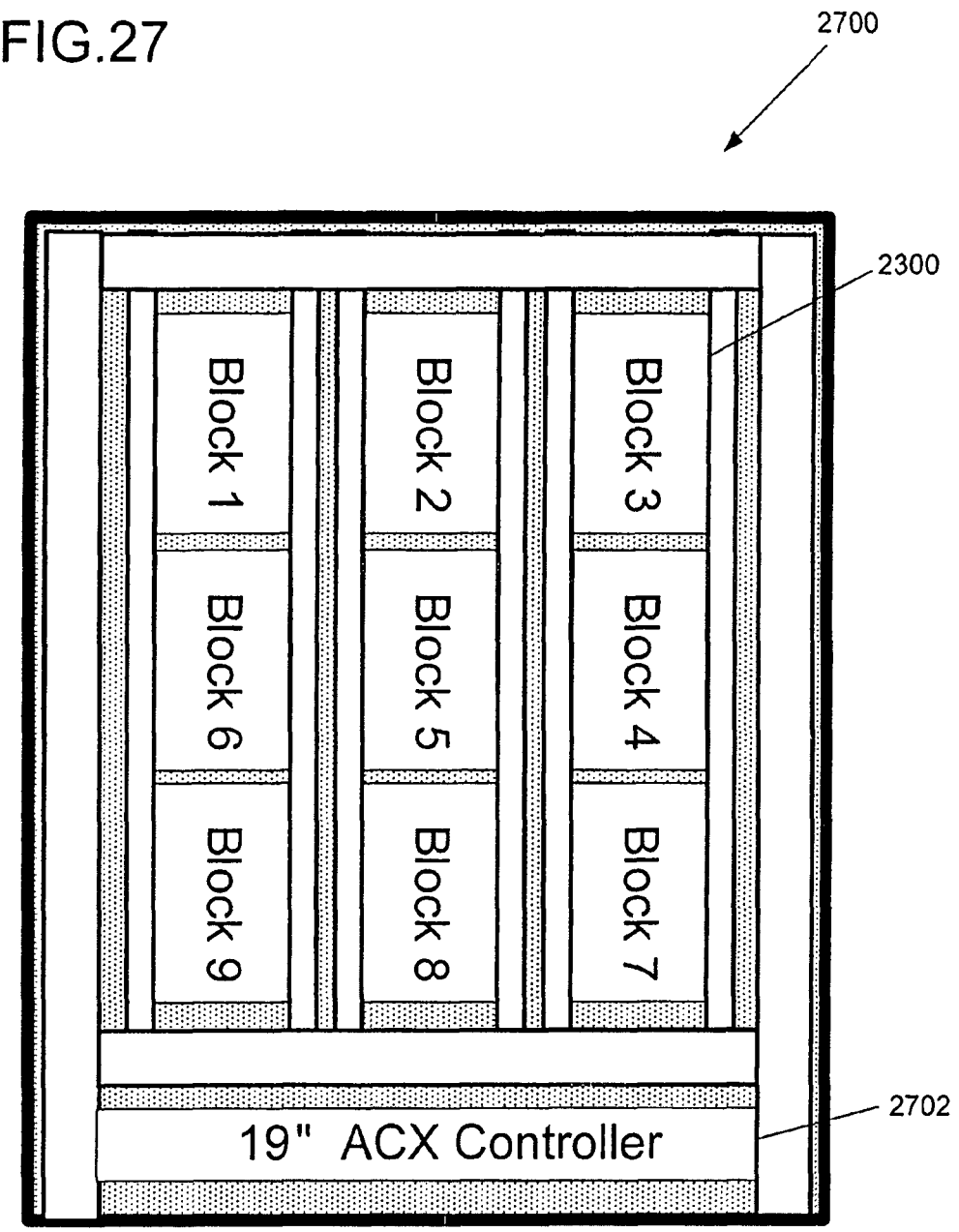
FIG. 27 is a schematic view of a distribution cabinet housing a plurality of the telecommunications distribution blocks of FIGS. 23 and 24.

FIG. 27 shows a cabinet 2700 housing nine of the blocks 2300. In principle, a cabinet may be dimensioned to hold any number of such blocks 2300. The cabinet 2700 also holds a main controller 302 that interfaces with the individual control cards 2900 (see FIG. 29) of each of the blocks 2300.

Figure 28:
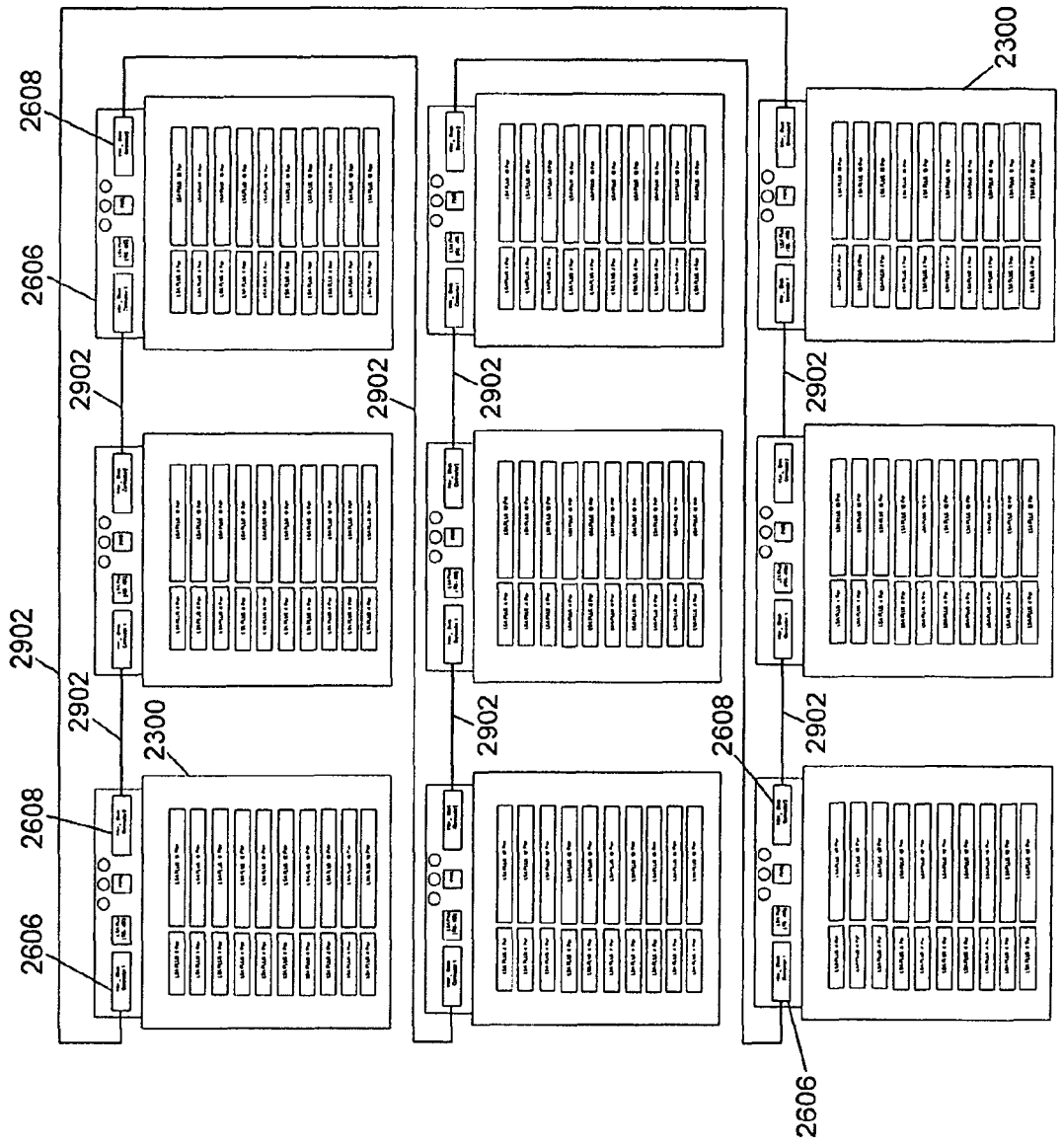
FIG. 28 is a schematic diagram showing a first interconnection option for interconnecting the telecommunications distribution blocks within the distribution cabinet of FIG. 27.
Figure 29:
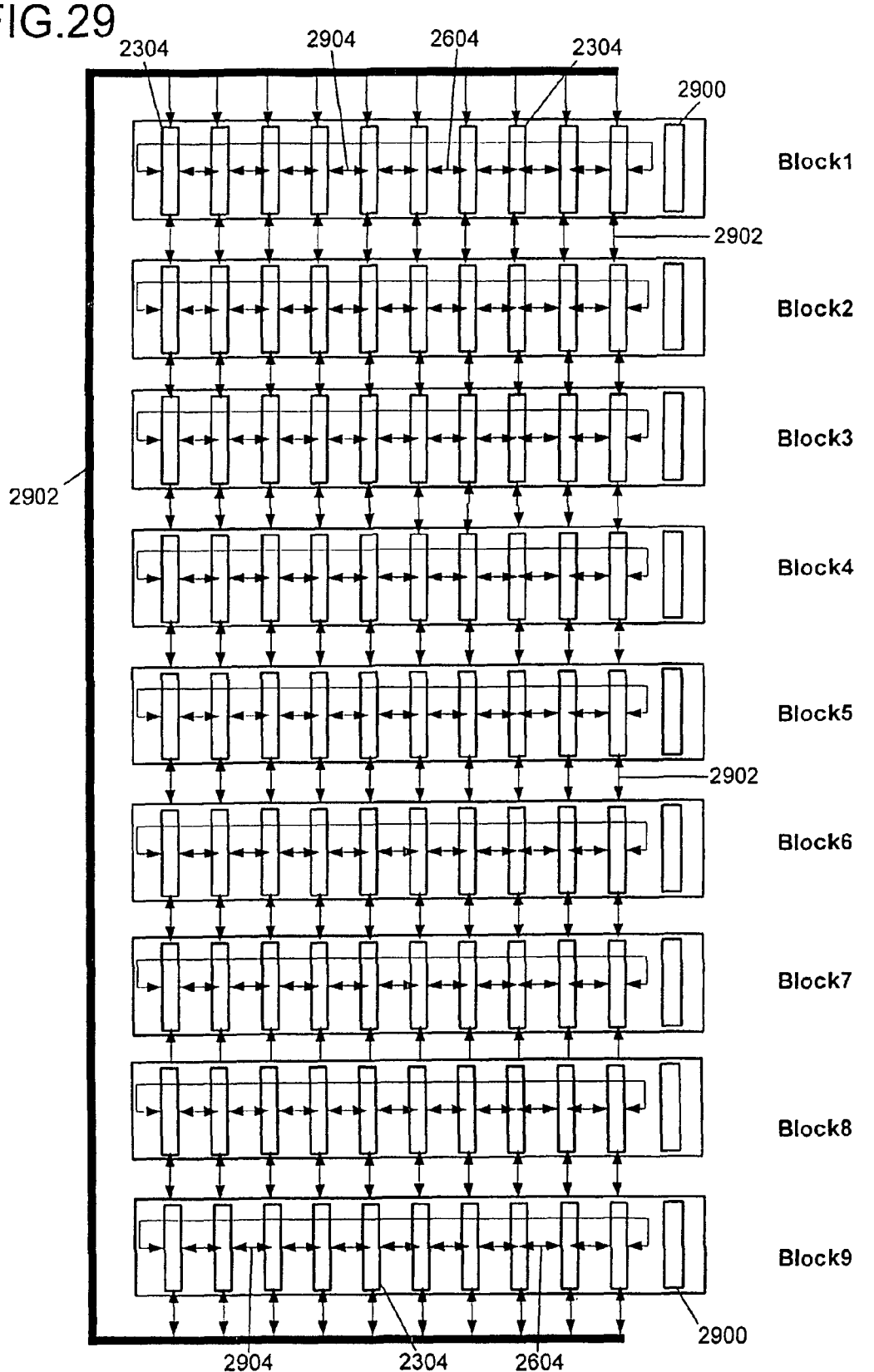
FIG. 29 is another schematic diagram showing the first interconnection option for interconnecting the blocks of the distribution cabinet of FIG. 27.

Referring to FIGS. 28 and 29, a column-style interconnection arrangement for interconnecting the blocks 2300 within the cabinet 2700 is shown. In the depicted embodiment, cables 2902 routed between the connectors 2606 and 2608 provide interconnections between the blocks 2300. The back plane circuit boards 2600 provide interconnections 2904 between the matrix cards 2304 of the blocks 2300. This interconnection (e.g., chaining, cascading, etc.) of CDUs at the card level and at the block level allows the capacity/sizes of the CDUs to be linearly expanded.

The main controller 2702 (see FIG. 27) can be connected to one of the blocks 2300 by a cable routed to the plug 2616 (see FIG. 26) corresponding to the control card 2900 (see FIG. 29) of the block 2300. Conductive cables connect the controller 2702 to the control cards 2900 of the remainder of the blocks 2300.

Figure 30:
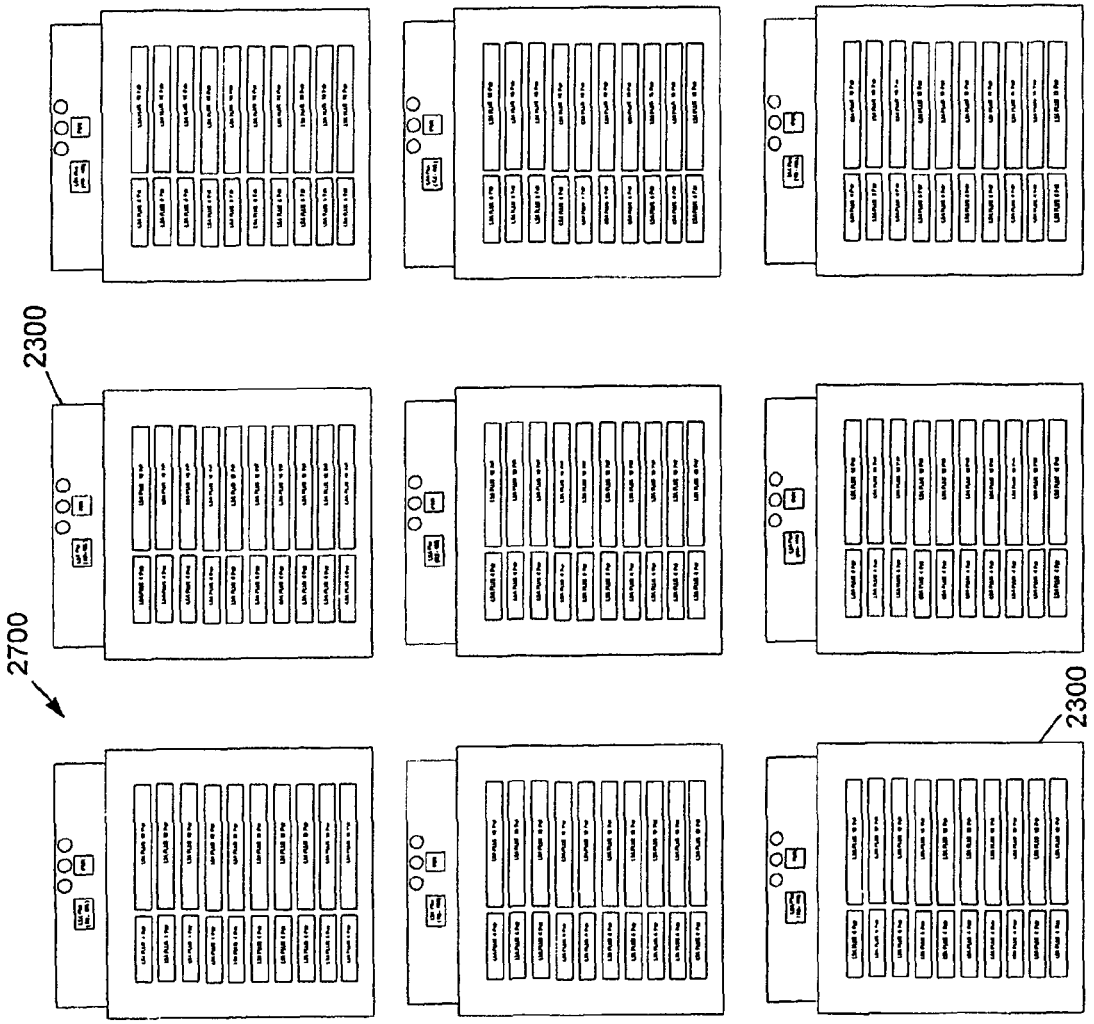
FIG. 30 is a schematic diagram showing a second interconnection option for the distribution cabinet of FIG. 27.
Figure 31:
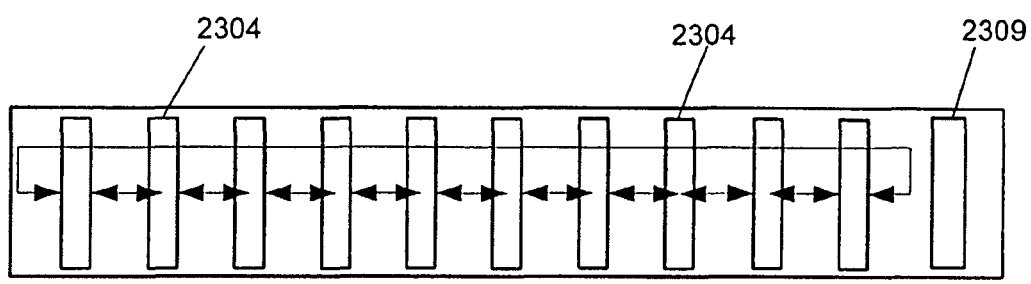
FIG. 31 shows a block level interconnection scheme for the interconnection option of FIG. 30.

FIGS. 30 and 31 show an alternative interconnection option for the cabinet 2700 of FIG. 27. In this embodiment, the matrix cards 2304 of each block 2300 are interconnected to one another through their respective back planes 2600. However, no interconnections are provided block-to-block.

Figure 32:
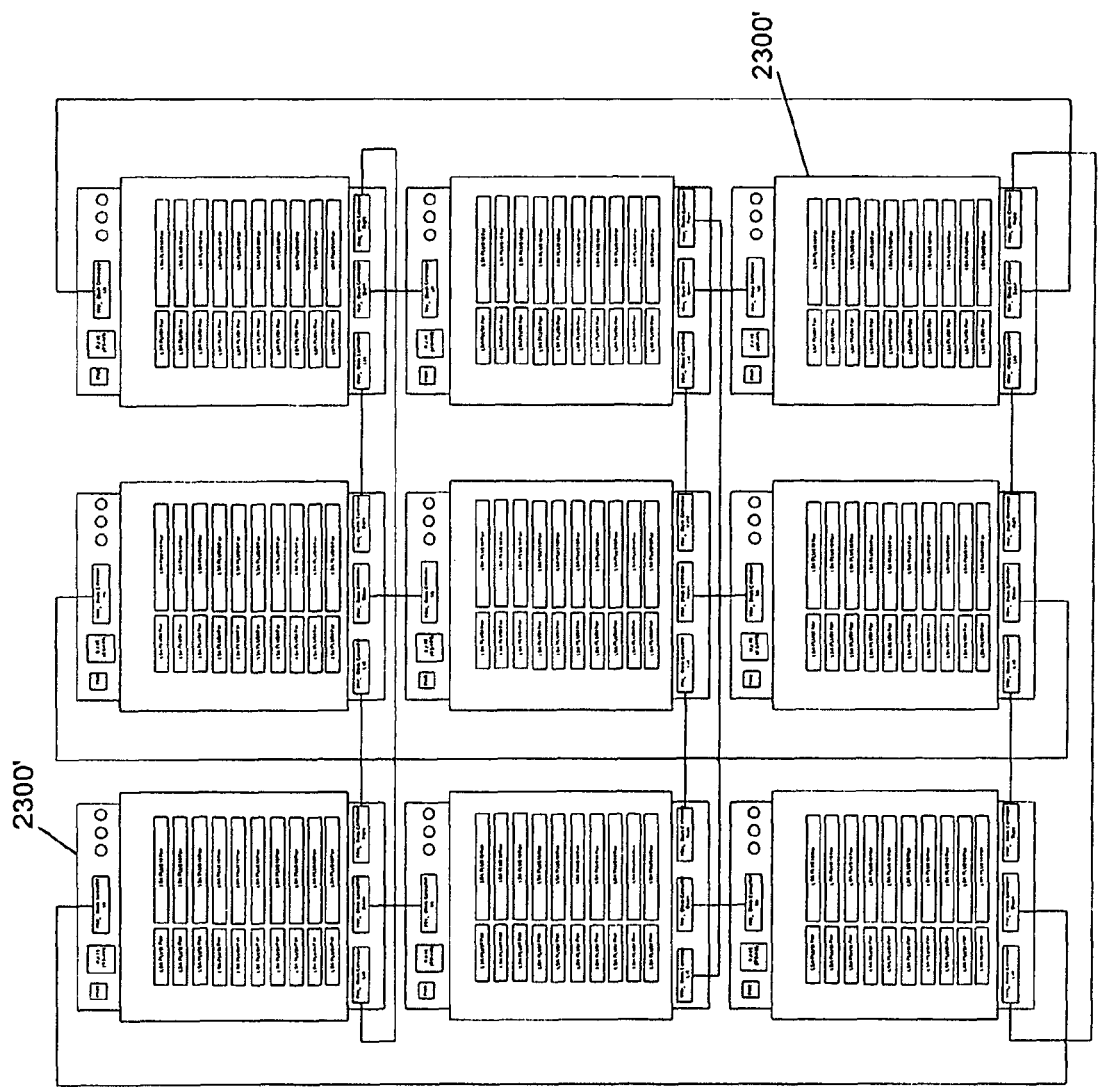
FIG. 32 is a schematic diagram of the distribution cabinet having telecommunications distribution blocks interconnected in a matrix-style network.
Figure 33:
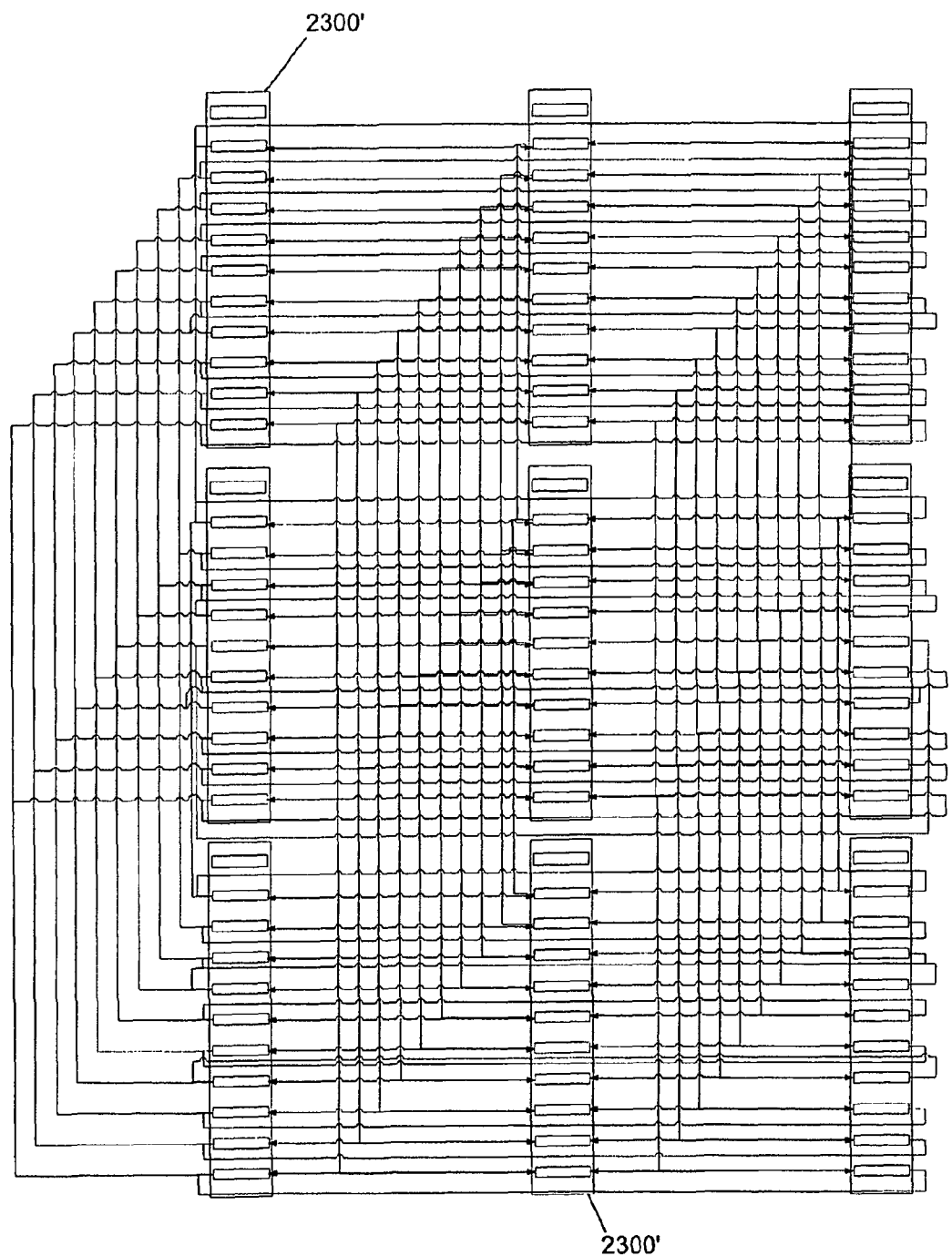
FIG. 33 is another schematic depiction of the interconnection scheme of FIG. 32.

FIGS. 32 and 33 show a further interconnection arrangement for a cabinet. The embodiment of FIGS. 32 and 33 includes blocks 2300' that have been modified to each include four block-to-block connectors. The connectors allow the blocks to be connected together by cables in a matrix style of interconnection.

Figure 34A:
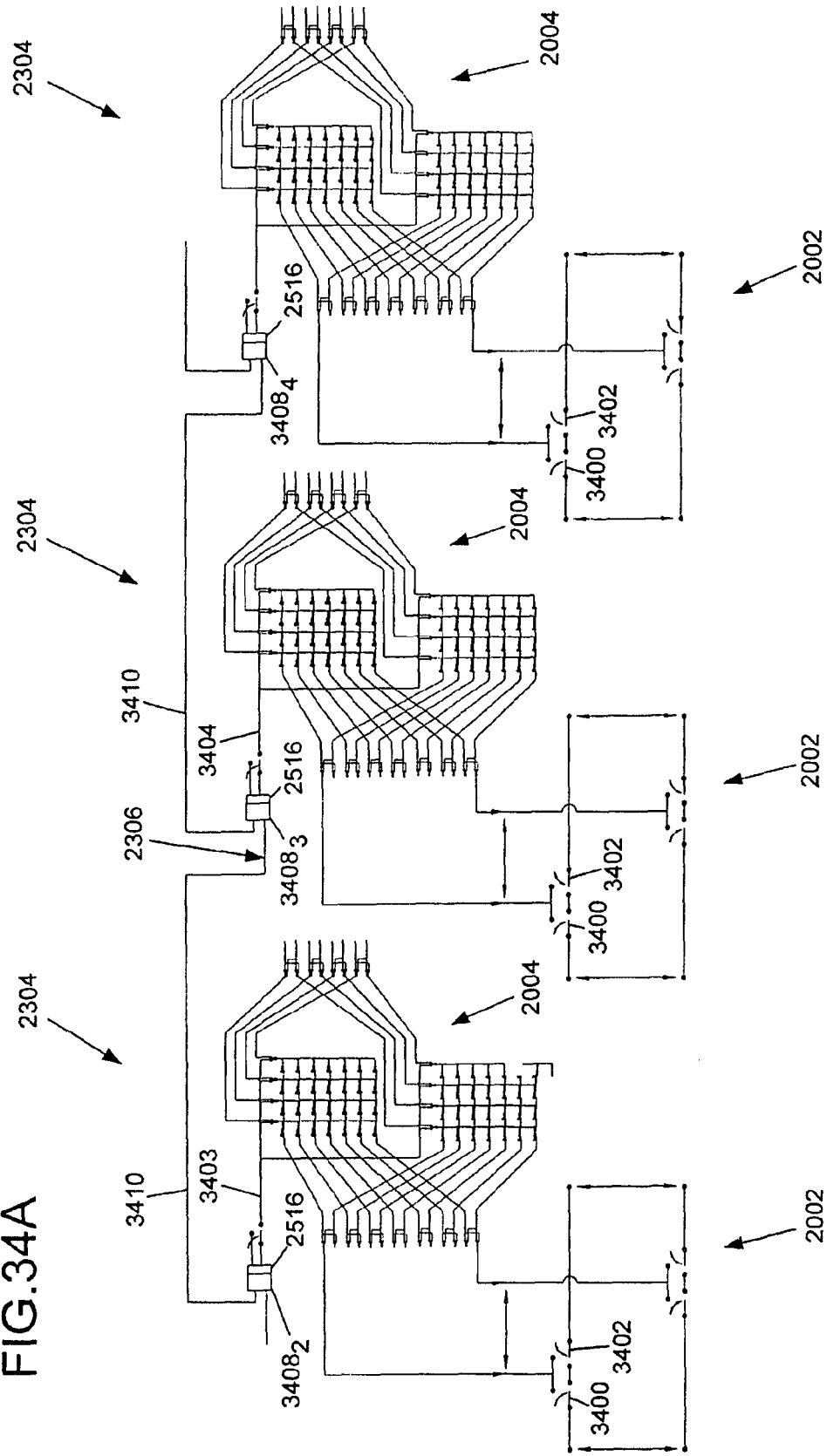
FIG. 34A is a schematic circuit diagram showing a plurality of matrix cards linked together by a test bus.
Figure 34B:
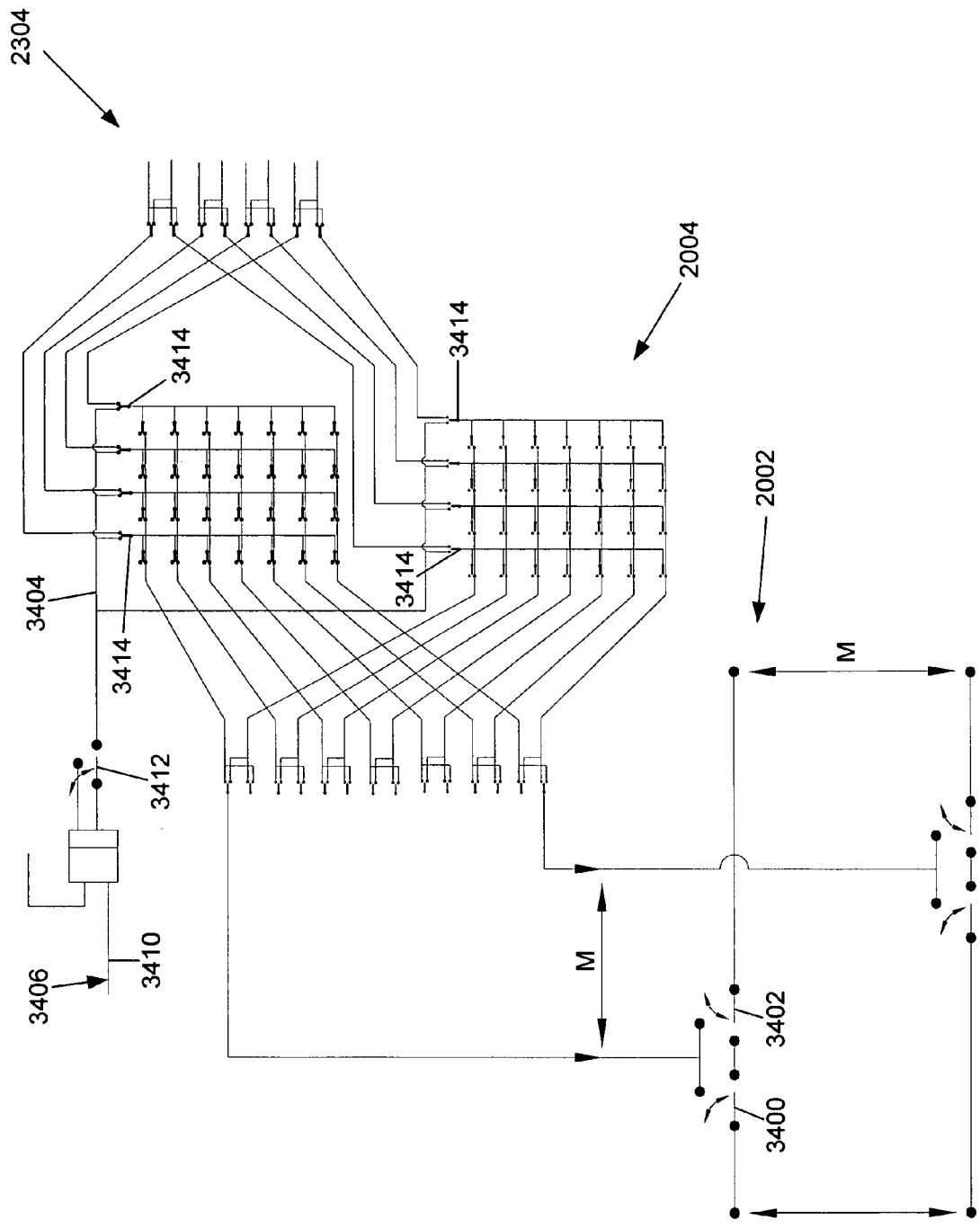
FIG. 34B is an enlarged view of one of the matrix cards of FIG. 34A.
Figure 35:
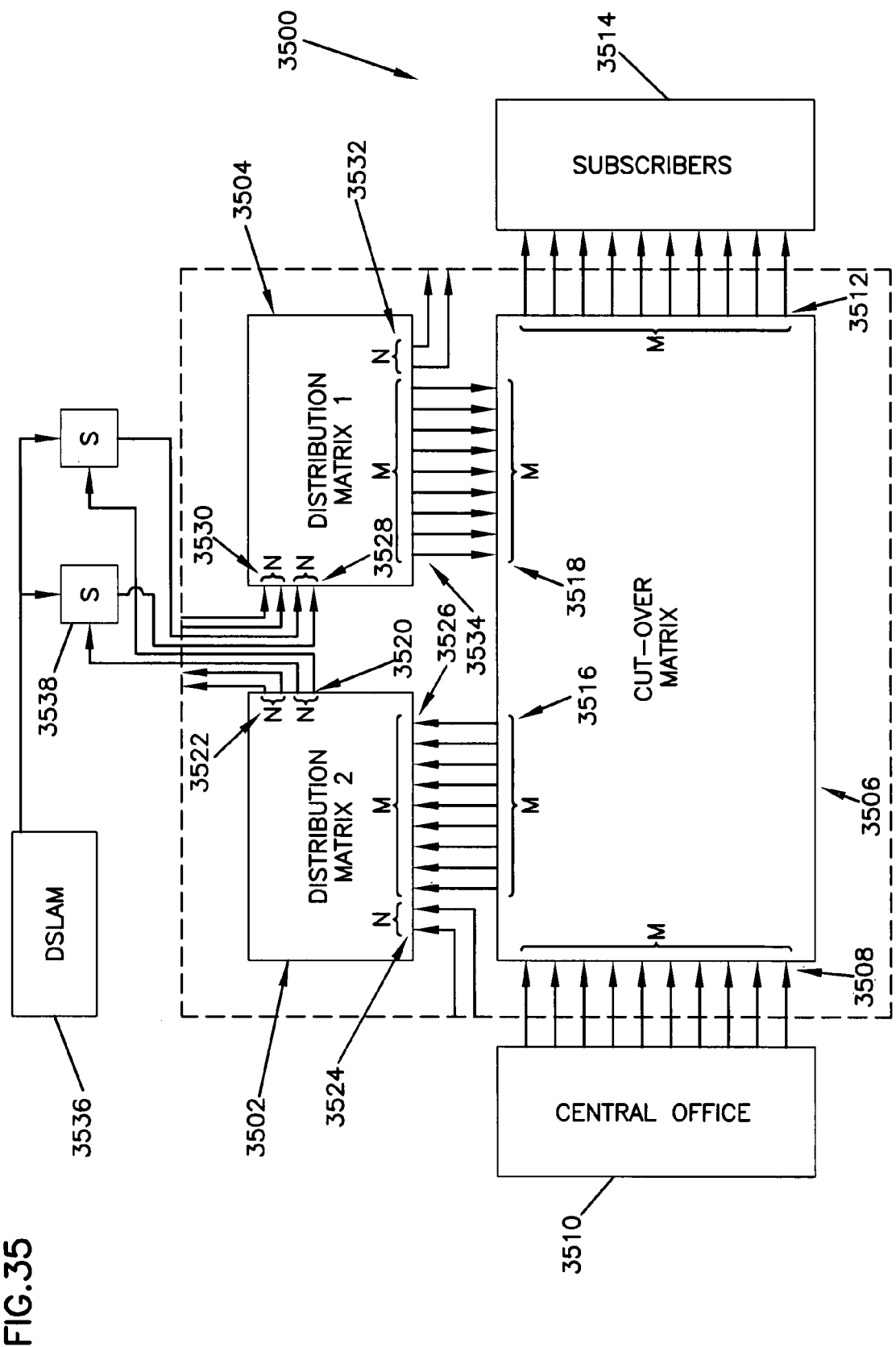
FIG. 35 depicts an exemplary embodiment of a modified CDU having features that allow the CDU to readily interface with adjacent CDUs so that special service signals may be distributed unevenly within a CDU network to meet demand.

FIGS. 34A, 34B and 35 show example cut-over and monitoring circuitry that can be incorporated into the matrix cards 2304. For example, referring to FIG. 34B, the depicted matrix card 2304 can include a cut-over matrix 2002 having first and second switches 3400 and 3402 for each circuit. In certain embodiments, the switches 3400 and 3402 are non-latching switches. For such switches, the control system can utilize software to reset the switches to given states when the system is powered up after a power outage.

Referring to FIG. 34B, when both switches 3400 and 3402 are down, the network ports 2006 of the cut-over matrix 2002 are electrically connected to the user ports 2010 of the cut-over matrix 2002. To provide special services to a subscriber, the switch 3400 corresponding to the subscriber's circuit is flipped up, while the other switch 3402 remains down. With the switch 3400 up and the switch 3402 down, downstream test access can be provided. In contrast, by flipping switch 3400 down and flipping switch 3402 up, upstream test access can be provided.

Referring still to FIG. 34A, test access circuitry 3404 has been incorporated into the distribution matrix 2004. Test access circuitry 3404 of the back plane circuit board 2600 interconnects the test access circuitry 3404 of the matrix cards 2304 to form a continuous test bus 3406 (see FIGS. 34A and 34B) that extends from matrix card 2304 to matrix card 2304. The interface between connectors 2516 (see FIG. 25) and connectors $3408_1$-$3408_{10}$ functions to electrically connect the test access circuitry 3404 of the cards 2304 to the test access circuitry 3410 of the back plane circuit board 2600. Switches 3412 are provided for allowing individual matrix cards to be selected for circuit testing. Switches 3414 allow specific columns of each switching matrix 2004 to be selected for testing. The bus arrangement shown in FIGS. 34A, 34B, and 34C allows any of the circuits of a given block to be tested from a single location. In one embodiment, the test information can be routed through a pair of contacts provided on the block controller.

It will be appreciated that the disclosed CDU embodiments are adapted for use in copper, twisted pair of systems. Thus, each input or output is representative of a twisted pair of signals. Additionally, while for convenience the various interface locations between the matrices have been identified as input and outputs, it will be appreciated that the transmissions can be bi-directional.

It is to be noted that the CDU as augmented with supplemental input ports and supplemental output ports may be controlled via the software scheme described with reference to FIGS. 16, 17, 18, 19A and 19B. For example, the supplemental input ports 2016 and supplemental output ports 2018 may be represented as any other port in the aforementioned data set describing the various ports making of each of the cross-connect distribution units making up the logical element, and states the logical port numbers assigned thereto. Once presented in the data set thusly, the aforementioned software scheme is operative to control such a CDU to provide a desired service to a desired logical port.

FIG. 35 shows a modified CDU 3500 having features that allow the CDU 3500 to readily interface with adjacent CDUs so that special service signals may be distributed unevenly within a CDU network to meet demand (e.g., to address statistical variations in demand). The CDU 3500 includes a first distribution matrix 3504, a second distribution matrix 3502 and a cut-over matrix 3506. The cut-over matrix 3506 includes M network ports 3508 (i.e., connection locations adapted for use in providing connections with a central office 3510), M user ports 3512 (i.e., connection locations adapted for use in providing connections with end users/subscribers 3514), M distribution matrix ports 3516 (i.e., connection locations adapted for use in providing connections between the cut-over matrix 3506 and the first distribution matrix 3502) and M first distribution matrix-ports 3518 (i.e., connection locations adapted for use in providing connections between the cut-over matrix 3506 and the second distribution matrix 3504). The second distribution matrix 3502 includes N primary special services ports 3520, N borrowing special service ports 3522, N lending special service ports 3524 and M cut-over matrix ports 3526. The first distribution matrix 3504 includes N primary special services ports 3528, N borrowing special service ports 3530, N lending special service ports 3532 and M cut-over matrix ports 3534. The cut-over matrix ports 3526, 3534 are adapted for use in providing connections between the cut-over matrix 3506 and the distribution matrices 3502, 3504, respectively. The primary special service ports 3520, 3528 are adapted for use in connecting the distribution matrices to a dedicated source of special services (e.g., a POTS splitter 3536 that receives special services from a DSLAM 3538). The borrowing special service ports 3522, 3530 are adapted for use in borrowing special services from another CPU. The lending special service ports 438, 3532 are adapted for use in lending special services to another CPU.

In use of the CPU 3500, network signals from the central office 3510 (e.g., POTS signals) are typically routed from the network ports 3508 through the cut-over matrix 3506 to the user ports 3512. From the user ports 3512, the network signals are routed to the subscribers 3514. However, if a given subscriber requests special services, network signals from the central office 3510 can be routed from the network ports 3508 through the cut-over matrix 3506 to the second distribution matrix ports 3516 where the signals are output from the cut-over matrix 3506 to the cut-over matrix ports 3526 of the first distribution matrix 3502. From the cut-over matrix ports 3526, the network signals are routed though the second distribution matrix 3502 to the special service ports 3520 where the network signals are output from the second distribution matrix 3502 to the splitters 3538. At the splitters 3538, the network signals are combined with special service signals from the DSLAM 3536. The combined signals are output from the splitters 3538 to the special service ports 3528 of the first distribution matrix 3504. From the special services ports 3528, the combined signals are routed through the second first distribution matrix 3504 to the cut-over matrix ports 3534 where the combined signals are output from the first distribution matrix 3504 to the first distribution matrix ports 3518 of the cut-over matrix 3506. From the first distribution matrix ports 3518, the combined signals are routed through the cut-over matrix 3506 to the user ports 3512. From the user ports 3512, the combined signals are output from the cut-over matrix 3506 and are routed to the subscribers 3514 in need of special services.

To borrow special services from another CPU, network signals from the central office 3510 are routed from the network ports 3508 through the cut-over matrix 3506 to the second distribution matrix ports 3516 where the signals are output from the cut-over matrix 3506 to the cut-over matrix ports 3526 of the second distribution matrix 3502. From the cut-over matrix ports 3526, the network signals are routed though the second distribution matrix 3502 to the borrowing special service ports 3522 where the network signals are output from the second distribution matrix 3502 to splitters dedicated to the CPU from which special services are desired to be borrowed. At the splitters, the network signals are combined with special service signals and the combined signals are output from the splitters to the borrowing special service ports 3530 of the first distribution matrix 3504. From the borrowing special services ports 3530, the combined signals are routed through the first distribution matrix 3504 to the cut-over matrix ports 3534 where the combined signals are output from the first distribution matrix 3504 to the first distribution matrix ports 3518 of the cut-over matrix 3506. From the first distribution matrix ports 3518, the combined signals are routed through the cut-over matrix 3506 to the user ports 3512. From the user ports 3512, the combined signals are output from the cut-over matrix 3506 and are routed to the subscribers 3514 in need of special services.

To lend special services to another CPU, network signals from the CPU in need of special services are output from the other CPU to the special service lending ports 3524 of the second distribution matrix 3502. From the special service lending ports 3524, the network signals are routed though the second distribution matrix 3502 to the special service ports 3520 where the network signals are output from the second distribution matrix 3502 to the splitters 3538. At the splitters 3538, the network signals are combined with special service signals from the DSLAM 3536. The combined signals are output from the splitters 3538 to the special service ports 3528 of the second distribution matrix 3504. From the special services ports 3528, the combined signals are routed through the second distribution matrix 3504 to the special service lending ports 3532 where the combined signals are output from the first distribution matrix 3504 to CPU in need of special services.

As depicted at FIG. 35, the distribution matrices 3502 and 3504 are each 12×4 matrixes. The twelve ports corresponding to one side of each matrix 3502, 3504 include the cut-over matrix ports and the special service lending ports. The four ports corresponding to the other side of each matrix 3502, 3504 include the dedicated special service ports and the special service borrowing ports. It will be appreciated that other matrix sizes could also be used.

Figure 36:
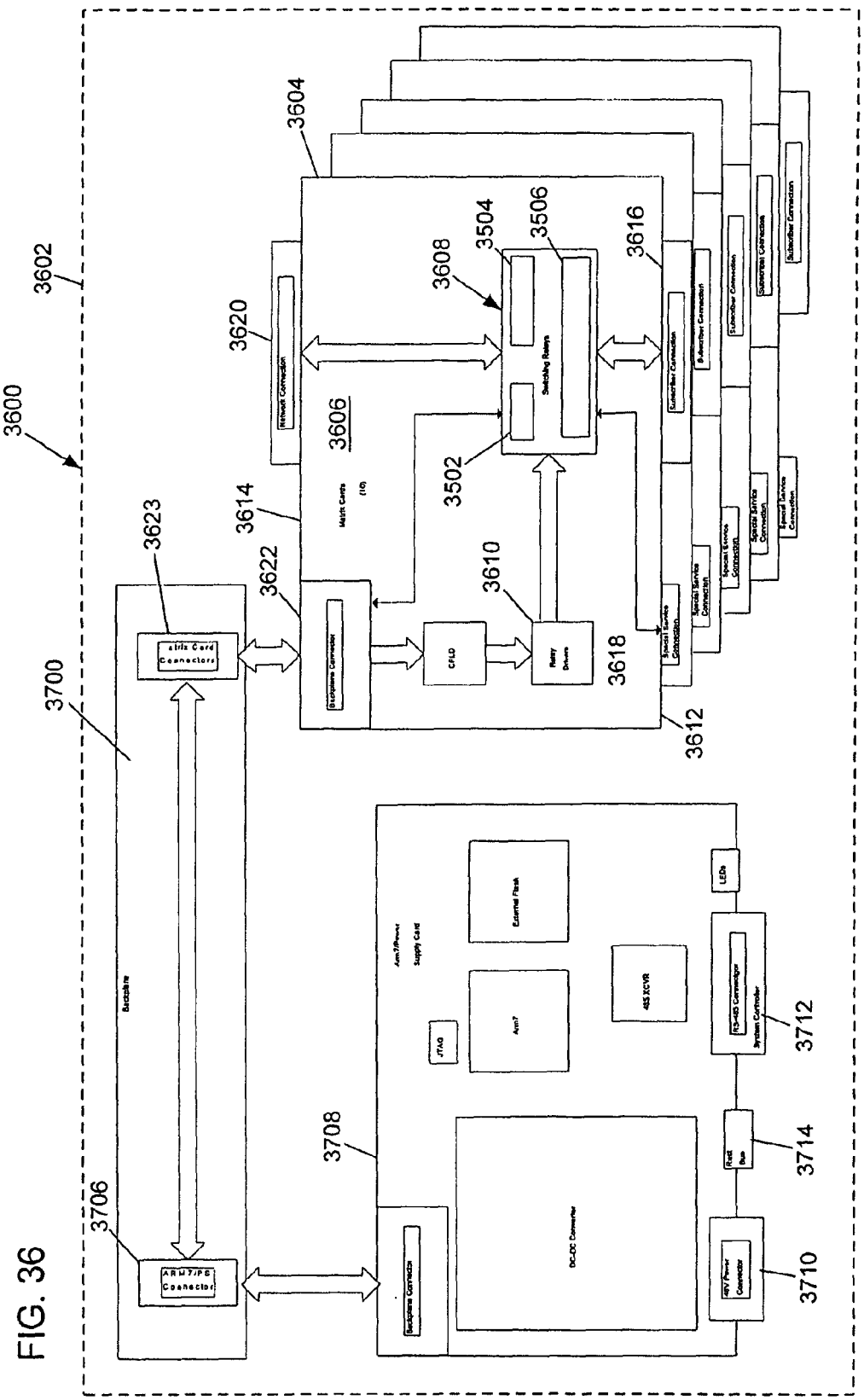
FIG. 36 schematically shows an example telecommunications distribution block having features that are examples of inventive aspects in accordance with the principles of the present disclosure.

FIG. 36 schematically shows an example telecommunications distribution block 3600 having features that are examples of inventive aspects in accordance with the principles of the present disclosure. The distribution block 3600 includes a housing 3602 that can be sized similar to the housing 2302 of the embodiment of FIGS. 23 and 24. The housing 3602 of the block 3600 holds a plurality of matrix cards 3604 in a stacked relationship with one card positioned one above the other within the housing 3602. Each matrix card 3604 includes a circuit board 3606 supporting switching circuitry/relays 3608 that form the cut-over matrix 3506, the first distribution matrix 3502 and the second distribution matrix 3504. The circuit boards 3606 also supports circuitry 3610 for driving the circuitry/relays 3608.

Referring still to FIG. 36, the depicted matrix cards 3604 each include a front edge 3612 and a back edge 3614. A user/subscriber connector 3616 and a special services connector 3618 are provided at the front edge 3612. A network connector 3620 and a back plane connector 3622 are provided at the back edge 3614. The user ports 3512 are connected to the user/subscriber connector 3616 and the network ports 3508 are connected to the network connector 3620. Also, the dedicated special services ports 3520, 3528, half of the special service borrowing ports 3522, half of the special service borrowing ports 3530, half of the special service lending ports 3524 and half of the special service lending ports 3532 are connected to the special services connector 3618. The special service connectors 3618 allow patch cables or jumper cables to be used to interconnect two blocks within a cabinet so that the network of available special services locations can be expanded from block to block. In this way, it is possible to share special services between blocks or between cards within a block. The other halves of the special service borrowing ports 3522, the special service borrowing ports 3530, the special service lending ports 3524 and the special service lending ports 3532 are connected to the back plane connector 3622. In use, termination blocks can be mounted on the connectors 3616, 3618 and 3620.

Figure 37:
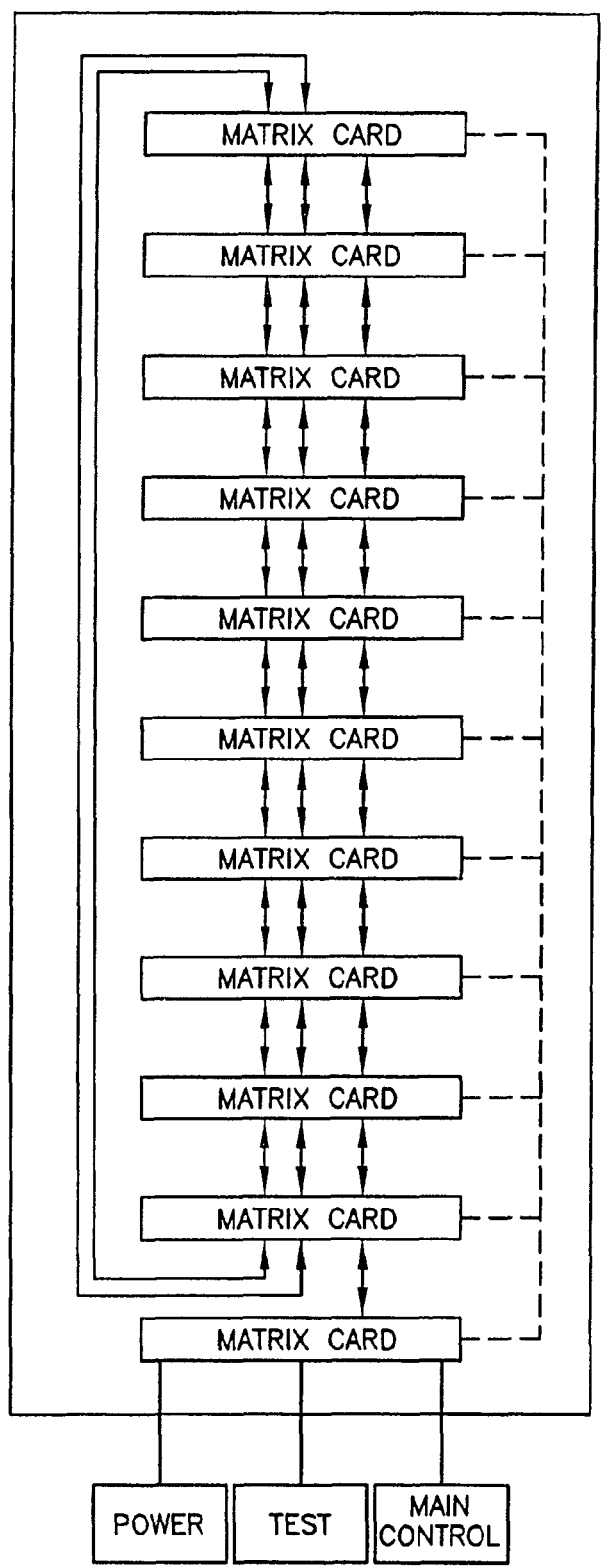
FIG. 37 depicts a back plane circuit board that includes tracings or other circuitry that electrically interconnects the matrix cards of the block.

When the cards 3604 are mounted within the housing 3602 of the block 3600, the back plane connectors 3622 fit within corresponding connectors 3623 provided on a back plane circuit board 3700 of the block 3600. As shown at FIG. 37, the back plane circuit board 3700 includes tracings 3702 or other passive circuitry that electrically interconnects the matrix cards 3604 of the block 3600. For example, the tracings 3702 provide electrical interconnections between the special service lending and sharing ports 3522, 3524, 3530, 3532 of adjacent matrix cards 3604 within the housing 3602. In this way, all of the matrix cards 3604 within the housing 3602 are interconnected in a common network to allow a given matrix card to access special services from another matrix card that has extra capacity. The back plane circuit board 3700 also includes a test bus 3704 that interconnects the matrix cards 3604 to provide test access to each circuit path.

The back plane board 3700 further includes a connector 3706 adapted to interface with a control card 3708 of the block 3600. When the control card 3708 is mounted within the block 3600, the connector 3706 allows the card 3708 to interface with the matrix cards 3604 through the back plane board 3700 (see FIG. 37). The control card 3708 also includes a power plug 3710, an exterior plug 3712 (e.g., NRJ-45 or R1-485 connector) for interfacing with a main system controller, and a test bus connector 3714 for allowing test signals carried by the test bus 3704 to be accessed from outside the block.

Figure 38:
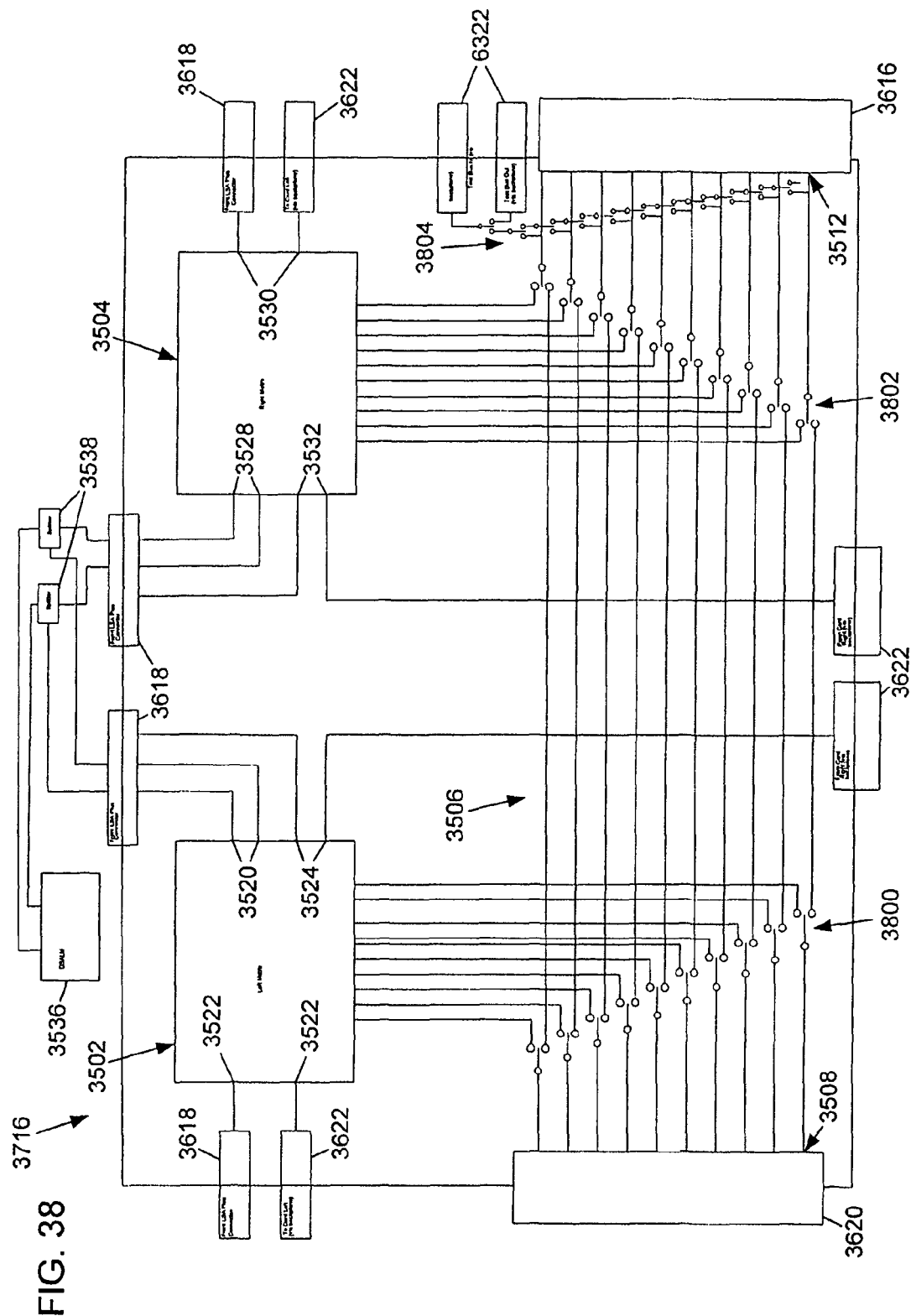
FIG. 38 depicts a more detailed schematic view of an exemplary embodiment of one of the matrix cards.

FIG. 38 is a more detailed schematic view of one of the matrix cards 3716. As shown at FIG. 38, the special services connector 3618 and the back plane connector 3622 have been split into multiple separate blocks for ease of depiction. Referring to FIG. 38, the network ports 3508 are connected to the network connector 3620 and the user/subscriber ports 3512 are connected to the user/subscriber connector 3616. The dedicated special services ports 3520 of the first matrix 3502 and the dedicated special services ports 3528 of the second distribution matrix 3504 are shown connected to the special services connector 3618. One of the special services borrowing ports 3522, one of the special services lending ports 3524, one of the special services borrowing ports 3530 and one of the special services lending ports 3532 are also shown connected to the special services connector 3618. The others of the special services borrowing ports 3522, the special services lending ports 3524, and the special services lending ports 3532 are shown connected to the back plane connector 3622 to allow connection of such ports to the tracings 3702 of the backplane.

Referring still to FIG. 38, the cut-over matrix 3506 is shown having two sets of cut-over switches 3800, 3802. When the switches 3800, 3802 corresponding to a given circuit are flipped down, the network port 3508 of the given circuit is connected to the user port 3512 of the circuit and the distribution matrices are by-passed. When the switches 3800, 3802 of the given circuit are flipped up, the network port 3508 of the given circuit is connected to a corresponding first distribution matrix port 3516 and the user port 3512 of the circuit is connected to a corresponding second distribution matrix port 3518. Thus, when the switches 3800, 3802 are flipped up, signals are routed through the distribution matrices 3502, 3504 rather than being routed straight through the cut-over matrix 3506.

Referring still to FIG. 38, a series of test access relays 3804 are provided between the switches 3802 and the user ports 3512. The relays 3804 are electrically connected to the test bus 3704 of the back plane board via the back plane connector 3622. By flipping selected ones of the test access relays 3804, test access can be provide to any of the circuits of the matrix card. When the uppermost test access relay 3804 is flipped right, the test bus merely loops through the back plane connector 3622 and no test access is provided to any of the circuits of the matrix card. When the uppermost test access relay 3804 is flipped left, test access to a selected circuit can be provided.

Figure 39:
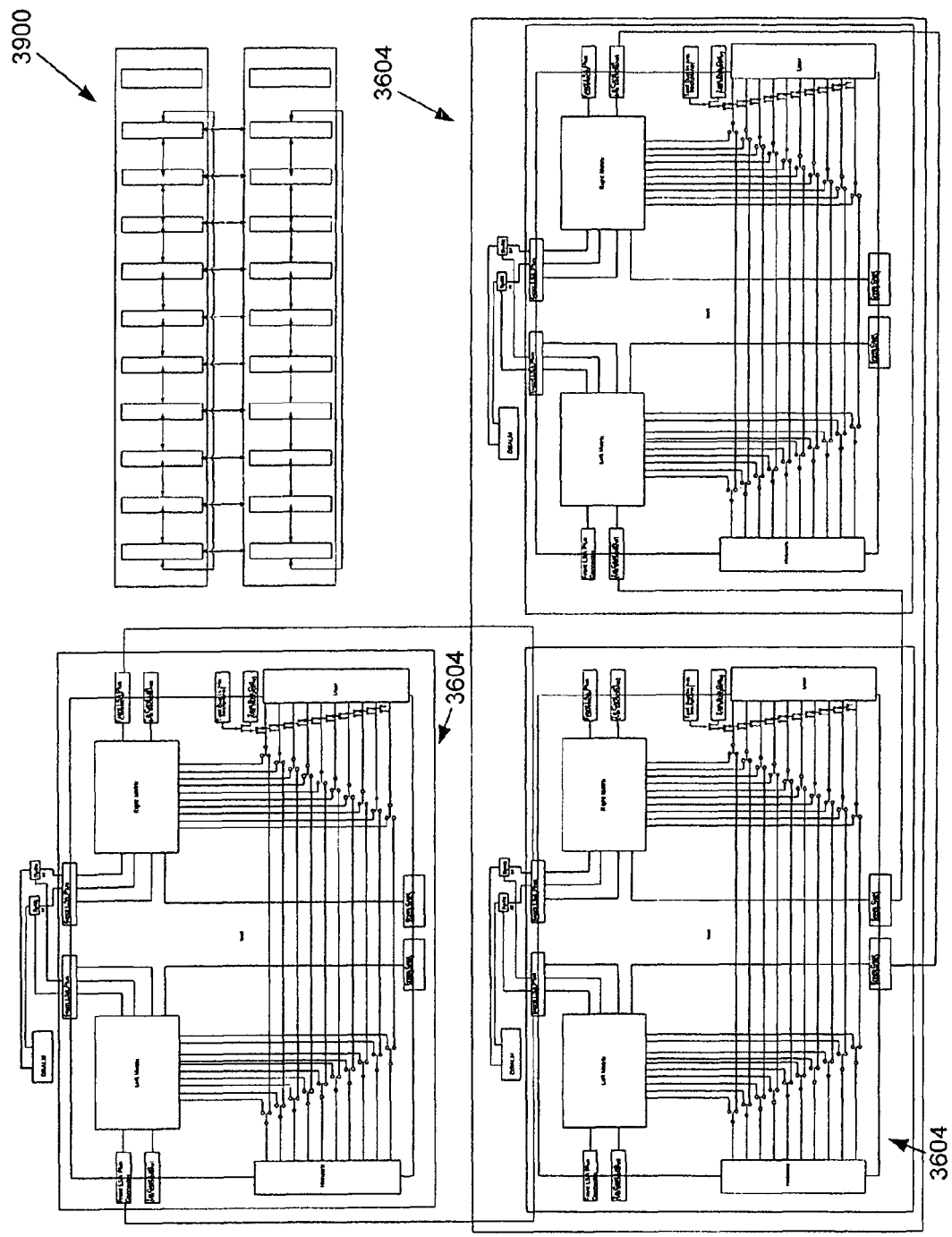
FIG. 39 depicts three matrix cards that are borrowing and sharing services within a given block and from block to block.

Referring now to FIG. 39, three matrix cards 3604a, 3604b and 3604c are shown. Matrix cards 3604b and 3604c are within the same block and matrix card 3604b is shown borrowing special services from matrix card 3604c through the back plane of the block 3900. Matrix cards 3604a and 3604b are located in different blocks and matrix card 3604b is shown borrowing special services from matrix card 3604a via jumpers connected to the special services connectors 3618.

Figure 40:
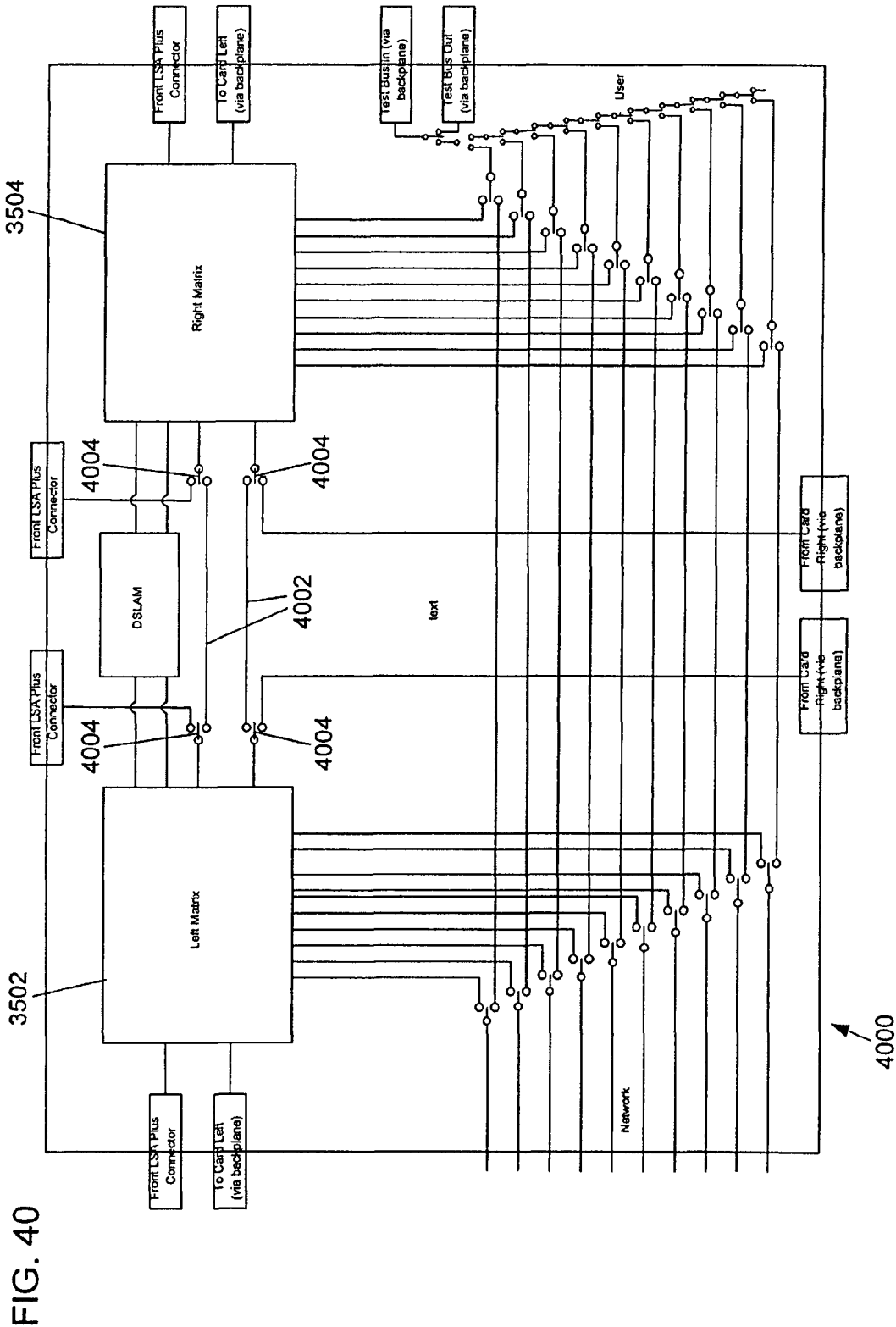
FIG. 40 depicts an alternative embodiment of a matrix card.

Referring now to FIG. 40, an alternative matrix card 4000 is shown. The matrix card 4000 has the same configuration as the card 3602, except two pass lines 4002 and switches 4004 are provided between the distribution matrices 3502, 3504. When the switches are flipped to connect the by-pass lines 4002 to the matrices 3502, 3504, special services can be by-passed and any-to-many type cross-connections of network service can be provided.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:
1. A telecommunications apparatus comprising:
a generally rectangular housing including a plurality of exterior surfaces and a first side positioned opposite from a second side;
a switching matrix;
a plurality of conductive user output locations on the first side;
a plurality of conductive network input locations on the second side, wherein for any given user output location there exists a conductive path coupling the given user output location to a corresponding network input location, the conductive path defining a route of propagation of communication signals through a cut-over matrix of the telecommunications apparatus between the user output location and the corresponding network input location;

a plurality of switches, wherein for any given conductive path, a switch is interposed therein, each switch having a first state in which the given conductive path is unaltered, so that the given conductive path couples the corresponding user output location to a circuit-switched network, and a second state in which the given conductive path is altered, so that the given conductive path couples the corresponding user output location to the switching matrix;

the plurality of user output locations, the plurality of network input locations, plurality of switches, cut-over matrix, and plurality of conductive paths being disposed upon a first circuit board within the housing, the first circuit board including a first side and a second side opposite the first side, wherein the plurality of user output locations are divided into a first group that is electrically routed through a first connector, a second group that is electrically routed through a second connector, a third group that is electrically routed through a third connector, and a fourth group that is electrically routed through a fourth connector, the first and second connectors include a Telco connector disposed on the first side, and the third and fourth connectors include a Telco connector disposed on the second side; and the switching matrix being disposed upon a second circuit board that is configured to electrically couple to the first circuit board within the housing;

wherein the switching matrix has a quantity of N conductive matrix output locations, for coupling to the plurality of altered conductive paths, and a quantity of M conductive matrix input locations amenable to coupling to an external device, and any one of the quantity of N matrix output locations may be electrically coupled to any one of the quantity of M matrix input locations, wherein the quantity M is less than quantity N;

wherein the plurality of M matrix input locations are electrically routed through one or more insulation displacement connectors accessible from one of the plurality of exterior surfaces.

2. The telecommunications apparatus of claim 1, wherein the quantity M is one-half the quantity N.

3. The telecommunications apparatus of claim 2, wherein the quantity M is equal to sixteen, and the quantity N is equal to thirty-two.

4. The telecommunications apparatus of claim 1, further comprising a pair of flanges coupled to the housing.

5. The telecommunications apparatus of claim 1, further comprising a controller configured and arranged to determine the state of each of the plurality of switches, and to determine connectivity of the switching matrix.

6. The telecommunications apparatus of claim 5, further comprising a network interface in communication with the controller.

7. The telecommunications apparatus of claim 1, further comprising:
   a test access bus incorporated into and providing test access onto a selected circuit path.

8. A telecommunications apparatus comprising:
   a main circuit board;
   a first cut-over matrix provided on the main circuit board, the first cut-over matrix including a plurality of first connection locations, a plurality of second connection locations and a plurality of third connection locations, the first cut-over matrix also including a plurality of first cut-over switches movable between first and second positions, the first cut-over matrix forming first conductive paths connecting the first connection locations to the second connection locations when the first cut-over switches are in the first positions, and the first cut-over matrix forming second conductive paths connecting the third connection locations to the second connection locations when the first cut-over switches are in the second positions, the first conductive path defining a route of propagation of communication signals through the telecommunications apparatus between the first connection locations and the second connection locations, and the second conductive path defining a route of propagation of communication signals through the telecommunications apparatus between the third connection locations and the second connection locations;
   a first daughter circuit board electrically connected to the main circuit board;
   a first distribution matrix provided on the first daughter board, the first distribution matrix including a plurality of fourth connection locations and a plurality of fifth connection locations, the first distribution matrix including a switching arrangement that allows any of the fifth connection locations to be connected to any of the fourth connection locations, the fourth connection locations being connected to the third connection locations of the first cut-over matrix;
   a second cut-over matrix provided on the main circuit board, the second cut-over matrix including a plurality of sixth connection locations, a plurality of seventh connection locations and a plurality of eighth connection locations, the second cut-over matrix also including a plurality of second cut-over switches movable between first and second positions, the second cut-over matrix forming third conductive paths connecting the sixth connection locations to the seventh connection locations when the second cut-over switches are in the first positions, and the second cut-over matrix forming fourth conductive paths connecting the eighth connection locations to the seventh connection locations when the second cut-over switches are in the second positions, the third conductive path defining a route of propagation of communication signals through the telecommunications apparatus between the sixth connection locations and the seventh connection locations, and the fourth conductive path defining a route of propagation of communication signals through the telecommunications apparatus between the eighth connection locations and the seventh connection locations;
   a second daughter circuit board electrically connected to the main circuit board;
   a generally rectangular housing in which the main circuit board and the first and second daughter circuit boards are positioned, the housing including a first side positioned opposite from a second side; and
   a second distribution matrix provided on the second daughter board, the second distribution matrix including a plurality of ninth connection locations and a plurality of tenth connection locations, the second distribution matrix including a switching arrangement that allows any of the tenth connection locations to be connected to any of the ninth connection locations, the ninth connection locations being connected to the eighth connection locations of the second cut-over matrix;

wherein the first and sixth connection locations are accessible from the first side of the housing, and the second and seventh connection locations are accessible from the second side of the housing, and at least one of the plurality of first connections and sixth connections connect to a circuit-switched network.

* * * * *

UNITED STATES PATENT AND TRADEMARK OFFICE
CERTIFICATE OF CORRECTION

PATENT NO. : 8,437,344 B2
APPLICATION NO. : 11/503849
DATED : May 7, 2013
INVENTOR(S) : Franzke et al.

Page 1 of 1

It is certified that error appears in the above-identified patent and that said Letters Patent is hereby corrected as shown below:

On Title Page 2, item 56, Foreign Patent Documents: "WO   WO 2006/422698 A1   11/2006" should read --WO   WO 2006/122698 A1   11/2006--

In the Specification

Col. 21, line 20: "3514), M distribution matrix" should read --3514), M second distribution matrix--

Col. 21, line 62: "through the second first" should read --though the first--

Signed and Sealed this
First Day of April, 2014

Michelle K. Lee
*Deputy Director of the United States Patent and Trademark Office*